US005686553A

United States Patent [19]
Tai et al.

[11] Patent Number: 5,686,553
[45] Date of Patent: Nov. 11, 1997

[54] COPOLYESTERS AND MOLDED ARTICLES COMPRISING THE SAME

[75] Inventors: Shinji Tai; Tetsuya Hara; Tsugunori Kashimura, all of Kurashiki, Japan

[73] Assignee: Kuraray Co., Ltd., Kurashiki, Japan

[21] Appl. No.: 746,941

[22] Filed: Nov. 18, 1996

[30] Foreign Application Priority Data

| Nov. 16, 1995 | [JP] | Japan | 7-321309 |
| Dec. 1, 1995 | [JP] | Japan | 7-314564 |
| Dec. 27, 1995 | [JP] | Japan | 7-340541 |

[51] Int. Cl.$^6$ .................. C08G 63/18; B28B 3/20
[52] U.S. Cl. .................. 528/194; 528/190; 528/193; 528/194; 528/195; 528/218; 528/219; 528/272; 528/294; 528/295; 528/296; 528/298; 528/300; 528/301; 528/302; 528/307; 528/308; 528/308.6; 528/481; 528/503; 264/176.1; 264/239
[58] Field of Search .................. 528/272, 294, 528/295, 296, 298, 300, 301, 302, 307, 308, 308.6, 481, 503, 190, 193, 194, 195, 218, 219; 264/176.1, 239

[56] References Cited

U.S. PATENT DOCUMENTS

| 3,558,557 | 1/1971 | Hrach et al. | 528/195 |
| 4,161,579 | 7/1979 | Edelman et al. | 525/444 |
| 4,188,357 | 2/1980 | Go | 264/540 |
| 4,196,275 | 4/1980 | Go | 528/173 |
| 4,219,527 | 8/1980 | Edelman et al. | 264/540 |
| 4,234,708 | 11/1980 | Edelman et al. | 525/444 |
| 4,554,329 | 11/1985 | Sinker et al. | 525/437 |
| 5,182,359 | 1/1993 | Kanaka et al. | 528/193 |

*Primary Examiner*—Samuel A. Acquah
*Attorney, Agent, or Firm*—Oblon, Spivak, McClelland, Maier & Neustadt, P.C.

[57] ABSTRACT

The invention provides polyesters of terephthalic acid units and ethylene glycol units, having excellent melt moldability. The invention also provides molded articles having excellent transparency, impact resistance, gelation characteristics, appearance, tactility, mechanical properties, heat resistance, chemical resistance, and dimensional precision.

21 Claims, No Drawings

COPOLYESTERS AND MOLDED ARTICLES COMPRISING THE SAME

BACKGROUND OF THE INVENTION

1. Field of the Invention

The present invention relates to copolyesters, processes for producing the copolyesters, molded articles obtained from the copolyesters, and processes for producing the molded articles.

The present invention provides copolyesters having high melt viscosity and non-Newtonian properties of low viscosity at high shear rates and high viscosity at low shear rates.

The present invention still further provides copolyesters generating no shark-skin flow or similar melt fracture phenomena on molding, suppressing the rate of crystallization, and forming no gels, and to processes for producing the copolyesters, and to molded articles obtained from the copolyesters. Use of the copolyesters of the present invention for producing molded articles by extrusion blow molding or similar melt molding processes insures smooth production of high-quality molded articles having excellent transparency, appearance and tactility and mechanical properties such as impact strength, as well as excellent heat resistance, moisture resistance and chemical resistance. In particular, the copolyesters of the present invention are suitably processed by extrusion blow molding.

2. Discussion of the Background

Resins of polyesters including polyethylene terephthalate have excellent transparency, mechanical properties, gas barrier properties, and flavor barrier properties, and are hygienic and safe with respect to residual monomers and toxic additives, when molded into shaped articles. The resins have therefore become widely used in recent years, replacing polyvinyl chloride resin as material for hollow containers for, e.g., juices, soft drinks, relish, oil, cosmetics, and cleansers.

Extrusion blow molding and injection blow molding are two representative processes for producing hollow shaped articles such as plastic containers. Extrusion blow molding involves extruding a melt plasticized resin through a dieorifice into cylindrical parisons and, while holding the parison as they are still softened, blowing a fluid such as air into the parison. Injection blow molding involves injecting a melted resin into a die to mold closed parisons (preforms) once and, after inserting the preforms into a blow die, blowing a fluid such as air into the preforms.

Extrusion blow molding is more simple than injection blow molding. Extrusion blow molding no complex techniques in preparing dies and for molding, thus equipment costs and die preparation costs are low. Extrusion blow molding is therefore suitable for multiple-product-small-quantity production and has the further advantage of being capable of producing thin, thick or large articles and complex-shaped articles having irregular fittings, e.g., a knob.

Various attempts have therefore been made to conduct extrusion blow molding with general-purpose polyesters, e.g., polyethylene terephthalate and polybutylene terephthalate. However, general-purpose polyesters generally have low melt viscosity, so that, when they are extrusion blow molded, the extruded parisons sag markedly (drawdown) and are difficult to shape. In addition, crystallization tends to occur on blowing after extrusion, thereby deteriorating transparency or shapability. These disadvantages of conventional polyesters, caused by their low melt viscosity and ready crystallizability, are more pronounced when such conventional polyesters are extrusion blow molded into long parisons having a length of at least 30 cm. This length is required for producing large-size hollow molded shaped articles. It is therefore very difficult to obtain shaped articles, in particular large hollow ones, having simultaneously uniform shape and size and good transparency, from conventional polyesters by extrusion blow molding.

For the above reasons, extrusion blow molding has been conducted using polyvinyl chloride and polyolefin resins, since these resins have high melt viscosity and cause the extruded parisons in a melted condition to sag only to a small extent. However, extrusion blow molded articles from polyvinyl chloride resin suffer hygiene and/or safety problems due to elution of toxic additives such as plasticizers and metal-containing stabilizers. Further, incineration of such molded articles as waste generates toxic gases. Use of molded polyvinyl chloride articles has therefore been declining in Europe and elsewhere. Extrusion blow molding with polyolefins such as polyethylene provides shaped articles which become white turbid due to formation of crystals, and the articles tend to have poor transparency and appearance.

The following are disclosures relating to polyester resins for extrusion blow molding:

(1) U.S. Pat. No. 5,182,359, EP 0532943 and Japanese Patent Application Laid-open No. 125165/1993 disclose a process for producing modified polyesters by reacting a dicarboxylic acid or ester-forming derivatives thereof with a diol component, in which the diol component contains an ethylene oxide adduct of bisphenol A.

(2) The Comparative Examples of EP 0532943 and Japanese Patent Application Laid-open No. 207003/1995 disclose a process for producing copolyesters by reacting a dicarboxylic acid or ester-forming derivatives thereof with a diol component of cyclohexanedimethanol or a similar compound.

(3) U.S. Defensive Publication T954,005 discloses a process for producing branched polyesters, which comprises using terephthalic acid, ethylene glycol, 1,4-cyclohexanedimethanol and a small amount of a multifunctional branching agent compound.

(4) U.S. Pat. No. 4,161,579, U.S. Pat. No. 4,219,527 and U.S. Pat. No. 4,234,708 disclose a process for producing copolyesters for extrusion blow molding, which comprises using a general-purpose multifunctional component such as trimethylolpropane, pentaerythritol or trimellitic acid, and a chain terminator such as benzoic acid or stearic acid, besides a dicarboxylic acid component such as terephthalic acid or ester-forming derivatives thereof and a diol component such as ethylene glycol.

(5) U.S. Pat. No. 4,182,841 and Japanese Patent Application Laid-open No. 92730/1980 disclose a process for producing copolyesters for extrusion blow molding, which comprises subjecting a dicarboxylic acid component such as terephthalic acid or ester-forming derivatives thereof and a diol component such as ethylene glycol to esterification or transesterification to obtain a low-polymerization-degree compound; conducting polymerization of the compound with a conventional crosslinking agent such as trimethylolpropane, pentaerythritol or trimellitic acid to prepare a prepolymer; and subjecting the prepolymer to solid phase polymerization.

(6) U.S. Pat. No. 4,554,329 discloses a process for producing copolyesters for extrusion blow molding, which comprises using terephthalic acid, isophthalic acid, a branching agent such as pentaerythritol, and a terminating agent such as m-anisic acid.

(7) U.S. Pat. No. 3,558,557, U.S. Pat. No. 4,188,357 and U.S. Pat. No. 4,196,275 disclose a process for producing branched polyesters, which comprises using terephthalic acid, ethylene glycol, bisphenol A diglycol ether or bis[4-(2-hydroxyethoxy)phenyl]sulfone, and a small amount of a multifunctional branching agent compound.

In the processes of (1) and (2) above, the copolymerization of the bisphenol A ethylene oxide adduct or cyclohexanedimethanol decreases the melting point of the resulting copolyesters. As a result, the melt extrusion temperature can be set at lower temperatures than before, so that the melt viscosity on extrusion blow molding can be increased. However, the melt viscosity is not high enough to conduct extrusion blow molding. Therefore the parison extruded sags severely and can hardly be neatly shaped, so that extrusion blow molding cannot operate smoothly. Another disadvantage in conducting molding at low temperatures is that extrusion blow molded articles produced, e.g., bottles, generate a finely roughened surface, thereby deteriorating appearance and tactility. Further, the copolyesters obtained by the above processes (1) and (2) sometimes cannot undergo solid phase polymerization due to their low melting points. Or, if they can be solid phase polymerized, the rate of solid phase polymerization is very low and the degree of polymerization does not increase sufficiently. In this case the melt viscosity can hardly be increased sufficiently. Molded articles obtained from such polyesters tend to have poor transparency or large variations in thickness.

In process (3) above, where 1,4-cyclo-hexanedimethanol is copolymerized in a high ratio of 10 to 40 mole %, based on total diol units, low-temperature molding is possible due to the lowered melting point or to the copolymer having been made amorphous. Besides, the melt viscosity tends to be higher than that of copolyesters obtained by the above processes (1) and (2), due to the branched structure formed by the multifunctional branching agent compound. However, the references cited in (3) do not mention solid phase polymerization at all. In fact, the copolyester obtained by the process (3), is an amorphous polymer, or if it is crystalline, has too low a melting point and cannot undergo solid phase polymerization. If this copolyester could be subjected to solid phase polymerization, such low melting point causes chips or pellets to stick together, or the rate of polymerization would be too low, so that a sufficiently high molecular weight cannot be achieved. Consequently, the melt viscosity of the obtained copolyester is not high enough to conduct extrusion blow molding; the extruded parison sags severely and cannot be shaped neatly, and extrusion blow molding cannot be carried out smoothly. In addition, process (3), like processes (1) and (2) suffering the disadvantage on molding at low temperatures, tends to provide extrusion blow molded articles having a finely roughened surface, which deteriorates appearance and/or tactility.

Further, high-temperature drying of the copolyester before molding leads to sticking together of chips or pellets and hence drying should necessarily be conducted at a low temperature, which requires long drying time with a large-scale drying apparatus such as vacuum dryer, decreasing productivity. If the copolyester is amorphous, its chips or pellets tend to stick together at the bottom section of the hopper of extruder, stopping the extrusion operation.

The copolyester obtained by process (4), wherein a crosslinking agent comprising a multifunctional compound and a chain terminator such as benzoic acid or stearic acid are used in combination, has a higher melt viscosity and melt strength as compared with ethylene-terephthalate homopolymer, but has a higher rate of crystallization. The copolyester therefore forms spherulites on extrusion, so that the obtained extrusion blow molded articles undergo severe whitening and have poor transparency. In addition, on production of long parisons having a length of 30 cm or more by extrusion blow molding to produce large-size hollow articles, the bottom part of the parisons solidifies due to crystallization, so that the pinch-off part of the bottom part of the obtained bottles or similar containers are poorly sealed. Besides, the obtained molded articles tend to have, as with the above processes (1) through (3), a minutely roughened surface, thereby having poor appearance and tactility.

With respect to productivity in preparation of the copolyester, because the degree of crystallization increases sharply, diffusion of ethylene glycol in the polymer, necessary for increasing the rate of polymerization, is hindered, making it difficult to smoothly produce the desired copolyester. Further, since the copolyester obtained by process (4) has an unusually high degree of crystallization, it frequently forms unmelted agglomerates in the extrusion step of extrusion blow molding, thereby generally yielding poor molded articles. These disadvantages are more pronounced when the rate of resin extrusion is high, as for production of large-size hollow molded articles.

The copolyester obtained by the above process (5) has, as the copolyester obtained by process (4), a higher rate of crystallization as compared with ethylene terephthalate homopolymer. The copolyester therefore forms spherulites on extrusion of parison, so that the obtained extrusion blow molded articles undergo severe whitening and have poor transparency. In addition, on production of long parisons having a length of 30 cm or more by extrusion blow molding to produce large-size hollow articles, the lower part of the parisons solidifies due to crystallization, so that the pinch-off part of the bottom part of the obtained bottles or like containers is poorly sealed. The degree of crosslinking of the copolyester cannot be suitably controlled, leading to formation of an over-crosslinked state, which causes gels to generate as agglomerates in molded articles, and deteriorates the appearance. Furthermore, the obtained molded articles tend to have, as with the above processes (1) through (4), a minutely roughened surface, thereby having poor appearance and tactility. U.S. Pat. No. 4,182,841 and Japanese Patent Application Laid-open No. 92730/1980 mentioned above, disclose that a small amount of isophthalic acid or neopentyl glycol can be copolymerized. In this case, the crystallization rate of the copolyester is suppressed, so that early solidification of the bottom part of the parison on producing hollow molded articles and whitening of the hollow molded articles are reduced to some extent. However, the over-crosslinked state will still cause gels to form and the molded articles to have roughened surface.

Process (6) above discloses that copolymerization of a branching agent such as pentaerythritol and a terminating agent such as m-anisic acid, followed by solid phase polymerization, leads to production of copolyesters having high melt viscosity and high shear sensitivity of melt viscosity and generating less gels caused by over-crosslinkage. Also, copolymerization of a bifunctional component of isophthalic acid suppresses the crystallization rate of the copolyester, thereby lowering its crystallization rate at the bottom part of parison on production of hollow molded articles. Solidification of the bottom part of the parison on producing hollow molded articles and whitening of the hollow molded articles tend to be reduced. However, on extrusion of copolyester of process (6) into a long parison having a length of 30 cm or more to produce large-size hollow molded articles, the bottom part of the parison extruded at first crystallizes, which whitens the bottom part of the hollow molded articles. Furthermore, process (6) causes the obtained molded articles to have minute roughening of the surface, which markedly deteriorates appearance and tactility, as with the above processes (1) through (5). Particularly, where the throughput exceeds 20 kg/hr, as is the case when producing large-sized hollow molded articles by extruding a long parison having a length of 30 cm or more, the minute surface roughening becomes more pronounced. Simultaneously, unmelted agglomerates tend to form in the molded articles due to difficulty in the melting of crystals.

In process (7), which comprises copolymerizing bisphenol A diglycol ether or bis[4-(2-hydroxyethoxy)phenyl]sulfone, low-temperature molding is possible due to the amorphous state or due to a decrease in the melting point. In addition, the resulting copolyester tends to have a higher melt viscosity as compared with the copolyesters obtained by processes (1) and (2) due to the branched structure formed by the multifunctional branching agent compound used. However, the references (7), like the reference (3) never mention solid phase polymerization. The copolyester obtained by process (7), with the degree of polymerization increased only by melt polymerization, has a low maximum achievable molecular weight.

The copolyester therefore has insufficiently high melt viscosity, which causes the extruded parison to undergo severe drawdown on extrusion blow molding of large-size hollow articles requiring extrusion of a long parison having a length of 30 cm or more. It is difficult to shape such a parison suitably and further to smoothly conduct extrusion blow molding operation. To obtain a copolyester having a high intrinsic viscosity by melt polymerization, one may attempt to use large amounts of bisphenol A diglycol ether or bis[4-(2-hydroxyethoxy)phenyl]sulfone and a multifunctional branching agent compound. This would cause the copolyester to be exposed to high temperature for a long period of time during melt polymerization, leading to thermal decomposition of, e.g., bisphenol A diglycol ether, bis[4-(2-hydroxyethoxy)phenyl]sulfone. The copolyester would then have poor color tone and the melt viscosity would not be properly controlled. The copolyester, when subjected to extrusion blow molding, would give molded articles with deteriorated appearance and tactility and could hardly be molded smoothly. Besides, process (7) tends to have the disadvantage inherent to low-temperature molding of causing the obtained molded articles to have a minutely roughened surface, which deteriorates the appearance and tactility, as with the above processes (1) through (3). Furthermore, where the amount of bisphenol A diglycol ether or bis[4-(2-hydroxyethoxy)phenyl]sulfone copolymerized has been increased and the crystallinity of the resulting chips has decreased, drying the copolyester at a high temperature before molding causes the chips or pellets to stick together, so that they have to be dried at a low temperature. This requires long drying time with a large-size apparatus such as vacuum dryer, thereby decreasing productivity. Where the copolyester is amorphous, the obtained chips or pellets tend to stick together at the bottom part of the hopper of the extruder, halting the extrusion operation.

Furthermore, the copolyesters obtained by the above processes (1) through (7), as well as molded articles made therefrom, do not have sufficiently high mechanical properties such as falling impact strength. While hollow molded articles such as bottles should have a falling impact strength of at least 1 m, experiments with extrusion blow molding bottles from copolyesters obtained by processes (1) through (7) show that all of the bottles had a falling impact strength of less than 1 m, thus proving to have problems for practical purposes. In particular, bottles having a capacity of 1 liter or more, which would receive a large fracture energy, tended to break readily. Bottles from the copolyesters obtained by process (6) are particularly inferior in falling impact strength, due to decrease in the mechanical properties of the copolyester as caused by copolymerization of isophthalic acid.

Separate from processes (1) through (7), the present inventors also conducted a follow-up experiment to produce by solid phase polymerization a polyethylene terephthalate having a high degree of polymerization. It was found that the rate of the solid phase polymerization was very low, so that it was impossible to efficiently produce in a short period of time a polyethylene terephthalate having a sufficiently high degree of polymerization and melt viscosity suitable for extrusion blow molding and similar processes. This method is hence not applicable in practice from the viewpoint of productivity.

In view of the above, various attempts have been made to create new copolyesters based on polyethylene terephthalate, while centering on the above-described high performance of polyester resins and their ever-developing end-uses, in particular those related to extrusion blow molding to produce large-size hollow articles. One of the attempts has succeeded in obtaining a high-polymerization degree polyester in a short period of time by the following process. The process comprises esterifying a dicarboxylic acid component comprising terephthalic acid and a diol component comprising ethylene glycol and a small amount of bisphenol A ethylene oxide adduct, then conducting polymerization in a melted state to obtain a prepolymer, and subjecting the prepolymer to solid phase polymerization. This polyester exhibits high melt viscosity on extrusion blow molding and yields hollow articles having excellent transparency and appearance. See Japanese Patent Application Laid-open Nos. 99476/1994 and 258396/1995.

SUMMARY OF THE INVENTION

Accordingly, one object of the present invention is to solve the above problems and provide a polyester having the following properties:

(1) sufficiently high melt viscosity, thereby causing the extruded parison to undergo no drawdown and be smoothly shaped into hollow articles, on extrusion blow molding;

(2) low crystallization rate, so that the parison extruded forms no spherulites and the obtained extrusion blow molded articles and like molded articles to suffer no whitening and thus have good transparency;

(3) not causing, on molding large-size hollow articles by extruding long parisons having a length of 30 cm or more, the bottom part of the parisons to undergo solidification, so that the obtained bottles and like shaped articles do not suffer poor sealing of the pinch-off part at the bottom of the article;

(4) capable of yielding various molded articles having excellent appearance and tactility with no finely roughened surface;

(5) forming only few unmelted crystals or gels resulting from over-crosslinkage, thus capable of yielding molded articles having no spots or agglomerates and having good transparency and appearance;

(6) capable of yielding molding articles with excellent impact strength; and (7) having a high rate of solid phase polymerization and good productivity;

thus having excellent melt moldability, in particular extrusion melt moldability and being capable of yielding, at high precision and smoothly, high-quality molded articles having good dimensional stability, size precision, appearance, tactility and transparency.

Another object of the present invention is to provide a process for producing, with short process time and good productivity, a polyester having the above excellent properties.

Yet another object of the present invention is to provide a process for producing shaped articles by melt molding, in particular extrusion blow molding, the polyester having the above excellent properties.

Yet another object of the present invention is to provide molded articles by the above molding process.

DETAILED DESCRIPTION OF THE PREFERRED EMBODIMENT

With the foregoing in mind, the present inventors have carried out extensive research. It was found that solid phase polymerization of a polyester principally comprising terephthalic acid units and ethylene glycol units and specific amounts of units from a particular bifunctional compound, units from a particular tri- or more multifunctional compound, and units from a particular monofunctional compound can yield, in as short a period of time as with the process of the above Japanese Patent Application Laid-open Nos. 99476/1994 and 258396/1995, a copolyester having a high degree of polymerization and having the non-Newtonian properties of high viscosity at low shear rates and low viscosity at high shear rates. The copolyester can be melt molded by various processes more smoothly than by the processes of the above Japanese Patent Application Laid-open Nos. 99476/1994 and 258396/1995. The copolyester is particularly suitable for processing by extrusion blow molding of a long parison having a length of 30 cm or more into large-size hollow articles. The copolyester has a sufficiently high melt viscosity on extrusion blow molding, thereby causing no drawdown of extruded parison and smoothly yielding hollow articles having excellent transparency, color shade appearance and tactility.

It was also found that this copolyester developed by the present inventors has a low crystallization rate and, on extrusion of a parison during extrusion blow molding, forms no spherulites. The obtained blow molded articles then suffer no whitening and have excellent transparency. On extrusion of a long parison having a length of 30 cm or more to produce large-size hollow articles, the parison does not undergo solidification by crystallization at its lower part and no poor sealing is caused at the pinch-off part of the bottom part of the resulting bottles or other such shaped articles. It has further been found that the copolyester exhibits appropriate shear stress on melt molding, yielding shaped articles having excellent appearance and tactility with no surface roughening. Because the degree of crosslinkage of the copolyester is well adjusted, the obtained molded articles do not have gels caused by over-crosslinkage and thus have excellent transparency and also have good mechanical properties.

The present inventors have also found that the copolyester, having a high rate of solid phase polymerization, can be produced economically and with good productivity. The inventors completed the invention based on these findings.

The present invention provides a copolyester (hereinafter "copolyester (A)") consisting essentially of terephthalic acid units, ethylene glycol units, and i) 1 to 4 mole %, based on the total moles of constituent units of said copolyester, of at least one group of units ($a_1$) from an alicyclic or aliphatic bifunctional compound selected from the group consisting of alicyclic or aliphatic dicarboxylic acids, hydroxycarboxylic acids and diols other than ethylene glycol;

ii) 0.005 to 1 mole %, based on the total moles of constituent units of said copolyester, of units ($b_1$) from at least one multifunctional compound having at least 3 carboxyl groups, hydroxyl groups and/or ester-forming groups thereof; and iii) units (c) from at least one monofunctional compound selected from the group consisting of monocarboxylic acids and monohydric alcohols, and/or ester-forming derivatives thereof, in amounts satisfying the following formula ($\alpha$):

$$\{20 \times (p-2) \times b_1\} \geq c \geq \{0.1 \times (p-2) \times b_1\} \quad (\alpha)$$

wherein:

$b_1$ = content (mole %) of units ($b_1$)
c = content (mole %) of units (c)
p = average number of functional groups of said multifunctional compound deriving units ($b_1$).

The present invention also provides a process for producing copolyester (A), which comprises:

1) esterifying or transesterifying starting materials comprising a dicarboxylic acid component comprising terephthalic acid or ester-forming derivatives thereof, and a diol component comprising ethylene glycol, said starting materials further comprising:

a) at least one alicyclic or aliphatic bifunctional compound selected from the group consisting of alicyclic or aliphatic dicarboxylic acids, hydroxycarboxylic acids, and ester-forming derivatives thereof, and alicyclic or aliphatic diols other than ethylene glycol;

b) at least one multifunctional compound having at least 3 carboxyl groups, hydroxyl groups, and/or ester-forming groups thereof; and c) at least one monofunctional compound selected from the group consisting of monocarboxylic acids, monohydric alcohols, and ester-forming derivatives thereof;

wherein the content of said alicyclic or aliphatic bifunctional compound in said starting materials is such that the ratio between units ($a_1$) from said alicyclic or aliphatic bifunctional compound and the total constituent units of the resulting copolyester is 1 to 4 mole %, based on the moles of the total constituent units;

wherein the content of said multifunctional compound in said starting materials is such that the ratio between units ($b_1$) from said multifunctional compound and the total constituent units of the resulting copolyester is 0.005 to 1 mole %, based on the moles of the total constituent units; and wherein the content of said monofunctional compound in said starting materials is such that the ratio between units (c) from said monofunctional compound and the total constituent units of the resulting copolyester based on the moles of total constituent units satisfies the following formula (α):

$$\{20\times(p-2)\times b_1\} \geq c \geq \{0.1\times(p-2)\times b_1\} \quad (\alpha)$$

wherein:
$b_1$=content (mole %) of units ($b_1$) from said multifunctional compound in the resulting copolyester
$c$=content (mole %) of units (c) from said monofunctional compound in the resulting copolyester
$p$=average number of functional groups of said multifunctional compound deriving units ($b_1$);

2) melt polycondensing the ester obtained in step (1) above to prepare a polyester prepolymer; and 3) solid phase polymerizing said polyester prepolymer.

The present invention further provides a copolyester (hereinafter "copolyester (B)") consisting essentially of terephthalic acid units, ethylene glycol units, and i) 0.5 to 7 mole %, based on the total moles of constituent units of said copolyester, of at least one group of bifunctional compound units ($a_2$) selected from the group consisting of:
a) diol units (I) of the following formula:

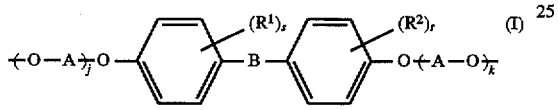

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4; and
b) diol units (II) of the following formula:

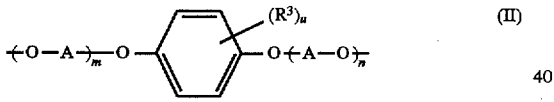

wherein A is —$CH_2CH_2$— or —$CH(CH_3)CH_2$—, $R^3$ is an inert substituent, m and n are each, independently, an integer of 0 to 8, and u is an integer of 0 to 4;

ii) 0.005 to 1 mole %, based on the total moles of constituent units of said copolyester, of multifunctional compound units ($b_1$) derived from at least one multifunctional compound having at least 3 carboxyl groups, hydroxyl groups, and/or ester-forming groups thereof; and iii) monofunctional compound units (c) derived from at least one monofunctional compound selected from the group consisting of monocarboxylic acids, monohydric alcohols, and ester-forming derivatives thereof, in an amount satisfying the following formula (α):

$$\{20\times(p-2)\times b_1\} \geq c \geq \{0.1\times(p-2)\times b_1\} \quad (\alpha)$$

wherein:
$b_1$=content (mole %) of units ($b_1$)
$c$=content (mole %) of units (c)
$p$=average number of functional groups of said multifunctional compound deriving units ($b_1$);

The present invention still further provides a process for producing the above copolyester (B), which comprises the steps of:

1) esterifying or transesterifying starting materials consisting essentially of a dicarboxylic acid component comprising terephthalic acid or ester-forming derivatives thereof and a diol component comprising ethylene glycol, said starting materials further comprising:
i) at least one bifunctional compound selected from the group consisting of:
a) diols (III) of the following formula:

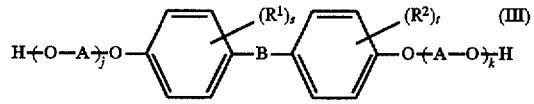

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4;
b) diols (IV) of the following formula:

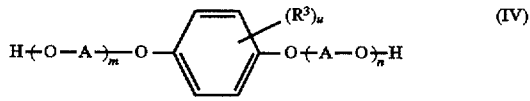

wherein A is —$CH_2CH_2$— or —$CH(CH_3)CH_2$—, $R^3$ is an inert substituent, m and n are each, independently, an integer of 0 to 8, and u is an integer of 0 to 4; and
c) ester-forming derivatives of (a) and (b) above;
ii) at least one multifunctional compound having at least 3 carboxyl groups, hydroxyl groups, and/or ester-forming groups thereof; and
iii) at least one monofunctional compound selected from the group consisting of monocarboxylic acids, monohydric alcohols, and ester-forming derivatives thereof;
wherein the content of said bifunctional compound in said starting materials is such that the ratio between diol units (I) and/or diol units (II), and the total constituent units of the resulting copolyester is 0 5 to 7 mole %, based on the moles of the total constituent units;
wherein the content of said multifunctional compound in said starting materials is such that the ratio between units ($b_1$) from said multifunctional compound and the total constituent units of the resulting copolyester is 0.005 to 1 mole %, based on the moles of the total constituent units; and
wherein the content of said monofunctional compound in said starting materials is such that the ratio between units (c) from said monofunctional compound and the total constituent units of the resulting copolyester based on the moles of the total constituent units satisfies the following formula (α):

$$\{20\times(p-2)\times b_1\} \geq c \geq \{0.1\times(p-2)\times b_1\} \quad (\alpha)$$

wherein:
$b_1$=content (mole %) of units ($b_1$) from said multifunctional compound in the resulting copolyester
$c$=content (mole %) of units (c) from said monofunctional compound in the resulting copolyester
$p$=average number of functional groups of said multifunctional compound deriving units ($b_1$);

2) melt polycondensing the ester obtained in step 1) to prepare a polyester prepolymer; and 3) solid phase polymerizing said polyester prepolymer.

The present inventors then found that, with copolyesters (B), selecting units from a specific component as the multifunctional compound units and adjusting the content of the units and intrinsic viscosity can, without the monofunctional units (c), give a copolyester having the same excellent properties, in particular extrusion blow moldability, as those of copolyester (B).

Thus, the present invention yet further provides a copolyester (hereinafter "copolyester (C)") consisting essentially of terephthalic acid units, ethylene glycol units, and i) 0.5 to 7 mole %, based on the total moles of constituent units of said copolyester, of at least one group of bifunctional compound units ($a_2$) selected from the group consisting of:

a) diol units (I) of the following formula:

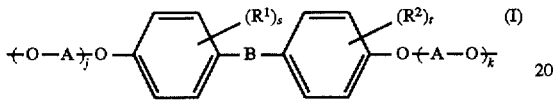

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4; and b) diol units (II) of the following formula:

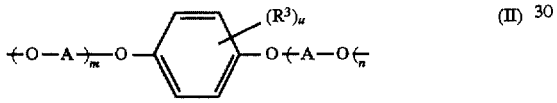

wherein A is —$CH_2CH_2$— or —$CH(CH_3)CH_2$—, $R^3$ is an inert substituent, m and n are each, independently, an integer of 0 to 8, and u is an integer of 0 to 4; and ii) 0.005 to 0.5 mole %, based on the total moles of constituent units of said copolyester, of multifunctional compound units ($b_2$) derived from at least one multifunctional compound having at least 3 carboxyl groups, hydroxyl groups, and/or ester-forming groups thereof, at least one of said groups being carboxyl group or ester-forming group thereof;

wherein said copolymer has an intrinsic viscosity of 1.0 to 1.4 dl/g.

The present invention yet further provides a process for producing copolyester (C), which comprises:

1) esterifying or transesterifying starting materials comprising a dicarboxylic acid component comprising terephthalic acid or ester-forming derivatives thereof and a diol component comprising ethylene glycol, said starting materials further comprising:

i) at least one bifunctional compound selected from the group consisting of:

a) diols (III) of the following formula:

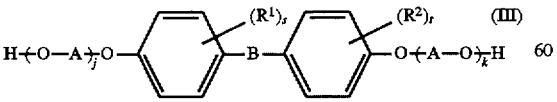

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4;

b) diols (IV) of the following formula:

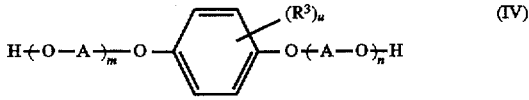

wherein A is —$CH_2CH_2$— or —$CH(CH_3)CH_2$—, $R^3$ is an inert substituent, m and n are each, independently, an integer of 0 to 8, and u is an integer of 0 to 4; and c) ester-forming derivatives of a) and b) above; and ii) at least one multifunctional compound having at least 3 carboxyl groups, hydroxyl groups, and/or ester-forming groups thereof, at least one of said groups being carboxyl group or ester-forming groups thereof;

wherein the content of said bifunctional compound in said starting materials is such that the ratio between diol units (I) and/or diol units (II), and the total constituent units of the resulting copolyester is 0.5 to 7 mole %, based on the moles of the total constituent units; and wherein the content of said multifunctional compound in said starting materials is such that the ratio between units ($b_2$) from said multifunctional compound and the total constituent units of the resulting copolyester is 0.005 to 0.5 mole %, based on the moles of the total constituent units;

2) melt polycondensing the ester obtained in step (1) to prepare a polyester prepolymer; and 3) solid phase polymerizing said polyester prepolymer.

The present invention yet further provides a copolyester (hereinafter "copolyester (D)") consisting essentially of terephthalic acid units, ethylene glycol units, and i) 0.5 to 7 mole %, based on the total moles of constituent units of said copolyester, of at least one group of bifunctional compound units ($a_2$) selected from the group consisting of:

a) diol units (I) of the following formula:

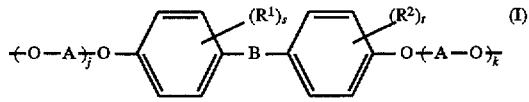

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4; and b) diol units (II) of the following formula:

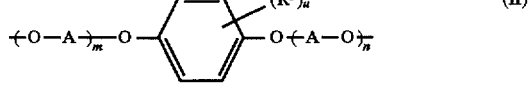

wherein A is —$CH_2CH_2$— or —$CH(CH_3)CH_2$, $R^3$ is an inert substituent, m and n are each, independently, an integer of 0 to 8, and u is an integer of 0 to 4; and ii) 0.005 to 0.5 mole %, based on the total moles of constituent units of said copolyester, of multifunctional compound units ($b_3$) derived from at least one aliphatic or alicyclic multifunctional compound having at least 3 hydroxyl groups and/or ester-forming groups thereof;

wherein said copolyester has an intrinsic viscosity of 0.8 to 1.5 dl/g.

The present invention yet further provides a process for producing copolyester (D), which comprises:

1) esterifying or transesterifying starting materials comprising a dicarboxylic acid component comprising terephthalic acid or ester-forming derivatives thereof, and a diol component comprising ethylene glycol, said starting materials further comprising:

i) at least one bifunctional compound selected from the group consisting of:

a) diols (III) of the following formula:

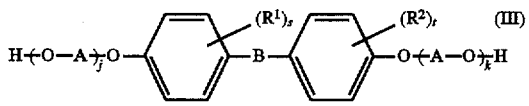

wherein A is —CH$_2$CH$_2$— or —CH(CH$_3$)CH$_2$—, B is a divalent hydrocarbon group, a carbonyl group, a sulfonyl group, an oxygen atom or a bond, R$^1$ and R$^2$ are each, independently, an inert substituent, j and k are each independently an integer of 0 to 8, and s and t are each, independently, an integer of 0 to 4;

b) diols (IV) of the following formula:

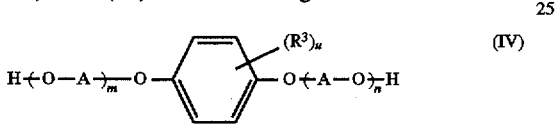

wherein A is —CH$_2$CH$_2$— or —CH(CH$_3$)CH$_2$—, R$^3$ is an inert substituent, m and n are each, independently, an integer of 0 to 8, and u is an integer of 0 to 4; and c) ester-forming derivatives of (a) and (b) above; and ii) at least one multifunctional aliphatic or alicyclic compound having at least 3 hydroxyl groups and/or ester-forming groups thereof;

wherein the content of said bifunctional compound in said starting materials is such that the ratio between diol units (I) and/or diol units (II) and the total constituent units of the resulting copolyester is 0.5 to 7 mole %, based on the moles of the total constituent units; and wherein the content of said multifunctional compound in said starting materials is such that the ratio between units (b$_3$) from said multifunctional compound and the total constituent units of the resulting copolyester is 0.005 to 0.5 mole %, based on the moles of the total constituent units;

2) melt polycondensing the ester obtained in the above step (1) to provide a polyester prepolymer; and 3) solid phase polymerizing said polyester prepolymer.

The present invention yet further provides a copolyester (hereinafter "copolyester (E)") consisting essentially of terephthalic acid units, ethylene glycol units, and i) 0.5 to 7 mole %, based on the moles of total constituent units of said copolyester, of at least one group of bifunctional compound units (a$_3$) selected from the group consisting of units from a condensed ring type aromatic dicarboxylic acid and units from a ring assembly type aromatic dicarboxylic acid;

ii) 0.005 to 1 mole %, based on the moles of total constituent units of said copolyester, of multifunctional compound units (b$_1$) derived from at least one multifunctional compound having at least 3 carboxyl groups, hydroxyl groups, and/or ester-forming groups thereof; and iii) monofunctional compound units (c) from at least one monofunctional compound selected from the group consisting of monocarboxylic acids, monohydric alcohols, and ester-forming derivatives thereof, in an amount satisfying the following formula ($\alpha$):

$$\{20\times(p-2)\times b_1\} \geq c \geq \{0.1\times(p-2)\times b_1\} \qquad (\alpha)$$

wherein:
b$_1$=content (mole %) of units (b$_1$)
c=content (mole %) of units (c)
p=average number of functional groups of said multifunctional compound deriving units (b$_1$);

The present invention yet further provides a process for producing copolyester (E), which comprises:

1) esterifying or transesterifying starting materials comprising a dicarboxylic acid component comprising terephthalic acid or ester-forming derivatives thereof, and a diol component comprising ethylene glycol, said starting materials further comprising:

a) at least one bifunctional compound selected from condensed ring type aromatic dicarboxylic acids and ring assembly type aromatic dicarboxylic acids;

b) at least one multifunctional compound having at least 3 carboxyl groups, hydroxyl groups, and/or ester-forming groups thereof; and c) at least one monofunctional compound selected from the group consisting of monocarboxylic acids, monohydric alcohols, and ester-forming derivatives thereof;

wherein the content of said bifunctional compound in said starting materials is such that the ratio between units (a$_3$) from said bifunctional compound and the total constituent units of the resulting copolyester is 0.5 to 7 mole %, based on the moles of the total constituent units;

wherein the content of said multifunctional compound in said starting materials is such that the ratio between units (b$_1$) from said multifunctional compound and the total constituent units of the resulting copolyester is 0.005 to 1 mole %, based on the moles of the total constituent units; and wherein the content of said monofunctional compound in said starting materials is such that the ratio between units (c) from said monofunctional compound and the total constituent units of the resulting copolyester based on the moles of the total constituent units satisfies the following formula ($\alpha$):

$$\{20\times(p-2)\times b_1\} \geq c \geq \{0.1\times(p-2)\times b_1\} \qquad \alpha)$$

wherein:
b$_1$=content (mole %) of units (b$_1$) from said multifunctional compound in the resulting copolyester
c=content (mole %) of units (c) from said monofunctional compound in the resulting copolyester
p=average number of functional groups of said multifunctional compound deriving units (b$_1$);

2) melt polycondensing the ester obtained in the above step (1) to prepare a polyester prepolymer; and 3) solid phase polymerizing said polyester prepolymer.

The present inventors also found that with copolyester (E), adjusting the content of the multifunctional compound units (b$_1$) can, without the monofunctional compound units (c), give a copolyester having the same excellent properties, in particular extrusion blow moldability, as those of copolyester (E).

The present invention yet further provides a copolyester (hereinafter "copolyester (F)") consisting essentially of terephthalic acid units, ethylene glycol units, and i) 0.5 to 7 mole %, based on the moles of total constituent units of said copolyester, of at least one group of bifunctional compound units ($a_3$) selected from the group consisting of units from a condensed ring type aromatic dicarboxylic acid and units from a ring assembly type aromatic dicarboxylic acid; and ii) 0.005 to 0.5 mole %, based on the moles of total constituent units of said copolyester, of multifunctional compound units ($b_1$) derived from at least one multifunctional compound having at least 3 carboxyl groups, hydroxyl groups, and/or ester-forming groups thereof.

The present invention yet further provides a process for producing copolyester (F), which comprises:

1) esterifying or transesterifying starting materials comprising a dicarboxylic acid component comprising terephthalic acid or ester-forming derivatives thereof, and a diol component comprising ethylene glycol, said starting materials further comprising:

a) at least one bifunctional compound selected from condensed ring type aromatic dicarboxylic acids and ring assembly type aromatic dicarboxylic acids; and b) at least one multifunctional compound having at least 3 carboxyl groups, hydroxyl groups, and/or ester-forming groups thereof;

wherein the content of said bifunctional compound in said starting materials is such that the ratio between units ($a_3$) from said bifunctional compound and the total constituent units of the resulting copolyester is 0.5 to 7 mole %, based on the moles of the total constituent units; and wherein the content of said multifunctional compound in said starting materials is such that the ratio between units ($b_1$) from said multifunctional compound and the total constituent units of the resulting copolyester is 0.005 to 0.5 mole % based an the moles of the total constituent units;

2) melt polycondensing the ester obtained in the above step (1) to prepare a polyester prepolymer; and 3) solid phase polymerizing said polyester prepolymer.

The present invention also relates to molded articles, in particular extrusion blow molded articles, comprising any one of copolyesters (A) through (F).

The present invention also relates to processes for producing molded articles, which comprise conducting extrusion blow molding of copolyesters (A) through (F).

Copolyesters (A) through (F) of the present invention (hereinafter sometimes referred to simply as "copolyesters of the present invention") comprise terephthalic acid units, ethylene glycol units, and further comprise other copolymerization units.

It is generally preferred that the copolyesters of the present invention contain terephthalic acid units and ethylene glycol units in an amount in total of about 70 to 98 mole %, based on the moles of total constituent units of the copolyesters, more preferably 90 to 98 mole %. When the total content of terephthalic acid units and ethylene glycol units in the copolyesters is less than 70 mole %, the copolyesters become amorphous and hence hardly achieve a high degree of polymerization by solid phase polymerization. When the total content exceeds 98 mole %, the crystals of the copolyesters cannot be melted easily, so that molded articles made therefrom tend to have many unmelted agglomerates.

Copolyester (A) of the present invention contains, in addition to terephthalic acid units and ethylene glycol units, at least one group of units ($a_1$) from an alicyclic or aliphatic bifunctional compound selected from the group consisting of alicyclic or aliphatic dicarboxylic acids, alicyclic or aliphatic diols other than ethylene glycol and alicyclic or aliphatic hydroxycarboxylic acids, in an amount of 1 to 4 mole %, based on the moles of total constituent units of copolyester (A).

For copolyester (A), it is necessary as described above that the bifunctional compound units ($a_1$) be units from an alicyclic or aliphatic compound. If, for instance, the bifunctional compound units ($a_1$) are, e.g., isophthalic acid units, hydroxybenzoic acid units, extrusion blow molding of the resulting copolyester will give molded articles, e.g., bottles, having finely roughened surfaces, which markedly impairs their appearance and tactility. In particular, the surface roughening is more severe on molding large-size bottles or like shaped articles at a throughput of 20 kg/hr or more, and the molded articles have poor impact strength.

As the alicyclic or aliphatic bifunctional compound units ($a_1$), any alicyclic or aliphatic dicarboxylic acid or diol units other than ethylene glycol units or any hydroxycarboxylic acid units may be used. Preferred examples of the units ($a_1$) from an alicyclic or aliphatic bifunctional compound are those from aliphatic dicarboxylic acids, e.g., malonic acid, succinic acid, adipic acid, azelaic acid and sebacic acid; alicyclic acids, e.g. decalindicarboxylic acid and cyclohexanedicarboxylic acid; ester-forming derivatives of the foregoing; aliphatic diols, e.g., 1,3-propanediol, tetramethylene glycol, hexamethylene glycol, neopentyl glycol and 2-butyl-2-ethyl-propanediol; alicyclic diols, e.g. cyclohexanedimethanol; hydroxycarboxylic acids (lactonic acids), e.g. glycolic acid, hydroxyacrylic acid and hydroxypropionic acid; and ester-forming derivatives of the foregoing. Copolyester (A) of the present invention may contain as the alicyclic or aliphatic bifunctional compound units ($a_1$), one of the above structural units, or two or more thereof.

For copolyester (A) of the present invention, if the alicyclic or aliphatic acid units ($a_1$) are cylcohexanedimethanol units and/or cyclohexanedicarboxylic acid units, copolyester (A) is readily producible and provides molded articles having higher impact strength.

The term "cyclohexanedimethanol units" herein means at least one group of units selected from the group consisting of 1,2-cyclohexanedimethanol units, 1,3-cyclohexanedimethanol units and 1,4-cyclohexanedimethanol units.

The term "cyclohexanedicarboxylic acid units" means at least one group of units selected from the group consisting of 1,2-cyclohexanedicarboxylic acid units, 1,3-cyclohexanedicarboxylic acid units and 1,4-cyclohexanedicarboxylic acid units. Preferred as the alicyclic or aliphatic bifunctional compound units ($a_1$) are 1,4-cyclohexane-dimethanol units and/or 1,4-cyclohexanedicarboxylic acid units, which are readily available and which provide copolyester (A) and molded articles therefrom with still higher impact strength.

For copolyester (A) of the present invention, it is necessary that the alicyclic or aliphatic bifunctional compound units ($a_1$) be contained in an amount (when 2 or more groups of units from alicyclic or aliphatic compounds are contained, the sum of these units) of 1 to 4 mole %, based on the moles of total constituent units of copolyester (A).

If less than 1 mole % of the bifunctional compound units ($a_1$) is contained, the resulting copolyester will have too high a crystallization rate, thereby generating spherulites on melt molding, causing whitening and impairing the transparency of molded articles therefrom. Further, on molding large-size hollow articles requiring extrusion of a long parison having a length of at least 30 cm, the bottom part of the parison solidifies at an early stage due to crystallization, so that the pinch-off part at the bottom of bottles or like molded articles is poorly sealed. On melt molding, too high a crystallinity also causes molded articles to form unmelted agglomerates and to have poor appearance.

If the content of the alicyclic or aliphatic bifunctional compound units ($a_1$) exceeds 4 mole %, the resulting copolyester will have too low a melting point and hence will not undergo solid phase polymerization. If solid phase polymerization can ever be conducted in this case, the rate of solid phase polymerization will be extremely low, so that the degree of polymerization cannot increase to desirable levels and the copolyester and molded articles obtained therefrom have poor mechanical strength.

The content of alicyclic or aliphatic bifunctional compound units ($a_1$) in copolyester (A) is preferably in the range of 2 to 4 mole %, based on the moles of total constituent units of copolyester (A). This range insures that copolyester (A) can be produced at high productivity and that copolyester (A) exhibits a sufficiently high melt viscosity, thereby undergoing melt molding such as extrusion blow molding more smoothly and yielding molded articles having still better transparency and mechanical properties.

Copolyesters (B) through (D) of the present invention contain, in addition to terephthalic acid units and ethylene glycol units, at least one group of bifunctional compound units ($a_2$) selected from the group consisting of diol units each represented by the above general formula (I) and diol units each represented by the above general formula (II), in an amount of 0.5 to 7 mole %, based on the moles of total constituent units of the copolyesters. If the bifunctional compound units ($a_2$) are, e.g., isophthalic acid units, hydroxybenzoic acid units, the resulting copolyester will give, when extrusion blow molded, bottles and like molded articles having finely roughened surface, which markedly impairs their appearance and tactility. In particular, on molding large-size bottles or like shaped articles at a throughput of 20 kg/hr or more, the surface roughening is more severe and the molded articles have poor impact strength.

In the diol units (I) and/or diol units (II) of copolyesters (B) through (D) of the present invention, group A is —$CH_2CH_2$— (ethylene group) or $CH(CH_3)CH_2$—(1,2-propylene group). With copolyesters (B) through (D) of the present invention and with the diol units (I) and/or diol units (II) contained therein, all of the group A may be —$CH_2CH_2$—, all of the group A may be $CH(CH_3)CH_2$—, or part of the group A may be —$CH_2CH_2$— and the rest $CH(CH_3)CH_2$—. Preferably, the group A in the diol units (I) and/or diol units (II) in copolyesters (B) through (D) are —$CH_2CH_2$—, in view of ease of production and production cost.

Group B in the diol units (I) is a divalent hydrocarbon group, a carbonyl group, a sulfonyl group, an oxygen atom or a bond. Where group B is a divalent hydrocarbon group, the group is preferably an alkylene group or alkylidene group having 1 to 8 carbon atoms, or a divalent aromatic group. Examples of such divalent hydrocarbon groups include, but are not limited to methylene, dichloromethylene, ethylene, ethylidene, 1,2-propylene, propylidene, trimethylene, isopropylidene, butylidene, ethylethylene, tetramethylene, 1-methylpropylidene, 1,2-dimethylethylene, pentylidene, 1-methylbutylidene, pentamethylene, 1-ethyl-2-methylethylene, 1,3-dimethyltrimethylene, 1-ethylpropylidene, trimethylethylene, isopropylmethylene, 1-methylbutylidene, 2,2-dimethylpropylidene, hexamethylene, 1-ethylbutylidene, 1,2-diethylethylene, 1,3-dimethylbutylidene, ethyltrimethylethylene, heptamethylene, octamethylene, 1,1-cyclopentylidene, 1,1-cyclohexylidene, 1,1-cycloheptylidene, 1,1-cyclooctylidene, benzylidene and 1-phenylethylidene.

In copolyesters (B) through (D), group B contained in diol units (I) present in the copolyesters may be the same or different. Among the above, group B in the diol units (I) of copolyesters (B) through (D) of the present invention is preferably isopropylidene, sulfonyl group, and/or 1,1-cyclohexylidene, which provide good thermal stability of the copolyesters on melting.

In copolyesters (B) through (D) of the present invention, j, k, m and n in the diol units (I) and/or diol units (II) are each independently an integer of 0 to 8. j, k, m and n may therefore be the same or different. Preferably, j, k, m and n be each independently are an integer of 1 or 2, more preferably each an integer of 1, which ensures easy production of the copolyesters, good thermal stability of the copolyesters on melting and good color shade of molded articles obtained from the copolyesters.

In diol units (I) and/or diol units (II) of copolyesters (B) through (D) of the present invention, the benzene ring may be substituted with an inert substituent ($R^1$ through $R^3$). Preferred examples of the inert substituent $R^1$, $R^2$ and $R^3$ are lower alkyl groups, e.g. methyl, ethyl and propyl, and halogen atoms, e.g., chlorine, bromine and iodine. With diol units (I) and/or diol units (II), s, t and u, which represent the number of inert substituents, are each preferably 0 to 2, more preferably 0.

Examples of the diol units (i) which may constitute copolyesters (B) through (D) of the present invention are, although any of the above diol units may be used, from 2,2-bis[4-(2-hydroxyethoxy)phenyl]propane, 2-{4-[2-(2-hydroxyethoxy)ethoxy]phenyl}-2-[4'-(2-hydroxyethoxy)phenyl]propane, 2,2 -bis {4-[2-(2-hydroxyethoxy)ethoxy]phenyl}propane, bis [4-(2-hydroxyethoxy)phenyl]sulfone, {4-[2-(2-hydroxyethoxy)ethoxy]phenyl }-[4'-(2-hydroxyethoxy)phenyl]sulfone, bis {4-[2'-(2-hydroxyethoxy)ethoxy]phenyl}sulfone, 1,1-bis [4-(2-hydroxyethoxy)phenyl]cyclohexane, 1-{4-[2-(2-hydroxyethoxy)ethoxy]phenyl}-1-[4'-(2-hydroxyethoxy)phenyl]cyclohexane, 1,1-bis{4-[2-(2-hydroxyethoxy)ethoxy]phenyl}cyclohexane and 2,2 -bis [4-(2-hydroxyethoxy)-2,3,5,6-tetrabromophenyl]propane. Among these, 2,2-bis[4-(2-hydroxyethoxy)phenyl]propane units or bis [4-(2-hydroxyethoxy)phenyl]sulfone units are preferably used as the diol units (I), in view of ease of production of the copolyesters, good thermal stability of the copolyesters on melting, and good color shade of molded articles obtained from the copolyesters.

Preferred examples of the diol units (II) which may constitute copolyesters (B) through (D) of the present invention are, while any of the above diol units may be used, 1,4-bis(2-hydroxyethoxy)benzene, 1-(2-hydroxyethoxy)-4-[2-(2-hydroxyethoxy)ethoxy]benzene and 1,4-bis[2-(2-hydroxyethoxy)ethoxy]benzene. Among these, 1,4-bis(2-hydroxyethoxy)benzene is more preferred, since this leads to easy production of the copolyesters, higher melt stability of the copolyesters and good color shade of molded articles made therefrom.

Copolyesters (B) through (D) of the present invention may contain either one or both of the above diol units (I) and (II).

For copolyesters (B) through (D) of the present invention, it is necessary that the diol units (I) and/or diol units (II) be present, as described above, in an amount (when 2 or more groups of diol units (I) and/or diol units (II) are contained, the sum of these units) of 0.5 to 7 mole %, based on the moles of total constituent units of the copolyester. If less than 0.5 mole % of diol units (I) and/or diol units (II) is present, the resulting copolyester will have too high a crystallization rate, thereby generating spherulites on melt molding, which cause whitening to impair the transparency of molded articles obtained therefrom. Further, on molding large-size hollow articles requiring extrusion of along parison having a length of at least 30 cm, the bottom of the parison solidifies at an early stage due to crystallization, so that the pinch-off part at the bottom of bottles or like molded articles is poorly sealed. Too high a crystallinity also causes molded articles to form unmelted agglomerates and to have poor appearance on melt molding.

If the content of diol units (I) and/or diol units (II) exceeds 7 mole %, the resulting copolyester will have too low a melting point and hence unable to undergo solid phase polymerization. If solid phase polymerization can ever be conducted in this case, the rate of solid phase polymerization will be extremely low, so that the degree of polymerization cannot be increases to desirable levels and the copolyester and molded articles obtained therefrom have poor mechanical strength.

The content of diol units (I) and/or diol units (II) in copolyesters (B) through (D) is preferably in a range of 1.5 to 5 mole %, based on the moles of total constituent units of copolyesters (B) through (D). This range insures that the resulting copolyesters can be produced at high productivity and that the copolyesters exhibit a sufficiently high melt viscosity, thereby undergoing melt molding such as extrusion blow molding more smoothly and yielding molded articles having still better transparency and mechanical properties.

Copolyesters (E) and (F) of the present invention contain, in addition to terephthalic acid units and ethylene glycol units, at least one group of units ($a_3$) from a bifunctional compound selected from the group consisting of condensed ring type aromatic dicarboxylic acids and ring assembly type aromatic dicarboxylic acids, in an amount of 0.5 to 7 mole %, based on the moles of total constituent units of the copolyesters. If, e.g., the bifunctional compound units ($a_3$) are isophthalic acid units, hydroxybenzoic acid units, the resulting copolyester, when extrusion blow molded, yields bottles and like molded articles having finely roughened surface, which markedly impairs their appearance and tactility. In particular, on molding large-size bottles or like shaped articles at a throughput of 20 kg/hr or more, the surface roughening is more severe and the molded articles have poor impact strength.

Examples of units from a condensed ring type aromatic dicarboxylic acid which may constitute the bifunctional compound units ($a_3$) are 1,4-naphthalenedicarboxylic acid, 2,3-naphthalenedicarboxylic acid, 2,6-naphthalenedicarboxylic acid, 2,7-naphthalenedicarboxylic acid, 1,6-phenanthrenedicarboxylic acid, 2,7-phenanthrenedicarboxylic acid, 3,6-indoledicarboxylic acid, and ester-forming derivatives thereof. Among these, 2,6-naphthalenedicarboxylic acid is preferred in view of productivity and production cost.

Examples of units from a ring assembly type aromatic dicarboxylic acid which may constitute the bifunctional compound units ($a_3$) are those from 4,4'-biphenyldicarboxylic acid, 3,4'-biphenyldicarboxylic acid, and ester-forming derivatives thereof. Among these, 4,4'-biphenyldicarboxylic acid is preferred in view of productivity and production cost.

For copolyesters (E) and (F) of the present invention, it is necessary that the bifunctional compound units ($a_3$) be contained in an amount of 0.5 to 7 mole %, based on the moles of total constituting units of the copolyesters. If less than 0.5 mole % of the bifunctional compound units ($a_3$) is contained, the resulting copolyesters will have too high a crystallization rate, thereby generating spherulites on melt molding, which cause whitening to impair the transparency of molded articles therefrom. Further, on molding large-size hollow articles requiring extrusion of a long parison having a length of at least 30 cm, the bottom part of the parison solidifies at an early stage due to crystallization, so that the pinch-off part at the bottom of bottles or like molded articles are poorly sealed. Too high a crystallinity also causes molded articles to form unmelted agglomerates and to have poor appearance on melt molding.

If the content of the bifunctional compound units ($a_3$) exceeds 7 mole %, the resulting copolyesters will have too poor crystallizability and too low a melting point and hence will not undergo solid phase polymerization. If solid phase polymerization can ever be conducted in this case, the rate of solid phase polymerization will be extremely low, so that the degree of polymerization cannot be increased to desirable levels and the copolyesters and molded articles obtained therefrom have poor mechanical strength.

The content of the bifunctional compound units ($a_3$) in copolyesters (E) and (F) is preferably in a range of 1.5 to 5 mole %, based on the moles of total constituent units of the copolyesters. This range insures that the resulting copolyesters can be produced at high productivity and that the copolyesters exhibit a sufficiently high melt viscosity, thereby undergoing melt molding such as extrusion blow molding more smoothly and yielding molded articles having still better transparency and mechanical properties.

During production of the copolyesters of the present invention, diethylene glycol (the dimer of ethylene glycol) forms as a by-product in small amounts, so that small amounts of diethylene glycol units are contained in the resulting copolyesters. Presence of a large amount of diethylene glycol units in the copolyesters decreases their glass transition temperature, thereby worsening the thermal stability and discoloration. Molded articles from such copolyesters will have poor heat resistance, mechanical properties and color shade. Preferably, the content of diethylene glycol units in the copolyesters is minimized. The content is preferably less than 1.5 mole %, based on the moles of total constituent units of the copolyesters, more preferably not more than 1.4 mole %, and most preferably not more than 1.3 mole %. Units from polyalkylene glycols such as polyethylene glycol also cause similar problems to the copolyesters and are hence preferably not contained in the copolyesters of the present invention. The above content of 1 to 4 mole % of the alicyclic or aliphatic bifunctional compound units ($a_1$) in copolyester (A) therefore means the value excluding that of diethylene glycol units and polyalkylene glycol units.

Copolyesters (A), (B) and (E) of the present invention contain multifunctional compound units ($b_1$) derived from at least one multifunctional compound having at least 3 carboxyl groups, hydroxyl groups, and/or ester-forming groups thereof, in an amount (when 2 or more groups of multifunctional compound units are contained, the sum of these units) of 0.005 to 1 mole %, based on the moles of total constituent units of the copolyesters. If less than 0.005 mole % of the multifunctional compound units ($b_1$) is present, the resulting copolyesters will not have sufficiently high melt viscosity and hence will not exhibit non-Newtonian properties, thereby having poor moldability on melt molding, e.g., extrusion blow molding. In particular, for extrusion blow molding, extruded parisons will sag severely and generate clogging or even collapse, so that hollow molded articles having good shape cannot be produced.

Further when the content of the multifunctional compound units ($b_1$) is less than 0.005 mole %, the rate of solid phase polymerization on producing the copolyesters is very low, so that productivity of the copolyesters decreases. If the content of the multifunctional compound units ($b_1$) exceeds 1 mole %, the resulting copolyesters will have too much crosslinkage, which causes gels to form. The resulting molded articles suffer from agglomerate generation and whitening, thereby impairing the transparency, appearance and tactility. One may attempt to decrease the degree of polymerization in order not to cause generation of gels, but this leads to a decrease in the level of intermolecular entanglement and thus to poor mechanical properties. Further with the content of the multi-functional units ($b_1$) exceeding 1 mole %, the crystallization rate is too high on producing molded articles, so that spherulites generate, whitening the molded articles and impairing transparency. In this case, the shapability worsens and on extrusion blow molding, parisons tend to crystallize and impair the blow moldability.

The content of the multifunctional compound units ($b_1$) in copolyesters (A), (B) and (E) is preferably in the range of 0.01 to 0.5 mole %, based on the moles of total constituent units of the copolyesters. This range insures that the resulting copolyesters exhibit a sufficiently high melt viscosity, thereby undergoing melt molding such as extrusion blow molding more smoothly, preventing molded articles therefrom from whitening and poor shaping and providing them with still better mechanical properties.

The multifunctional compound units ($b_1$) may be, with no specific limitation, any group of units from a multifunctional compound having at least 3 groups selected from the group consisting of carboxyl groups, hydroxyl groups, and ester-forming groups thereof. The multifunctional compound to derive the multifunctional compound units ($b_1$) may have at least 3 carboxyl groups only, at least 3 hydroxyl groups only or at least 3 groups of carboxyl groups and hydroxyl groups in combination.

Preferred examples of the multifunctional compound units ($b_1$) are units from aromatic carboxylic acids, e.g., trimesic acid, trimellitic acid, 1,2,3-benzenetricarboxylic acid, pyromellitic acid and 1,4,5,8-naphthalenetetracarboxylic acid; aromatic polyhydric alcohols, e.g., 1,3,5-trihydroxybenzene; aliphatic polyhydric alcohols, e.g., trimethylolpropane, trimethylolethane, pentaerythritol, glycerin, 1,2,4-butanetriol and 3-methyl-1,3,5-pentanetriol; alicyclic polyhydric alcohols, e.g., 1,3,5-cyclohexanetriol, 1,2,4-cyclohexanetrimethanol, 1,3,5-cyclohexanetrimethanol, 1,2,4,5-cyclohexanetetramethanol, 1,3,7-decalinetrimethanol and 2,3,6-decalinetrimethanol; aromatic hydroxycarboxylic acids, e.g., 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechoic acid, gallic acid and 2,4-dihydroxyphenylacetic acid; aliphatic hydroxycarboxylic acids, e.g., tartaric acid and malic acid; and ester-forming derivatives of the foregoing. Copolyesters (A), (B) and (E) of the present invention may either contain only one group of the above multifunctional compound units ($b_1$) or 2 or more thereof.

Preferably, copolyesters (A), (B) and (E) of the present invention contain, as the multifunctional compound units ($b_1$), units from at least one multifunctional compound selected from trimellitic acid, pyromellitic acid, trimesic acid, trimethylolpropane and pentaerythritol, for ease of use and low cost of production of the copolyesters. Trimellitic acid units and trimesic acid units are particularly preferred, since these units suppress gelation.

Copolyesters (A), (B) and (E) of the present invention further contain, in addition to the above-described bifunctional compound units ($a_1$), ($a_2$) or ($a_3$) and the multifunctional compound units ($b_1$), monofunctional compound units (c) derived from at least one monofunctional compound selected from monocarboxylic acids, monohydric alcohols, and ester-forming derivatives thereof.

In copolyesters (A), (B) and (E), the monofunctional compound units (c) act as terminating compound units and block the molecular chain terminal and/or branched chain terminal of the copolyesters, thereby preventing the copolyesters from generating excess crosslinkage and gels. Examples of the monofunctional compound units (c) include, but are not limited to any group of units from at least one member selected from the group consisting of monocarboxylic acids, monohydric alcohols, and ester-forming derivatives thereof.

Preferred examples of the monofunctional compound units (c) are units from aromatic monocarboxylic acids, e.g., benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthaleneacetic acid and 2-naphthalenecarboxylic acid; aliphatic monocarboxylic acids, e.g., n-octanoic acid, n-nonanoic acid, myristic acid, pentadecanoic acid, stearic acid, oleic acid, linoleic acid and linolenic acid; ester-forming derivatives of these monocarboxylic acids; aromatic monohydric alcohols, e.g., benzyl alcohol, 2,5-dimethylbenzyl alcohol, 2-phenethyl alcohol, phenol, 1-naphthol and 2-naphthol; and aliphatic or alicyclic monohydric alcohols, e.g., pentadecyl alcohol, stearyl alcohol, polyethylene glycol monoalkyl ethers, polypropylene glycol monoalkyl ethers, polytetramethylene glycol monoalkyl ethers, oleyl alcohol and cyclododecanol. These groups of units may either be contained singly or in combinations of 2 or more as the monofunctional compound units (c) copolyesters (A), (B) and (E) of the present invention.

It is desirable that copolyesters (A), (B) and (E) of the present invention contain as the monofunctional compound units (c), among the above examples, at least one group of units from a monofunctional compound selected from benzoic acid, 2,4,6-trimethoxy-benzoic acid, 2-naphthoic acid, stearic acid and stearyl alcohol, for ease and low cost of production of the copolyesters.

It is necessary that copolyesters (A), (B) and (E) of the present invention contain the above monofunctional compound units (c) in such an amount (when 2 or more monofunctional compound units (c) are contained, the sum of these units) based on the moles of total constituent units of the copolyesters as to satisfy the following formula (α)

$$\{20 \times (p-2) \times b_1\} \geq c \geq \{0.1 \times (p-2) \times b_1\} \tag{α}$$

wherein:

$b_1$=content (mole %) of units ($b_1$) from the multifunctional compound in the copolyesters c=content (mole %) of units (c) from the monofunctional compound in the copolyesters p=average number of functional groups of the multifunctional compound deriving the units ($b_1$).

In the above formula (α), the average number of functional groups p of a multifunctional compound deriving the multifunctional compound units ($b_1$) means the average number of the functional groups of total multifunctional compounds used for producing the copolyesters. For example, where only a trifunctional compound is used as the multifunctional compound, p=3. Where a trifunctional compound and a tetrafunctional compound are used in a molar ratio of 50:50, p=3×0.5+4×0.5=3.5. Where the above two are used in a molar ratio of 20:80, p=×0.2+4×0.8=3.8.

Another example, which is not limiting, of the multifunctional compound units ($b_1$) are trifunctional compound units derived from a trifunctional compound, wherein the content of the multifunctional compound units ($b_1$) in the copolyester is 0.1 mole %. This means that, in the above formula (α), p=3 and $b_1$=0.1 (mole %) and hence the formula is 2 (mole %)≧c≧0.01 (mole %). Thus the necessary range of the content of the monofunctional compound units (c) is 0.01 to 2 mole %, based on the moles of total constituent units of the copolyester.

If the content of the monofunctional compound units (c) in copolyesters (A), (B) and (E) is less than the lower limit, i.e., {0.1×(p−2)×$b_1$} (mole %), of the formula (α), the resulting copolyesters will have over-crosslinkage. Such copolyesters tend to generate gels on melt molding, so that the obtained molded articles sometimes suffer from of generation of agglomerates and whitening, and hence have poor appearance and transparency.

If the content of the monofunctional compound units (c) in the copolyesters exceeds the upper limit, i.e., {20×(p−2)×$b_1$} (mole %), of the formula (α), the rate of solid phase polymerization on producing the copolyesters tends to be low, so that their productivity sometimes decreases. It is preferable that the content of the monofunctional compound units (c) in copolyesters (A), (B) and (E) be in a range satisfying:

$$\{10\times(p-2)\times b_1\} \geq c \geq \{0.5\times(p-2)\times b_1\}.$$

In copolyester (B), the monofunctional compound units (c) are not always necessary. In other words, some copolyesters can exhibit the same excellent properties without the monofunctional compound units (c), in particular extrusion blow moldability, as those of the copolyester (B) containing the monofunctional compound units (c) in an amount satisfying the formula (α). This occurs where the following conditions (1) and (2) are satisfied.

(1) The multifunctional compound units ($b_1$) are selected from:
  (i) multifunctional compound units ($b_2$) derived from at least one multifunctional compound having at least 3 carboxyl groups, hydroxyl groups, and/or ester-forming groups thereof, at least one group among them is carboxyl group or ester-forming groups thereof, or
  (ii) multifunctional compound units ($b_3$) derived from at least one aliphatic or alicyclic multifunctional compound having at least 3 hydroxyl groups and/or ester-forming groups thereof; the content of ($b_2$) or ($b_3$) being adjusted to 0.005 to 0.5 mole %, based on the moles of total constituent units of the copolyesters; and
(2) The intrinsic viscosity is adjusted within a specific range.

Copolyesters (C) and (D), both containing no monofunctional compound units (c), are embodiments of the above. In copolyesters (C) and (D), the content of the multifunctional compound units ($b_2$) or ($b_3$) is preferably 0.01 to 0.4 mole %, more preferably 0.01 to 0.2 mole %, based on the moles of total constituent units of the copolyesters, from the same viewpoint as for copolyester (B) having monofunctional compound units (c).

Examples of multifunctional compound units ($b_2$) of copolyester (C) include, but are not limited to units from any multifunctional compound having at least 3 carboxyl groups, hydroxyl groups, and/or ester-forming groups thereof, at least one group among them being carboxyl group or ester-forming groups thereof. The multifunctional compound deriving the multifunctional compound units ($b_2$) may have at least 3 carboxyl groups only, or in total at least 3 carboxyl groups and hydroxyl groups.

Preferred examples of the multifunctional compound units ($b_2$) are the same units from aromatic carboxylic acids, aromatic hydroxycarboxylic acids, aliphatic hydroxycarboxylic acids, and ester-forming derivatives thereof, as mentioned for the multifunctional compound units ($b_1$). These units may be present in copolyester (C) either singly or in combination of 2 or more.

Preferably, copolyesters (C) of the present invention contain as the multifunctional compound units ($b_2$), among the above examples, units from at least one multifunctional compound selected from trimellitic acid, pyromellitic acid and trimesic acid, in view of ease and cost of production of the copolyester. In particular, trimellitic acid units and trimesic acid units are more preferred, since these units suppress gelation.

Examples of multifunctional compound units ($b_3$) of copolyester (D) include, but are not limited to units from any aliphatic or alicyclic multifunctional compound having at least 3 hydroxyl groups and/or ester-forming groups thereof. The multifunctional compound deriving the multifunctional compound units ($b_3$) may have at least 3 hydroxyl groups only, or in total at least 3 hydroxyl groups and ester-forming derivatives thereof.

Preferred examples of multifunctional compound units ($b_3$) are the same units from aliphatic polyhydric alcohols, alicyclic polyhydric alcohols, and ester-forming derivatives thereof, as mentioned for the multifunctional compound units ($b_1$). These units may be contained in copolyester (D) either singly or in combinations of 2 or more.

Preferably, the copolyester (D) of the present invention contains as the multifunctional compound units ($b_3$), among the above examples, units from at least one multifunctional compound selected from trimethylolpropane and pentaerythritol, in view of ease and cost of production of the copolyester and suppression of gelation.

For copolyester (E), like copolyester (B), monofunctional compound units (c) are not always necessary. In other words, some copolyesters can exhibit the same excellent properties, with no monofunctional compound units (c), in particular extrusion blow moldability, as those of copolyester (E) containing monofunctional compound units (c) in an amount satisfying formula (α). This applies when the content of the multifunctional compound units ($b_1$) (when 2 or more groups of multifunctional compound units ($b_1$) are contained, the sum of them) is adjusted to 0.005 to 0.5 mole %, based on the moles of total constituent units of the copolyester. Copolyester (F), containing no monofunctional compound units (c), is the embodiment thereof.

For copolyester (F), the content of multifunctional compound units ($b_1$) is preferably 0.01 to 0.4 mole %, more preferably 0.01 to 0.2 mole %, based on the moles of total constituent units of the copolyester, from the same viewpoint as for copolyester (E) having monofunctional compound units (c). Preferred examples of multifunctional compound units ($b_1$) for copolyester (F) are the same ones as for copolyester (E) having the monofunctional compound units (c).

The copolyesters of the present invention may contain copolymerization units other than the above-described groups of constituent units, in such small amounts (generally not more than 3 mole %, based on the moles of total constituent units) as not to impair the properties of the copolyesters. Examples of such copolymerization units are those derived from aromatic dicarboxylic acids, e.g., isophthalic acid, phthalic acid, diphenyl ether dicarboxylic acid, diphenyl sulfone dicaboxylic acid, diphenyl ketone dicarboxylic acid and sodium sulfoisophthalate; and aromatic hydroxycarboxylic acids, e.g., hydroxybenzoic acid and mandelic acid.

Further examples of the above copolymerization units include for the copolyester (A), structural units mentioned as bifunctional compound units ($a_2$) and ($a_3$); for copolyesters (B) through (D), those mentioned as bifunctional compound units ($a_1$) and ($a_3$); and for copolyesters (E) and (F), those mentioned as bifunctional compound units ($a_1$) and ($a_2$).

Depending on the type of melt molding employed, the intrinsic viscosity of copolyesters (A), (B), (E) and (F) of the present invention is preferably in a range of 0.8 to 1.5 dl/g, when they are to be subjected to melt molding accompanying melt extrusion, in particular extrusion blow molding. The intrinsic viscosity is more preferably 1.0 to 1.4 dl/g, in view of the mechanical strength and appearance of extrusion blow molded articles and the moldability and productivity on producing molded articles.

If the intrinsic viscosity is less than 0.8 dl/g, parisons formed on extrusion blow molding will sag to a significant extent, thereby causing poor shaping and the resulting molded articles will tend to have low mechanical strength. If the copolyesters have an intrinsic viscosity exceeding 1.5 dl/g, melt viscosity will be too high; on melt extrusion, particularly extrusion blow molding, the molded articles will tend to form weld lines and have poor appearance. Other molding problems result, e.g., non-uniform throughput due to high torque on the extrusion. Further, copolyesters having an intrinsic viscosity exceeding 1.5 dl/g require long extrusion time, so that productivity suffers. The above relationship between the intrinsic viscosity of the copolyesters and the moldability thereof and the physical properties of molded articles obtained therefrom is particularly pronounced for extrusion blow molding. However, these problems are not limited to extrusion blow molding, but are also observed in melt molding processes accompanying melt extrusion in general, such as extrusion molding and injection-extrusion blow molding.

From the same viewpoint, it is necessary that copolyesters (C) have an intrinsic viscosity of 1.0 to 1.4 dl/g and that copolyester (D) have an intrinsic viscosity of 0.8 to 1.5 dl/g, preferably 1.0 to 1.4 dl/g.

The copolyesters of the present invention preferably have a melt viscosity ($\eta 1$) of $5 \times 10^4$ to $5 \times 10^6$ poises at a shear rate of 0.1 rad/sec at 270° C. When melt molded by, e.g., extrusion blow molding, the copolyesters will cause little curl-back, thereby almost completely preventing occurrence of poor molding and markedly suppressing melt fracture, die swell and similar phenomena. As a result, molded articles having particularly excellent appearance and mechanical properties are obtained.

The copolyesters of the present invention also preferably have a melt viscosity ($\eta 2$) of $5 \times 10^3$ to $5 \times 10^5$ poises at a shear rate of 100 rad/sec at 270° C. When melt molded by for example extrusion blow molding, the copolyesters will smoothly prevent extrudates in a softened state, such as parisons, from deforming by drawdown or drooping, so that productivity is high. Further, the polyesters do not undergo thermal decomposition or cause uneven extrusion or occurrence of weld lines.

It is particularly preferable that the copolyesters of the present invention satisfy not only the elements of the melt viscosity ($\eta 1$) at a shear rate of 0.1 rad/sec at 270° C. and the melt viscosity ($\eta 2$) at a shear rate of 100 rad/sec at 270° C., but the following condition ($\beta$):

$$-0.7 \leq (\tfrac{1}{3})\log_{10}(\eta 2/\eta 1) \leq -0.2 \qquad (\beta)$$

When the condition ($\beta$) is satisfied, the copolyesters, exhibiting appropriate non-Newtonian behavior, show moderately low melt viscosity at high shear rates and moderately high melt viscosity at low shear rates, thereby having excellent formability of parisons, particularly when subjected to extrusion blow molding, injection-extrusion blow molding, or similar melt molding processes.

To achieve still better formability of parisons, it is more preferred that the value of $(\tfrac{1}{3})\log_{10}(\eta 2/\eta 1)$ in formula ($\beta$) be in a range of -0.60 to -0.25. In formula ($\beta$), the value $(\tfrac{1}{3})\log_{10}(\eta 2/\eta 1)$ can be obtained as the gradient of a straight line connecting the 2 points of the melt viscosities ($\eta 1$) and ($\eta 2$) in a log-log graph, with the ordinate representing the melt viscosity and the abscissa the shear rate.

The melt viscosities ($\eta 1$) and ($\eta 2$) herein mean values as determined in the manner described in Examples given hereinbelow.

Preferably, the copolyesters of the present invention have a shark-skin critical shear stress ($\sigma$ss) at a temperature of 270° C. of at least $1 \times 10^6$ dyne/cm$^2$, and a shear stress ($\sigma 100$) at a shear rate of 100/sec and at a temperature of 270° C. of not more than the shark-skin critical shear stress ($\sigma$ss). The present inventors have also found that the shear stress of copolyesters on melt molding is closely related to the above-described surface roughening of obtained molded articles. Where the shark-skin critical shear stress ($\sigma$ss) at a temperature of 270° C. is at least $1 \times 10^6$ dyne/cm$^2$ and the shear stress ($\sigma 100$) at a shear rate of 100/sec and at a temperature of 270° C. is not more than the value of the shark-skin critical shear stress ($\sigma$ss), surface roughening on melt molding such as extrusion blow molding is markedly suppressed, and molded articles having excellent transparency, appearance and tactility can be obtained. It is believed that with copolyesters having the above shear stress characteristics, marked release of the elastic normal stress is suppressed between the copolymer melts and the extruder die used.

The shark-skin critical shear stress ($\sigma$ss) and the shear stress ($\sigma 100$) at a shear rate of 100/sec herein mean shear stresses exhibited when a copolyester is extruded through a capillary nozzle into a strand, and the details are as set forth in Examples hereinbelow.

Preferably, the copolyesters of the present invention have a glass transition temperature of at least 60° C. More preferably, the glass transition temperature is at least 70° C., which prevents shrinkage of more effectively molded articles obtained by extrusion blow molding or similar melt molding processes from shrinking. Molded articles from copolyesters having a glass transition temperature of less than 60° C., in particular extrusion blow molded articles, sometimes shrink after being taken out from dies due to relaxation of residual stress, thereby impairing their appearance.

Preferably, the copolyesters of the present invention have a terminal carboxyl group concentration of not more than 30 μequivalent/g. More preferably, the terminal carboxyl group concentration is not more than 20 μequivalent/g, from the viewpoints of the melt stability, prevention of discoloring and suppression of wall roughening of hollow articles on extrusion blow molding, of the copolyesters. If the terminal carboxyl group concentration of the copolyesters exceeds 30 μequivalent/g, the copolyesters will yield molded articles, in particular extrusion blow molded articles, which are severely discolored and which have markedly decreased molecular weight.

It is further desirable that the copolyesters of the present invention have a melt flow rate ("MFR") at 270° C. of 0.3 to 7.5 g/10 min, more preferably 0.5 to 5 g/10 min, from the viewpoints of shapability on melt molding such as extrusion blow molding, the uniformity of obtained molded articles, and the productivity on molding.

Preferably, the copolyesters of the present invention have a crystallinity of 20 to 40%, more preferably 25 to 35%. If crystallinity of the copolyesters is less than 20%, pellets or chips of the copolyesters tend to stick together on solid phase polymerization, making it difficult to smoothly conduct solid phase polymerization. Besides, on molding, pellets or chips cause blocking with each other, thereby disturbing smooth molding. If the crystallinity exceeds 40%, pellets or chips cannot be easily melted. This causes resin shrieking (i.e., sound generation due to friction between pellets or chips) on molding, thereby applying heavy load to the molding machine and disturbing smooth molding. The resulting molded articles tend to have unmelted agglomerates and poor transparency, appearance or tactility. Crystallinity of the copolyesters is more preferably in a range of 25 to 35%, which insures smooth solid phase polymerization to increase the productivity of the copolyesters, and smooth melt molding to obtain high-quality molded articles.

Preferably, the copolyesters of the present invention have a cold-crystallization temperature of not more than 150° C. and, at the same time, a heat of crystallization at cold crystallization of not more than 20 J/g. If the cold-crystallization temperature exceeds 150° C. or if the heat of crystallization at cold crystallization exceeds 20 J/g, spherulites will rapidly grow, so that the obtained molded articles tend to become whitened and have poor transparency. Further on extrusion blow molding, parisons tend to solidify too early, leading to difficult shaping. It is more preferred that the cold-crystallization temperature be not more than 140° C. and that the heat of crystallization at cold crystallization be not more than 15 J/g, in order to retard the rate of formation of spherulites sufficiently, to obtain molded articles having excellent transparency and good shapability. "Cold-crystallization temperature" and "heat of crystallization" at cold crystallization herein mean the values determined by differential scanning calorimetry; details are as described in Examples hereinbelow.

The copolyesters of the present invention can be produced in a short period of time and at good productivity by:

(1) esterifying or transesterifying starting materials comprising:
  (i) terephthalic acid or derivatives thereof;
  (ii) ethylene glycol;
  (iii) a bifunctional compound to introduce bifunctional compound units ($a_1$), ($a_2$) or ($a_3$) into the resulting copolyester; and
  (iv) a multifunctional compound to introduce multifunctional compound units ($b_1$), ($b_2$) or ($b_3$);
  (v) said starting materials, as necessary, further comprising at least one monofunctional compound to introduce monofunctional compound units (c), selected from the group consisting of monocarboxylic acids, monohydric alcohols, and ester-forming derivatives thereof;

wherein the content of the bifunctional compound in the starting materials is such that:
  for copolyester (A), the ratio between bifunctional compound units ($a_1$) derived from the bifunctional compound and total constituent units of the copolyester is 1 to 4 mole %, based on the moles of the total constituent units, and
  for copolyesters (B) through (F), the ratio between bifunctional compound units ($a_2$) or ($a_3$) derived from the bifunctional compound and total constituent units of the copolyester is 0.5 to 7 mole %, based on the moles of the total constituent units;

wherein the content of the multifunctional compound in the starting materials is such that:
  (a) for the copolyesters of the present invention having monofunctional compound units (c), the ratio between multifunctional compound units ($b_1$) derived from the multifunctional compound and total constituent units of the copolyesters is 0.005 to 1 mole %, based on the moles of the total constituent units, and
  for the copolyesters of the present invention having no monofunctional compound units (c), the ratio between multifunctional compound units ($b_1$), ($b_2$) or ($b_3$) derived from the multifunctional compound and total constituent units of the copolyesters is 0.005 to 0.5 mole %, based on the moles of the total constituent units; and wherein when a monofunctional compound is added, the ratio between monofunctional compound units (c) derived from the monofunctional compound and total constituent units based on the moles of the total constituent units satisfies the above-described formula ($\alpha$);

(2) melt polycondensing the ester obtained in step (1) to prepare a polyester prepolymer; and (3) solid phase polymerizing the polyester prepolymer.

In the above processes, there can be used as the bifunctional compound, multifunctional compound, and monofunctional compound, the above-described bifunctional compounds for introducing the bifunctional compound units ($a_1$), ($a_2$) or ($a_3$); multifunctional compounds for introducing the multifunctional compound units ($b_1$), ($b_2$) or ($b_3$); and monofunctional compounds for introducing the monofunctional compound units (c), respectively.

On production of the copolyesters, preferably the reaction components are mixed such that the molar ratio of (total diol components):(total dicarboxylic acid components) is from 1.1:1 to 1.5:1 and, (a) where the copolyesters of the present invention have monofunctional compound units (c), that the molar ratio of (multifunctional compound component):(total dicarboxylic acid components) is from 0.0001:1 to 0.02:1 and that of (monofunctional compound component):
(multifunctional compound component) is {0.1×(p−2)}:1 to {20×(p−2)}:1 (p is as defined above), and (b) where the copolyesters of the present invention have no monofunctional compound units (c), that the molar ratio of (multifunctional compound component):(total dicarboxylic acid components) is from 0.0001:1 to 0.01:1. Then the mixture is esterified or transesterified.

Preferably, the above esterification or transesterification is carried out under from atmospheric pressure to absolute pressure of about 3 kg/cm² and at a temperature of from 230° to 300° C., while distilling off the water or alcohol that is formed. After the reaction, additives, e.g., polycondensation catalyst and coloring preventing agent, are added as necessary. Thereafter, melt polycondensation is conducted, preferably under a reduced pressure of not more than 5 mm Hg and at a temperature of 200° to 300° C., until a polyester prepolymer having the desired viscosity is obtained. The polyester prepolymer preferably has an intrinsic viscosity of 0.40 to 0.75 dl/g and an MFR exceeding 15.0 g/10 min, e.g., for ease of handling of the polyester prepolymer.

If a polycondensation catalyst is used for the above melt polycondensation, any catalyst for producing copolyesters in general may be used. Examples of such a catalyst are antimony compounds, e.g., antimony oxide; germanium compounds, e.g., germanium oxide; titanium compounds, e.g., tetramethoxytitanium, tetraethoxytitanium, tetra-n-propoxy-titanium, tetraisopropoxy-titanium and tetrabutoxy-titanium; and tin compounds, e.g., di-n-butyltin dilaurate, di-n-butyltin oxide and dibutyltin diacetate. These catalysts may be used singly or in combinations of 2 or more. The polycondensation catalyst is preferably used in an amount in the range of 0.002 to 0.8% by weight, based on the weight of the dicarboxylic acid component.

The coloring preventing agent may be phosphorus compounds, e.g., phosphorous acid, phosphoric acid, trimethyl phosphate, triphenyl phosphate, tridecyl phosphate, trimethyl phosphate, tridecyl phosphate and triphenyl phosphate. These phosphorus compounds may be used singly or in combination of 2 or more. The coloring preventing agent is preferably present in an amount in the range of 0.001 to 0.5% by weight, based on the weight of the dicarboxylic acid component.

To suppress coloring of copolyesters due to thermal decomposition, a cobalt compound such as cobalt acetate may be added, preferably in an amount of 0.001 to 0.5% by weight based on the weight of the dicarboxylic acid component, more preferably 0.05 to 0.3% by weight.

Presence of a large amount of diethylene glycol in the copolyesters causes the copolyesters to have a decreased glass transition temperature, as described above. Heat resistance worsens and discoloration occurs, and bottles molded from such copolyesters have poor heat resistance, strength and color shade. Preferably, the above esterification or transesterification, and/or melt polycondensation is conducted in the presence of an agent that can suppress formation of diethylene glycol by-products, e.g., tetraalkylammonium hydroxides such as tetraethylammonium hydroxide, and organic amines such as triethanolamine and triethylamine, to reduce the amount diethylene glycol in the copolyesters.

The polyester prepolymer obtained by the above polycondensation is formed into chips or pellets having a die-, cylindrical or any optional shapes. After being pre-dried at a temperature of generally not more than 190° C., the pellets are subjected to solid phase polymerization until the intrinsic viscosity, MFR, and similar indexes reach the desired values, to yield the desired copolyester. Solid phase polymerization is preferably carried out under vacuum, at reduced pressure, or under an atmosphere of an inert gas such as nitrogen. Preferably, the chips or pellets of the polyester prepolymer are fluidized during the solid phase polymerization by appropriate means, e.g., tumbling process or gas fluidized bed process, so that they will not stick together. Preferably, solid phase polymerization is conducted at a temperature of 180° to 240° C., more preferably 190° to 230° C. The temperature for the solid phase polymerization within the above range is preferably at least 15° C., more preferably at least 20° C. lower than the melting point of the copolyester to be finally produced to prevent sticking between chips or pellets. Solid phase polymerization is preferably conducted for about 5 to 40 hours in view of productivity and similar circumstances.

Carrying out the above series of steps can produce the copolyesters of the present invention in a short period of time and with high productivity.

The copolyesters of the present invention have excellent melt moldability, transparency, heat resistance, and mechanical properties. They can therefore be molded by extrusion blow molding, injection-extrusion blow molding, extrusion molding, injection molding, or similar melt molding processes into various molded articles. The copolyesters of the present invention are suited for molding accompanied by melt extrusion, in particular extrusion blow molding. The copolyesters of the present invention can, when processed by melt molding, in particular those accompanying melt extrusion, e.g., extrusion blow molding, injection-extrusion blow molding, extrusion molding, and injection molding, yield with high productivity molded articles having excellent dimensional precision, transparency, heat resistance, moisture resistance and chemical resistance. In particular, on extrusion blow molding of the copolyesters of the present invention, extruded parisons have good drawdown properties, so that the drawdown time is maintained within a suitable range and the parisons have a uniform diameter. Further, good blow moldability is achieved without causing problems on molding, thereby smoothly producing hollow molded articles having good shape and dimensional precision and with good productivity. The obtained hollow molded articles yield extruded blow molded articles having, e.g., excellent transparency, heat resistance, moisture resistance, and chemical resistance.

Melt molding of the copolyesters of the present invention can be conducted following conventional procedures for each of the melt molding processes used for thermoplastic resins generally, e.g., extrusion blow molding, injection-extrusion molding, extrusion molding and injection molding, and is not particularly limited with respect to specific content or conditions of the procedure. In particular, on extrusion blow molding of the copolyesters of the present invention, the type of extrusion blow molding is not specifically limited. That is, in the same manner as in known extrusion blow molding, the copolyesters of the present invention can be melt extrusion molded into cylindrical parisons, which are, while being in a softened state, inserted into a die for blowing and then air or like gases is blown into the die to swell the parisons into the desired hollow shapes defined by the shape of the die cavity. Preferably, the melt extrusion temperature is adjusted to within a range of from (melting point of copolyester+10° C.) to (melting point of copolyester+70° C.), in view of moldability.

Examples of the shape of the shaped articles of the present invention include, but are not limited to, the shape of hollow articles, tubes, plates, sheets, films, rods, and dies. Among these, the present invention is particularly suitable for hollow articles obtained by extrusion blow molding.

Further, the shaped articles obtained from the copolyesters of the present invention may be formed of the copolyesters alone or have the shape of laminates with other materials, e.g., plastics, metals, fibers, fabrics, or may be of a shape other than the laminates, in combination with these other materials. In particular, where the shaped articles of the present invention are extrusion blow molded articles, they can be formed into single-layer hollow articles (e.g., hollow containers) comprising the copolyesters of the present invention only, or multilayer hollow articles formed of the copolyesters of the present invention in combination with other plastics, e.g., polyethylene, polypropylene, ethylene-vinyl alcohol copolymer or polyethylene terephthalate (PET). Specifically, examples thereof are 3-layer bottles having the construction PET layer/the copolyester layer/PET layer, 5-layer bottles with PET layer/the copolyester layer/PET layer/the copolyester layer/PET layer. The shaped articles of the present invention are not limited to these examples, however.

The copolyesters of the present invention may, as necessary, incorporate other thermoplastic resins and various additives conventionally used for polyester resin, in general, e.g., coloring agents such as dyes and pigments, stabilizers such as UV absorbers, antistatic agents, flame retardants, flame retardant auxiliaries, lubricants, plasticizers, and inorganic fillers.

The copolyesters of the present invention have high melt viscosity, and non-Newtonian characteristics of low viscosity at high shear rate and high viscosity at low shear rate. The copolyesters also have the excellent features on molding of suffering no melt fracture such as shark-skin flow, of having the crystallization suppressed, and of generating no agglomerates. The copolyesters of the present invention therefore have excellent melt moldability and can be melt molded very smoothly by melt molding processes, e.g., extrusion blow molding, injection-extrusion blow molding, extrusion molding, and injection molding. By these molding processes, the copolyesters give high-quality molded articles having excellent transparency, surface conditions, appearance, and tactility, and excellent mechanical properties, e.g., impact strength, dimensional precision, heat resistance, moisture resistance, and chemical resistance.

The copolyesters of the present invention have, in particular, high melt viscosity and good melt viscosity characteristics suited for, among the above melt molding processes, those accompanying melt extrusion, in particular extrusion blow molding. On extrusion blow molding of the copolyesters of the present invention, good parisons are formed. Drawdown time is maintained within a suitable range, and the parisons have uniform diameter. Further, good blow moldability is achieved without causing problems on molding, thereby smoothly producing with high productivity hollow molded articles having good shape with no distortion or deformation and good dimensional precision. The copolyesters of the present invention can be suitably used for extrusion blow molding of large-size hollow articles via relatively long parisons having a length of at least 30 cm.

The processes for producing copolyesters of the present invention can produce the copolyesters having the above features in a short period of time, in particular in a shortened solid phase polymerization time, economically and with high productivity.

EXAMPLES

Other features of the invention will become more apparent in the course of the detailed descriptions of exemplified embodiments which are given for illustration of the invention and are not intended to be limiting thereof. In the Examples and Comparative Examples that follow, the content of each of the structural units and properties of polyesters (copolyesters or homopolyesters); the evaluations of the drawdown property and blow moldability of parisons on extrusion blow molding of polyesters; and the transparency, generation of gels, generation of agglomerates, falling breakage height, and falling impact strength of molded articles (bottles) obtained by the extrusion blow molding were carried out in accordance with the following methods.

(1) Content of each structural unit in the polyester

The polyester sample was subjected to methanalysis, and constituted structural components separated by high-performance liquid chromatography. The components obtained were each subjected to quantitative determination by spectrochemical analysis in the ultraviolet and visible regions, refractive index analysis, and infrared absorption (IR) spectrometry to give the content of each component. The content values were determined by $^1$H-NMR spectrometry with a solvent of deuterated trifluoroacetic acid.

(2) Intrinsic viscosity of the polyester

Determined by measurements on 1/1 by weight mixed solvent of phenol and tetrachloroethane with Ubelohde viscosimeter (HRK-3, made by Hayashi Seisakusho) at 30° C.

(3) Melt flow rate (MFR) of the prepolymer or polyester

Measured with Melt Indexer L244 (made by Takara Kogyo KK). Specifically, a cylinder having an inner diameter of 9.5 mm and a length of 162 mm was filled with chips of a prepolymer or polyester (final product) sample. The chips were melted at 270° C. (210° C. in Comparative Examples 4, 13, 15, 20, 25, 27 and 29, where the copolyesters were amorphous). The melt was uniformly loaded with a 2,160-g plunger having a diameter of 9.48 mm, and the flow-out rate (g/10 min) of the prepolymer or polyester extruded through a 2.1 mm/diameter orifice was measured and taken as the melt flow rate.

(4) Melt viscosities ($\eta 1$ and $\eta 2$) of the polyester

The melt viscosity at a shear rate of 0.1 rad/sec ($\eta 1$) and a temperature of 270° C. and the melt viscosity at a shear rate of 100 rad/sec ($\eta 2$) at a temperature of 270° C. were dynamically measured with a mechanical spectrometer (RMS-800, made by Reometrics Co.). The temperature was set at 210° C. for the copolyesters obtained in Comparative Examples 4, 13, 15, 20, 29, 27 and 29, since they were amorphous.

(5) Shark-skin critical shear stress ($\theta$ss) and shear stress at a shear rate of 100/sec ($\theta 100$) of the polyester A tester (CAPILLOGPAPH made by Toyo Seiki Co.) was used and the polyester sample was extruded through its capillary nozzle having a diameter of 2 mm and a length of 10 mm at a temperature of 270° C. into a strand, while the shear rate was continuously changed. The shear rate at which the surface of the strand became roughened (i.e., when the 10-point average surface coarseness exceeded 1.5 µRz) was recorded and taken as the shark-skin critical shear stress (B ss) (dyne/cm$^2$). The same apparatus was used for determining the shear stress at a shear rate of 100/sec ($\theta 100$) (dyne/cm$^2$). The temperature was set at 210° C. for the copolyesters obtained in Comparative Examples 4, 13, 15, 20, 25, 27 and 29, since they were amorphous.

(6) Crystallinity ($\chi$c) of the polyester

The density (d) at 25° C. of the polyester was measured. The density (da) of completely amorphous PET (polyethylene terephthalate) was set at 1.335 and the density (dc) of completely crystalline PET (polyethylene terephthalate) was set at 1.501. The crystallinity ($\chi$c) was calculated by the following formula ($\gamma$):

$$\chi c(\%) = \{dc(d-da)/d(dc-da)\} \times 100 \quad (\gamma)$$

(7) Glass transition temperature (Tg) and melting point (Tm) of the polyester

Measured in accordance with JIS K7121 by differential scanning calorimeter (DSC) with a thermal analysis system (Mettler TA3000, made by Mettler Co.) at a temperature elevation rate of 10° C./min.

(8) Cold crystallization temperature (Tcc) and cold crystallization heat (ΔHcc) of the polyester Measured according to JIS K7121 by differential scanning calorimeter (DSC) with a thermal analysis system (Mettler TA3000, made by Mettler Co.). The sample was maintained at a temperature of (melting point +40° C.) for 5 minutes and then measured at a temperature decreasing rate of 5° C./min.

(9) Terminal carboxyl group concentration (CEG) of the polyester

Sample (0.2 g) was dissolved in 10 ml of benzyl alcohol heated to 215° C. Chloroform (10 ml) was added to the solution and the resulting solution was titrated with sodium hydroxide in benzyl alcohol.

(10) Draw-down tendency of parison on extrusion blow molding (i) Draw-down time (sec) of parisons The sample was extruded through an extrusion blow molding machine (hollow molding machine, Type BM-304-J2 made by Placo Co.) at an extrusion temperature of 270° C. (210° C. for the copolyesters obtained in Comparative Examples 4, 13, 15, 20, 25, 27 and 29, since they were amorphous) through an annular orifice into cylindrical parisons. The cylindrical parisons were cut while in a softened state and bottom-formed by pinching with a blow die. The cuts were then blow molded into bottles (designed capacity: 1,800 ml, designed weight: 80 g) for soft drinks. The above extrusion blow molding machine used here was designed so as to pinch off with the die and blow at a time point where the parison drew down by 35 cm. The time required for the 35-cm draw-down was measured and taken as the drawdown time.

With the extrusion blow molding machine used here, drawdown times within a range of 15 to 25 seconds showed good moldability. Drawdown times of less than 15 seconds, meaning severe drawdown, cause the parisons to assume a non-uniform shape after blowing. Such parisons become defective, with large thickness dispersion, become impossible to insert into blow dies, and cause clogging at their hollow parts. When the drawdown time exceeds 25 seconds, the productivity of shaped articles (bottles) decreases and the polyester, having too high a melt viscosity, cannot be blown uniformly. Further, unbonding at the pinch-off part of the bottles, generation of weld lines, and breakage of the molding machine due to increased torque tend to occur.

(ii) Difference between the maximum and minimum diameters of parison

The polyester sample was extruded with the above extrusion blow molding machine at a temperature of 270° C. (210° C. for the copolyesters obtained in Comparative Examples 4, 13, 15, 20, 25, 27 and 29, since they were amorphous) into a cylindrical parison. When its length reached 35 cm, the maximum diameter (outer diameter) and minimum diameter (inner diameter) of the parison were measured, from which the difference was obtained.

The annular die of the extrusion nozzle of the above extrusion blow molding machine used here has a diameter of 3.5 cm. The parison extruded therethrough tends to be attenuated as it goes apart from the die, due to severe drawdown caused by its own weight. A difference between the maximum and minimum diameters of a parison of not more than 1 cm generally ensures smooth extrusion blow molding operation. If the difference exceeds 1 cm, the parison will, after blowing, generate uneven thickness, thereby producing defects or in extreme cases clog and become unblowable.

(iii) Overall evaluation of drawdown property of parison

Overall evaluation of drawdown property of parison was made in terms of the drawdown time, the difference between the maximum and minimum diameters of parison, and the productivity of bottles, in accordance with the criteria shown in Table 1 below. The productivity of bottles was judged good, from the cost factor, when at least 120 pieces of bottles was producible per hour with less than 10 defective pieces of 100 pieces. The term "defective" herein means that there occurred at least one problem from among the following:

a) Extruded parison cannot be inserted into blow die due to severe drawdown;

b) Parison clogs at its hollow part;

c) Unbonding occurs at the pinch-off part due to high viscosity; or d) Deformation or breakage of bottle occurs due to non-uniform blow.

TABLE 1

Criteria of overall evaluation of parison drawdown property

○ (Good) - satisfies all of the following conditions:

(a) Draw-down time is in a range of 15 to 25 seconds
(b) Difference between the maximum and minimum diameters of parison is not more than 1 cm.
(c) Production of bottles is at least 120 pieces per hour and defective bottles are in less than 10 pieces in 100 pieces.

Δ (Marginal) - satisfies any one of the following conditions:

(a) Draw-down time is at least 10 seconds and less than 15 seconds, or is more than 25 seconds and not more than 60 seconds.
(b) Difference between the maximum and minimum diameters of parison is more than 1 cm and not more than 2 cm.
(c) Production of bottles is at least 60 pieces and less than 120 pieces per hour and defective bottles are in at least 10 pieces and less than 30 pieces in 100 pieces.

X (Bad) - satisfies any one of the following conditions:

(a) Draw-down time is less than 10 seconds or exceeds 60 seconds.
(b) Difference between the maximum and minimum diameters of parison exceeds 2 cm.
(c) Production of bottles is less than 60 pieces and defective bottles are in at least 30 pieces in 100 pieces.

(11) Blow moldability on extrusion blow molding (i) Average wall thickness of bottle A bottle obtained by molding was divided from the top down to the bottom into 5 pieces, each of which was then divided into 4 pieces at the same pitch in the circumferential direction of bottle. Wall thicknesses were measured on the total of 20 pieces and the average of 20 measurements was calculated. The average wall thickness is preferably in the range of 0.3 to 0.7 mm from the viewpoint of appearance, tactility and bottle strength.

(ii) Uneven thickness of bottle

Of the wall thicknesses of bottle body part obtained in the above measurement (i), the difference between the maximum and minimum thicknesses was obtained for evaluation. The thickness difference is preferably less than 0.30 mm, because otherwise very thin and/or broken parts are generated, so that appearance and/or tactility are poor.

(iii) Overall evaluation of blow moldability

Conducted in accordance with the evaluation criteria shown in Table 2 below.

TABLE 2

Overall evaluation criteria for blow moldability

| | |
|---|---|
| ○ (Good): | Average wall thickness is in the range of 0.30 to 0.70 mm and thickness unevenness is less than 0.30 mm. |
| X (Bad): | Average wall thickness is less than 0.30 mm or exceeds 0.70 mm, or thickness unevenness is at least 0.30 mm. |

(12) Transparency of bottle (i) Haze value

The body of the bottle was divided, from the top, middle down to bottom, into 6 parts, which were then each divided into 4 pieces in the circumferential direction, for a total of 24 pieces. They were tested with a Poic integrating sphere type light transmittance total light reflectance tester (SEP-HS 30D-R type, made by Nihon Seimitsu Kogaku KK) for the haze value of each piece. The average of the 24 measurements was taken as the haze value of the bottle. With a haze value exceeding 8, the transparency becomes poor due to whitening by generation of spherulites, or light scattering by gel-like irregular matter. The haze value is preferably not more than 4, which ensures good transparency.

(ii) b-value

The body of the bottle was cut into small pieces (square piece of 1 cm×1 cm), which were measured with a color difference meter (SM-4, made by Suga Instruments KK) by the reflection method. When the b-value exceeds 8, the bottle shows a yellowish tone and becomes of poor appearance. The b-value is preferably not more than 4 in view of color tone.

(iii) Overall evaluation of bottle transparency

Conducted in accordance with the evaluation criteria shown in Table 3 below.

TABLE 3

Overall evaluation criteria for transparency of bottle

| | |
|---|---|
| ○ (Good): | Haze value is not more than 4 and b-value is not more than 4. |
| Δ (Marginal): | Haze value exceeds 4 and is not more than 8, or b-value exceeds 4 and is not more than 8. |
| X (Bad): | Haze value exceeds 8, or b-value exceeds 8. |

(13) Generation of gels on bottle

A 1-g sample was cut from the body of the bottle and kept in 10 ml of hexafluoroisopropanol at 30° C. for 5 hours to dissolve. The solution was filtered through a 4G glass filter and insoluble gels were collected. The gels were dried by heating at 100° C. for 60 minutes and weighed. The by weight of the gels based on the sample weight (1 g) was taken as the generation of gels, which was evaluated according to the criteria shown in Table 4 below.

TABLE 4

Evaluation criteria for generation of gels on the bottle

| | |
|---|---|
| ⊙ (Excellent): | Gel generation is not more than 2.5%. |
| ○ (Good): | Gel generation exceeds 2.5% and is not more than 5%. |
| Δ (Marginal): | Gel generation exceeds 5% and is not more than 10%. |
| X (Bad): | Gel generation exceeds 10%. |

(14) Generation of agglomerates on bottle

A 10 cm×10 cm sample was cut from the center of the body of the bottle. The number of agglomerates on the sample was visually counted and evaluation was made according to the criteria shown in Table 5 below.

TABLE 5

Criteria for generation of agglomerates on the bottle

| | |
|---|---|
| ⊙ (Excellent): | No. of agglomerates was not more than 2 pieces/100 cm². |
| ○ (Good): | No. of agglomerates exceeds 2 pieces/100 cm² and not more than 5 pieces/100 cm². |
| Δ (Marginal): | No. of agglomerates exceeds 5 pieces/100 cm² and not more than 10 pieces/100 cm². |
| X (Bad): | No. of agglomerates exceeds 10 pieces/100 cm². |

(15) Falling impact strength of bottle

Ten bottles were completely filled with water and stoppered. At first, a bottle was dropped from the height of 50 cm and, if not broken, then from 60 cm, i.e. from 10 cm higher point. The procedure was repeated to obtain the height at which the bottle broke. The average of heights at which 10 bottles broke was taken as the falling breakage height. Evaluation of the falling impact strength was made in accordance with the criteria shown in Table 6 below.

TABLE 6

Evaluation criteria for falling impact strength of the bottle

| | |
|---|---|
| ⊙ (excellent): | The breakage height is at least 120 cm. |
| ○ (good): | The breakage height is at least 100 cm and less than 120 cm. |
| X (bad): | The breakage height is less than 100 cm. |

Example 1

(1) A slurry was prepared from 100.00 parts by weight of terephthalic acid, 48.73 parts by weight of ethylene glycol, 4.34 parts by weight of 1,4-cyclohexanedimethanol, 0.116 parts by weight of trimellitic anhydride, and 0.104 parts by weight of 2-naphthoic acid. To the slurry, 0.020 parts by weight of germanium dioxide, 0.015 part by weight of phosphorus acid, 0.015 parts by weight of cobalt acetate and 0.015 parts by weight of tetraethylammonium hydroxide were added. The resulting slurry was heated under pressure (absolute pressure: 2.5 kg/cm²), to a temperature of 250° C., to conduct esterification to an esterification ratio of 95%, to produce a low-polymerization-degree compound. The compound thus obtained was melt polycondensed under reduced pressure of 1 mm Hg and at a temperature of 270° C., to yield a copolyester prepolymer having an intrinsic viscosity of 0.70 dl/g. The prepolymer was extruded through a nozzle into a strand, which was then cut into cylindrical chips (diameter: 2.5 mm, length: about 3.5 mm). The prepolymer had a melt flow rate (MFR) at 270° C. of 30 g/10 min.

(2) The copolyester prepolymer chips thus obtained were, after being pre-dried at a temperature of 150° C. for 5 hours, subjected to solid phase polymerization under a reduced pressure of 0.1 mm Hg at 210° C. for 29 hours, to yield a high molecular copolyester.

(3) The copolymer obtained in the above (2) was tested for the content of each structural unit by the above-described method. The content of terephthalic acid units, ethylene glycol units, 1,4-cyclohexanedimethanol units, trimellitic acid units, naphthoic acid units, or diethylene glycol units is as shown in Table 8 below.

(4) The copolymer obtained in the above (2) was also tested for the physical properties in accordance with the above-described methods, to show, as shown in Table 8 below, an intrinsic viscosity of 1.12 dl/g, an MFR at 270° C. of 1.5 g/10 min, and melt viscosities at the same temperature at a shear rate of 0.1 rad/sec ($\eta 1$) and at a shear rate of 100 rad/sec ($\eta 2$) of $1.29 \times 10^5$ poises and $1.39 \times 10^4$ poises, respectively, which led to a value of (⅓) $\log_{10}$ ($\eta 2/\eta 1$) of $-0.32$.

The copolyester was further tested for shark-skin critical shear stress ($\sigma$ss) at 270° C. and shear stress ($\sigma 100$) at a shear rate of 100/sec, to show $6.7 \times 10^6$ dyne/cm$^2$ and $3.1 \times 10^6$ dyne/cm$^2$, respectively.

The copolyester was further tested for crystallinity ($\chi$c), glass transition temperature (Tg), melting point (Tm), cold crystallization temperature (Tcc) and cold crystallization heat ($\Delta$Hcc), which are 31%, 78° C., 238° C., 128° C. and 9 J/g, respectively, as shown in Table 8 below.

(5) The copolyester was extrusion blow molded through an extrusion blow molding machine (hollow molding machine Type BM-304.J2, made by Placo Co.) into bottles (designed capacity: 1,800 ml, designed weight: 80 g). The intermediate product parisons were tested for drawdown property and blow moldability, and the resulting bottles for transparency, generation of gels, falling breakage height, and falling impact strength, in accordance with the above-described methods, to give the results shown in Table 13 below.

Examples 2 through 4

Terephthalic acid and ethylene glycol were used in amounts as shown in Table 8. In addition, 1,4-cyclohexanedimethanol, trimellitic anhydride, and 2-naphthoic acid or 2,4,6-trimethoxybenzoic acid were used as an alicyclic or aliphatic bifunctional compound for the alicyclic or aliphatic bifunctional compound units ($a_1$) a multifunctional compound for the multifunctional compound units ($b_1$) and a monofunctional compound for the monofunctional compound units (c), respectively, in amounts as shown in Table 8. With these, esterification and melt polycondensation were conducted in the same manner as in Example 1, to prepare copolyester prepolymer chips. The series of copolyester prepolymers obtained were each subjected to solid phase polymerization to yield copolyesters under the conditions of temperature and time shown in Table 8.

The copolyesters thus obtained were each tested for the content of structural units and properties in the same manner. The results are shown in Table 8 below.

The copolyesters obtained in Examples 2 through 4 were each extrusion blow molded in the same manner into bottles. The drawdown property and blow moldability of the parisons and the transparency, generation of gels, falling breakage height, and falling impact strength of the obtained bottles were determined or evaluated by the above-described methods. The results are shown in Table 13 below.

Examples 5 through 8

Terephthalic acid and ethylene glycol were used in amounts as shown in Table 9. In addition, 1,4-cyclohexanedimethanol, and 1,3-propanediol or 2-butyl-2-ethyl-1,3-propanediol, trimethylolpropane or trimellitic anhydride, and stearic acid, 2-naphthoic acid, polyethylene glycol monomethyl ether, or stearyl alcohol were used as an alicyclic or aliphatic bifunctional compound for the alicyclic or aliphatic bifunctional compound units ($a_1$), a multifunctional compound for the multifunctional compound units ($b_1$) and a monofunctional compound for the monofunctional compound units (c), respectively, in amounts as shown in Table 9. Esterification and melt polycondensation were conducted in the same manner as in Example 1, to prepare copolyester prepolymer chips. The copolyester prepolymers obtained were each subjected to solid phase polymerization under the conditions of temperature and time as shown in Table 9, to yield copolyesters. The copolyesters thus obtained were each tested for the content of structural units and properties in the same manner. The results are shown in Table 9 below.

The copolyesters obtained in Examples 5 through 8 were each extrusion blow molded in the same manner into bottles. The drawdown property and blow moldability of the parisons and the transparency, generation of gels, falling breakage height, and falling impact strength of the obtained bottles were determined or evaluated by the above-described methods. The results are shown in Table 13 below.

Examples 9 and 10

Terephthalic acid and ethylene glycol were used in amounts as shown in Table 10. In addition, 1,4-cyclohexanedimethanol, and pentaerythritol or trimethylolpropane, and m-anisic acid or benzoic acid, as an alicyclic or aliphatic bifunctional compound for the alicyclic or aliphatic bifunctional compound units ($a_1$), a multifunctional compound for the multifunctional compound units ($b_1$) and a monofunctional compound for the monofunctional compound units (c), respectively, in amounts as shown in Table 10. Esterification and melt polycondensation were conducted in the same manner as in Example 1, to prepare copolyester prepolymer chips. The copolyester prepolymers obtained were each subjected to solid phase polymerization under the conditions of temperature and time as shown in Table 10, to yield copolyesters. The copolyesters thus obtained were each tested for the content of structural units and properties in the same manner. The results are shown in Table 10 below.

The copolyesters obtained in Examples 9 and 10 were each extrusion blow molded in the same manner into bottles. The drawdown property and blow moldability of the parisons and the transparency, generation of gels, falling breakage height, and falling impact strength of the obtained bottles were determined or evaluated by the above-described methods. The results are shown in Table 13 below.

Comparative Examples 1 through 4

Terephthalic acid and ethylene glycol were used in amounts as shown in Table 11. In addition, 1,4-cyclohexanedimethanol, and trimellitic anhydride or trimethylol-propane, and 2-naphthoic acid or benzoic acid, as an alicyclic or aliphatic bifunctional compound for the alicyclic or aliphatic bifunctional compound units ($a_1$), a multifunctional compound for the multifunctional compound units ($b_1$) and a monofunctional compound for the monofunctional compound units (c), respectively, in amounts as shown in Table 11. Esterification and melt polycondensation were conducted in the same manner as in Example 1, to prepare copolyester prepolymer chips. The copolyester prepolymers obtained were each subjected to solid phase polymerization under the conditions of temperature and time as shown in Table 11 to yield copolyesters (in Comparative Example 4, where the copolyester prepolymer chips were amorphous, the chips were subjected to the below described extrusion blow molding as they were, without undergoing solid phase polymerization). The copolyesters thus obtained were each tested for the content of structural units and properties in the same manner (in Comparative Example 4, the tests were conducted at 210° C. for the above reason). The results are shown in Table 11 below.

The copolyesters obtained in Comparative Examples 1 through 4 were each extrusion blow molded into bottles in the same manner as in Example 1 (in Comparative Example 4, the extrusion blow molding was conducted at 210° C. for the reason mentioned above). The drawdown property and blow moldability of the parisons and the transparency, generation of gels, falling breakage height, and falling impact strength of the obtained bottles were determined or evaluated by the above-described methods. The results are shown in Table 13 below.

Comparative Example 5

Terephthalic acid and ethylene glycol were used in amounts as shown in Table 12. In addition, 1,4-cyclohexanedimethanol was used as an alicyclic or aliphatic bifunctional compound for the alicyclic or aliphatic bifunctional compound units ($a_1$) in an amount as shown in Table 12, but no multifunctional compound for the multifunctional compound units ($b_1$) or monofunctional compound for the monofunctional compound units (c) was used. Esterification and melt polycondensation were conducted in the same manner as in Example 1, to prepare copolyester prepolymer chips. The copolyester prepolymer obtained was subjected to solid phase polymerization under the conditions of temperature and time as shown in Table 12, to yield a copolyester. The copolyester was tested for the content of structural units and properties in the same manner. The results are shown in Table 12 below.

The copolyester obtained in Comparative Example 5 was extrusion blow molded into bottles in the same manner as in Example 1. The drawdown property and blow moldability of the parisons and the transparency, generation of gels, falling breakage height, and falling impact strength of the obtained bottles were determined or evaluated by the above-described methods. The results are shown in Table 13 below.

In Tables 8 through 12 that follow, compounds are labeled using the codes defined in Table 7 below.

TABLE 7

| Code | Compound |
| --- | --- |
| TPA | Terephthalic acid |
| EG | Ethylene glycol |
| DEG | Diethylene glycol |
| PD | 1,3-Propanediol |
| BEPD | 2-Butyl-2-ethyl-propanediol |
| CHDM | 1,4-Cyclohexane dimethanol |
| CHDC | 1,4-Cyclohexanedicarboxylic acid |
| TMA | Trimellitic anhydride |
| TMP | Trimethylolpropane |
| PENTA | Pentaerythritol |
| NA | 2-Naphthoic acid |
| TMOBA | 2,4,6-Trimethoxybenzoic acid |
| STOH | Stearyl alcohol |
| STA | Stearic acid |
| APEG | Polyethylene glycol monomethyl ether (molecular weight: 1,000) |
| BA | Benzoic acid |
| AA | m-Anisic acid |

TABLE 8

|  | Example 1 | Example 2 | Example 3 | Example 4 |
| --- | --- | --- | --- | --- |
| Starting mat'l component |  |  |  |  |
| Dicarboxylic acid component Type: parts by weight | TPA: 100.00 | TPA: 100.00 | TPA: 100.00 | TPA: 100.00 |
| Diol component Type: parts by weight | EG: 48.73 | EG: 48.73 | EG: 48.73 | EG: 48.73 |
| Bifunctional compound Type: parts by weight | CHDM: 4.34 | CHDM: 4.34 | CHDM: 4.39 | CHDM: 7.15 |
| Multi-functional compound Type: parts by weight | TMA: 0.116 | TMA: 0.347 | TMA: 1.157 | TMA: 0.347 |
| Monofunctional compound Type: parts by weight | NA: 0.104 | NA: 0.622 | NA: 1.037 | TMOBA: 1.916 |
| Prepolymer |  |  |  |  |
| Intrinsic viscosity (dl/g) | 0.70 | 0.69 | 0.69 | 0.69 |
| MFR (g/10 min) | 30 | 29 | 25 | 28 |
| Solid phase polymerization |  |  |  |  |
| temperature (°C.) | 210 | 210 | 210 | 210 |
| time (hr) | 29 | 21 | 20 | 28 |
| Copolyester [structural unit] |  |  |  |  |
| Dicarboxylic acid units Type: mole % | TPA: 49.91 | TPA: 49.56 | TPA: 49.01 | TPA: 49.11 |
| Diol units | EG: 46.37 | EG: 46.37 | EG: 46.34 | EG: 44.90 |
| Type: mole %[1)] |  |  |  |  |
| Type: mole %[1)] | DEG: 1.25 | DEG: 1.24 | DEG: 1.30 | DEG: 1.27 |
| Bifuctional compound units Type: mole %[1)] | CHDM: 2.38 | CHDM: 2.39 | CHDM: 2.36 | CHDM: 3.83 |
| Multi-functional compound units Type: mole %[1)] | TMA: 0.05 | TMA: 0.15 | TMA: 0.50 | TMA: 0.15 |
| Monofunctional compound units Type: mole %[1)] | NA: 0.04 | NA: 0.29 | NA: 0.49 | TMOBA: 0.74 |
| [Physical properties] |  |  |  |  |
| Intrinsic viscosity (dl/g) | 1.12 | 1.20 | 1.18 | 1.11 |

TABLE 8-continued

|  | Example 1 | Example 2 | Example 3 | Example 4 |
|---|---|---|---|---|
| MFR (g/10 min) | 1.5 | 0.7 | 1.5 | 1.8 |
| η 1 (poises) | $1.29 \times 10^5$ | $5.68 \times 10^5$ | $7.67 \times 10^5$ | $2.94 \times 10^5$ |
| η 2 (poises) | $1.39 \times 10^4$ | $2.12 \times 10^4$ | $1.95 \times 10^4$ | $1.41 \times 10^4$ |
| (1/3) $\log_{10}$ (η 2/η 1) | −0.32 | −0.48 | −0.53 | −0.44 |
| σ ss (dyne/cm$^2$) | $6.7 \times 10^6$ | $6.4 \times 10^6$ | $6.3 \times 10^6$ | $7.5 \times 10^6$ |
| σ 100 (dyne/cm$^2$) | $3.1 \times 10^6$ | $3.5 \times 10^6$ | $3.7 \times 10^6$ | $2.1 \times 10^6$ |
| Crystallinity (%) | 31 | 33 | 34 | 25 |
| Tg (°C.) | 78 | 79 | 78 | 80 |
| Tm (°C.) | 238 | 238 | 237 | 227 |
| Tcc (°C.) | 126 | 126 | 131 | 113 |
| ΔHcc (J/g) | 9 | 8 | 11 | 3 |

[1] Based on the sum of total constituting units of copolyesters.

TABLE 9

|  | Example 5 | Example 6 | Example 7 | Example 8 |
|---|---|---|---|---|
| Starting mat'l component |  |  |  |  |
| Dicarboxylic acid component Type: parts by weight | TPA: 94.00 | TPA: 95.00 | TPA: 100.00 | TPA: 100.00 |
| Diol component Type: parts by weight | EG: 48.73 | EG: 48.73 | EG: 48.73 | EG: 48.73 |
| Bifunctional compound Type: parts by weight | CHDC: 6.22 | CHDC: 5.12 | PD: 4.29 | BEPD: 5.28 |
| Multi-functional compound Type: parts by weight | TMP: 0.050 | TMA: 0.116 | TMA: 0.162 | TMA: 0.116 |
| Monofunctional compound Type: parts by weight | STA: 0.622 | NA: 0.311 | APEG: 0.602 | STOH: 0.081 |
| Prepolymer |  |  |  |  |
| Intrinsic viscosity (dl/g) | 0.70 | 0.70 | 0.70 | 0.70 |
| MFR (g/10 min) | 31 | 31 | 35 | 30 |
| Solid phase polymerization |  |  |  |  |
| temperature (°C.) | 210 | 210 | 210 | 210 |
| time (hr) | 29 | 21 | 25 | 30 |
| Copolyester [structural unit] |  |  |  |  |
| Dicarboxylic acid units Type: mole % | TPA: 46.82 | TPA: 47.33 | TPA: 50.00 | TPA: 49.96 |
| Diol units |  |  |  |  |
| Type: mole %[1] | EG: 48.73 | EG: 48.78 | EG: 45.48 | EG: 46.22 |
| Type: mole %[1] | DEG: 1.24 | DEG: 1.22 | DEG: 1.25 | DEG: 1.27 |
| Bifuctional compound units Type: mole %[1] | CHDC: 3.00 | CHDC: 2.47 | PD: 3.12 | BEPD: 2.49 |
| Multi-functional compound units Type: mole %[1] | TMP: 0.03 | TMA: 0.05 | TMP: 0.10 | TMA: 0.04 |
| Monofunctional compound units Type: mole %[1] | STA: 0.18 | NA: 0.15 | APEG: 0.05 | STOH: 0.02 |
| [Physical properties] |  |  |  |  |
| Intrinsic viscosity (dl/g) | 1.22 | 1.05 | 1.00 | 1.22 |
| MFR (g/10 min) | 0.7 | 1.9 | 2.2 | 0.7 |
| η 1 (poises) | $1.45 \times 10^5$ | $1.15 \times 10^5$ | $1.70 \times 10^5$ | $2.24 \times 10^5$ |
| η 2 (poises) | $2.15 \times 10^4$ | $1.18 \times 10^4$ | $1.20 \times 10^4$ | $2.22 \times 10^4$ |
| (1/3) $\log_{10}$ (η 2/η 1) | −0.28 | −0.33 | −0.38 | −0.33 |
| σ ss (dyne/cm$^2$) | $8.0 \times 10^6$ | $7.8 \times 10^6$ | $5.5 \times 10^6$ | $6.2 \times 10^6$ |
| σ 100 (dyne/cm$^2$) | $3.4 \times 10^6$ | $1.8 \times 10^6$ | $1.5 \times 10^6$ | $3.1 \times 10^6$ |
| Crystallinity (%) | 26 | 31 | 29 | 27 |
| Tg (°C.) | 72 | 74 | 73 | 78 |
| Tm (°C.) | 234 | 239 | 233 | 236 |
| Tcc (°C.) | 120 | 123 | 130 | 125 |
| ΔHcc (J/g) | 6 | 8 | 9 | 8 |

[1] Based on the sum of total constituting units of copolyesters.

TABLE 10

|  | Example 9 | Example 10 |
|---|---|---|
| Starting mat'l component |  |  |
| Dicarboxylic acid component<br>Type: parts by weight | TPA: 100.00 | TPA: 100.00 |
| Diol component<br>Type: parts by weight | EG: 48.73 | EG: 48.73 |
| Bifunctional compound<br>Type: parts by weight | CHDM: 3.63 | CHDM: 4.34 |
| Multi-functional compound<br>Type: parts by weight | PENTA: 0.379 | TMP: 0.5437 |
| Monofunctional compound<br>Type: parts by weight | AA: 1.557 | BA: 0.882 |
| Prepolymer |  |  |
| Intrinsic viscosity (dl/g) | 0.69 | 0.70 |
| MFR (g/10 min) | 32 | 28 |
| Solid phase polymerization |  |  |
| temperature (°C.) | 210 | 210 |
| time (hr) | 18 | 24 |
| Copolyester [structural unit] |  |  |
| Dicarboxylic acid units<br>Type: mole % | TPA: 49.15 | TPA: 49.40 |
| Diol units |  |  |
| Type: mole %[1] | EG: 46.57 | EG: 46.08 |
| Type: mole %[1] | DEG: 1.20 | DEG: 1.24 |
| Bifuctional compound units<br>Type: mole %[1] | CHDM: 2.01 | CHDM: 2.36 |
| Multi-functional compound units<br>Type: mole %[1] | PENTA: 0.22 | TMP: 0.32 |
| Monofunctional compound units<br>Type: mole %[1] | AA: 0.85 | BA: 0.60 |

TABLE 10-continued

|  | Example 9 | Example 10 |
|---|---|---|
| [Physical properties] |  |  |
| Intrinsic viscosity (dl/g) | 1.08 | 1.15 |
| MFR (g/10 min) | 0.8 | 1.8 |
| $\eta$ 1 (poises) | $3.31 \times 10^5$ | $4.51 \times 10^5$ |
| $\eta$ 2 (poises) | $1.02 \times 10^4$ | $1.61 \times 10^4$ |
| $(1/3) \log_{10} (\eta\ 2/\eta\ 1)$ | −0.50 | −0.48 |
| $\sigma$ ss (dyne/cm$^2$) | $6.5 \times 10^6$ | $7.0 \times 10^6$ |
| $\sigma$ 100 (dyne/cm$^2$) | $1.8 \times 10^6$ | $2.3 \times 10^6$ |
| Crystallinity (%) | 35 | 34 |
| Tg (°C.) | 78 | 78 |
| Tm (°C.) | 238 | 234 |
| Tcc (°C.) | 137 | 134 |
| ΔHcc (J/g) | 15 | 13 |

[1] Based on the sum of total constituting units of copolyesters.

TABLE 11

|  | Comp. Ex. 1 | Comp. Ex. 2 | Comp. Ex. 3 | Comp. Ex. 4 |
|---|---|---|---|---|
| Starting mat'l component |  |  |  |  |
| Dicarboxylic acid component<br>Type: parts by weight | TPA: 100.00 | TPA: 100.00 | TPA: 100.00 | TPA: 100.00 |
| Diol component<br>Type: parts by weight | EG: 48.73 | EG: 48.73 | EG: 48.73 | EG: 48.73 |
| Bifunctional compound<br>Type: parts by weight | CHDM: 0.868 | CHDM: 4.50 | CHDM: 0.868 | CHDM: 31.53 |
| Multi-functional compound<br>Type: parts by weight | TMA: 0.1157 | TMA: 3.36 | TMA: 0.1157 | TMA: 0.543 |
| Monofunctional compound<br>Type: parts by weight | NA: 0.1086 | NA: 3.00 | NA: 3.1096 | BA: 0.882 |
| Prepolymer |  |  |  |  |
| Intrinsic viscosity (dl/g) | 0.70 | 0.70 | 0.68 | 0.70 |
| MFR (g/10 min) | 30 | 28 | 39 | 24 |
| Solid phase polymerization |  |  |  |  |
| temperature (°C.) | 210 | 210 | 210 | — |
| time (hr) | 63 | 7 | 52 | — |
| Copolyester [structural unit] |  |  |  |  |
| Dicarboxylic acid units<br>Type: mole % | TPA: 49.90 | TPA: 47.11 | TPA: 48.45 | TPA: 49.85 |
| Diol units | EG: 48.29 | EG: 46.33 | EG: 48.25 | EG: 46.30 |
| Type: mole %[1] |  |  |  |  |

TABLE 11-continued

|  | Comp. Ex. 1 | Comp. Ex. 2 | Comp. Ex. 3 | Comp. Ex. 4 |
|---|---|---|---|---|
| Type: mole %[1] | DEG: 1.24 | DEG: 1.23 | DEG: 1.26 | DEG: 1.22 |
| Bifuctional compound units Type: mole %[1] | CHDM: 0.47 | CHDM: 2.44 | CHDM: 0.49 | CHDM: 15.13 |
| Multi-functional compound units Type: mole %[1] | TMA: 0.05 | TMA: 1.45 | TMA: 0.05 | TMP: 0.32 |
| Monofunctional compound units Type: mole %[1] | NA: 0.05 | NA: 1.44 | NA: 1.50 | BA: 0.60 |
| [Physical properties] | | | | |
| Intrinsic viscosity (dl/g) | 1.10 | —[2] | 0.91 | 0.7[3] |
| MFR (g/10 min) | 1.1 | 0.5 | 12.0 | 2.8 |
| η 1 (poises) | $1.29 \times 10^5$ | $3.26 \times 10^5$ | $3.35 \times 10^5$ | $2.15 \times 10^5$ |
| η 2 (poises) | $1.41 \times 10^4$ | $2.36 \times 10^4$ | $1.36 \times 10^4$ | $3.62 \times 10^4$ |
| (1/3) $\log_{10}$ (η 2/η 1) | −0.32 | −0.71 | −0.19 | −0.26 |
| σ ss (dyne/cm$^2$) | $3.4 \times 10^6$ | $6.2 \times 10^6$ | $2.8 \times 10^6$ | $1.5 \times 10^6$ |
| σ 100 (dyne/cm$^2$) | $3.8 \times 10^6$ | $8.7 \times 10^6$ | $9.3 \times 10^6$ | $4.8 \times 10^6$ |
| Crystallinity (%) | 42 | 37 | 41 | — |
| Tg (°C.) | 78 | 78 | 78 | 81 |
| Tm (°C.) | 249 | 237 | 249 | — |
| Tcc (°C.) | 151 | 142 | 159 | — |
| ΔHcc (J/g) | 18 | 17 | 21 | — |

[1] Based on the sum of total constituting units of copolyesters.
[2] Could not be tested because of generation of too many gels.
[3] The prepolymer was tested at 210° C.

TABLE 12

|  | Comp. Ex. 5 |
|---|---|
| Starting mat'l component | |
| Dicarboxylic acid component Type: parts by weight | TPA: 100.00 |
| Diol component Type: parts by weight | EG: 48.73 |
| Bifunctional compound Type: parts by weight | CHDM: 3.20 |
| Multi-functional compound Type: parts by weight | — |
| Monofunctional compound Type: parts by weight | — |
| Prepolymer | |
| Intrinsic viscosity (dl/g) | 0.70 |
| MFR (g/10 min) | 34 |
| Solid phase polymerization | |
| temperature (°C.) | 210 |
| time (hr) | 50 |
| Copolyester [structural unit] | |
| Dicarboxylic acid units Type: mol % | TPA: 50.00 |
| Diol units | |
| Type: mole %[1] | EG: 46.75 |
| Type: mole %[1] | DEG: 1.50 |
| Bifuctional compound units Type: mole %[1] | CHDM: 1.75 |
| Multi-functional compound units Type: mole %[1] | — |
| Monofunctional compound units Type: mole %[1] | — |
| [Physical properties] | |
| Intrinsic viscosity (dl/g) | 1.11 |
| MFR (g/10 min) | 5.9 |
| η 1 (poises) | $3.10 \times 10^4$ |
| η 2 (poises) | $6.80 \times 10^5$ |
| (1/3) $\log_{10}$ (η 2/η 1) | −0.18 |
| σ ss (dyne/cm$^2$) | $6.1 \times 10^6$ |
| σ 100 (dyne/cm$^2$) | $2.3 \times 10^6$ |
| Crystallinity (%) | 41 |
| Tg (°C.) | 76 |
| Tm (°C.) | 242 |
| Tcc (°C.) | 153 |
| ΔHcc (J/g) | 23 |

[1] Based on the sum of total constituting units of copolyesters.
[2] The prepolymer was tested at 210° C.

TABLE 13

| | Drawdown property of parison[1] | | | Blow moldability | | | | | | | Falling impact strength[3] | |
|---|---|---|---|---|---|---|---|---|---|---|---|---|
| | Draw-down time (sec) | Difference between max. and min. diameters[2] (cm) | Overall evaluation | Average wall thickness (mm) | Thickness unevenness (mm) | Overall evaluation | Transparency of bottle | | | Gel generation of bottle | Breakage height[4] (cm) | Overall evaluation |
| | | | | | | | Haze value | b-value | Overall evaluation | | | |
| Example 1 | 16 | 0.5 | ○ | 0.40 | 0.2 | ○ | 2.3 | 0.3 | ○ | ⊚ | 140 | ⊚ |
| Example 2 | 21 | 0.2 | ○ | 0.55 | 0.15 | ○ | 2.4 | 0.4 | ○ | ⊚ | 130 | ⊚ |
| Example 3 | 24 | 0.2 | ○ | 0.60 | 0.15 | ○ | 2.8 | 1.2 | ○ | ⊚ | 130 | ⊚ |
| Example 4 | 19 | 0.3 | ○ | 0.50 | 0.2 | ○ | 2.5 | 1.4 | ○ | ⊚ | 150 | ⊚ |
| Example 5 | 18 | 0.3 | ○ | 0.50 | 0.2 | ○ | 2.5 | 1.5 | ○ | ⊚ | 140 | ⊚ |
| Example 6 | 16 | 0.4 | ○ | 0.40 | 0.2 | ○ | 2.9 | 1.9 | ○ | ⊚ | 130 | ⊚ |
| Example 7 | 17 | 0.4 | ○ | 0.45 | 0.2 | ○ | 2.2 | 0.9 | ○ | ⊚ | 100 | ○ |
| Example 8 | 19 | 0.3 | ○ | 0.50 | 0.15 | ○ | 2.1 | 1.2 | ○ | ⊚ | 110 | ○ |
| Example 9 | 20 | 0.3 | ○ | 0.50 | 0.15 | ○ | 3.8 | 1.3 | ○ | ⊚ | 120 | ⊚ |
| Example 10 | 20 | 0.2 | ○ | 0.55 | 0.15 | ○ | 3.5 | 1.5 | ○ | ⊚ | 120 | ⊚ |
| Comp. Ex. 1 | 14 | 0.8 | Δ | 0.30 | 0.40 | X | 8.3 | 1.3 | X | ⊚ | 60 | X |
| Comp. Ex. 2 | 33 | 0.1 | Δ | 0.65 | 0.50 | X | 9.8 | 2.3 | X | X | 70 | X |
| Comp. Ex. 3 | 9 | 2.5 | X | 0.25 | 0.40 | X | 13.3 | 2.1 | X | ⊚ | 50 | X |
| Comp. Ex. 4[5] | 13 | 1.2 | Δ | 0.25 | 0.40 | X | 10.3 | 4.3 | X | ⊚ | 50 | X |
| Comp. Ex. 5 | 8 | 2.7 | X | 0.20 | 0.50 | X | 5.3 | 2.4 | Δ | ⊚ | 50 | X |

[1] Drawdown property of parison
[2] Difference between the maximum and minimum diameters of parison.
[3] Falling impact strength of bottle
[4] Falling breakage height of bottle
[5] Molded at 210° C.

The following is understood from Tables 8 through 10 and Table 13.

The copolyesters of Examples 1 through 10, containing terephthalic acid units and ethylene glycol units; containing units ($a_1$) from an alicyclic or aliphatic bifunctional compound and units ($b_1$) from a multifunctional compound in amounts of 1 to 4 mole % and 0.005 to 1 mole % respectively, based on the moles of total constituent units of the copolyesters; containing units (c) from a monofunctional compound in an amount satisfying the above formula ($\alpha$), and having an intrinsic viscosity suited for melt molding such as extrusion blow molding, can be produced smoothly by solid phase polymerization in less than 30 hours. On producing bottles by extrusion blow molding of the obtained copolyester in any of the Examples, the drawdown time of extruded parisons is in the range of 16 to 24 seconds, the difference between the maximum and minimum diameters of parisons is not more than 0.5 cm, the production of bottles is at least 120 pieces per hour with the defectives being less than 10 pieces per 100 pieces, and the obtained bottles have an average wall thickness of 0.30 to 0.7 mm and uneven thickness of less than 0.3 mm, which represents excellent blow moldability. Further, the bottles obtained in Examples 1 through 10 have a haze value of not more than 4 and a b-value of less than 2, thus proving excellent transparency and surface neatness. The bottles have a gel generation of not more than 2.5% and a falling breakage height of at least 100 cm, i.e., excellent falling impact strength.

The results of Tables 11 and 13 show that the copolyesters of Comparative Examples 1 through 3, containing terephthalic acid units and ethylene glycol units and containing amounts differing from the ranges of the present invention of units ($a_1$) of an alicyclic or aliphatic bifunctional compound, units ($b_1$) of a multifunctional compound or units (c) of a monofunctional compound, had poor drawdown property of parisons. On producing bottles by extrusion blow, molding of these copolyesters, the obtained bottles had a thickness unevenness of at least 0.3 mm, which indicates poor blow moldability. Furthermore, the bottles had a haze value of at least 5, which represents poor transparency. The bottles had a falling breakage height of 50 to 70 cm, indicating low quality. The solid phase polymerization in Comparative Examples 1 and 3 required 63 hours and 52 hours, respectively, indicating low productivity.

The results of Tables 11 and 13 show that the copolyester of Comparative Example 4 was amorphous, said copolyester containing terephthalic acid units and ethylene glycol units and, while containing units ($a_1$) from an alicyclic or aliphatic bifunctional compound, units ($b_1$) from a multifunctional compound, and units (c) from a monofunctional compound, having a content of the alicyclic or aliphatic bifunctional compound units of more than 4 mole % based on the moles of total constituent units of the copolyester. The degree of polymerization of the copolyester could therefore not be increased by solid phase polymerization. The copolyester could not show a high melt viscosity at a temperature of 270° C., so that extrusion blow molding was impossible at this temperature. Extrusion molding was hence conducted at a temperature of 210° C., at which molding was barely possible. The resulting parisons had poor drawdown properties. Bottles produced had a thickness unevenness of 0.4 mm, which represents poor blow moldability. Furthermore, the bottles obtained in Comparative Example 4, having been molded at a low temperature, had a finely roughened surface, and a haze value of 10.3, i.e., poor transparency, and poor tactility. The bottles had a falling breakage height of 50 cm, i.e., low falling impact strength and low quality.

The results of Tables 11 and 13 show that the copolyester of Comparative Example 5 had poor drawdown property of parisons, containing terephthalic acid units and ethylene glycol units and, while containing units ($a_1$) from an alicyclic or aliphatic bifunctional compound, contained no units ($b_1$) from a multifunctional compound or units (c) from a monofunctional compound. On producing bottles by extrusion blow molding of the copolyester, the obtained bottles had a thickness unevenness of 0.5 mm, indicating poor blow moldability. Furthermore, the bottles had a haze value of 4.1, indicating a little poor transparency. The bottles had a falling breakage height of 50 cm, indicating low falling impact strength and low quality. The solid phase polymerization in Comparative Examples 5 took as long as 72 hours, i.e., the productivity was very low.

Examples 11 and 12 and Comparative Examples 6 and 7

Terephthalic acid and ethylene glycol were used in amounts as shown in Table 14. 1,4-Cyclohexanedimethanol, trimellitic anhydride, and benzoic acid were used in amounts as shown, as an alicyclic or aliphatic bifunctional compound for the alicyclic or aliphatic bifunctional compound units ($a_1$), an multifunctional compound for the multifunctional compound units ($b_1$), and an monofunctional compound for the monofunctional compound units (c), respectively. Esterification and melt polycondensation were conducted in the same manner as in Example 1, to provide copolyester prepolymer chips. The copolyester prepolymers obtained were subjected to solid phase polymerization under the conditions of temperature and time as shown in Table 14, to yield copolyesters. The copolyesters thus obtained were tested for the content of structural units and properties in the same manner. The results are shown in Table 14 below.

The copolyesters obtained in these Examples 11 and 12 and Comparative Examples 6 and 7 were extrusion blow molded in the same manner as in Example 1 into bottles. The drawdown property and blow moldability of the parisons and the transparency, generation of gels, falling breakage height, and falling impact strength of the obtained bottles were determined or evaluated by the methods described above. The results are shown in Table 15 below.

In Table 14, compounds are labeled using the codes defined in Table 7 above.

TABLE 14

|  | Example 11 | Example 12 | Comp. Ex. 6 | Comp. Ex. 7 |
| --- | --- | --- | --- | --- |
| Starting mat'l component |  |  |  |  |
| Dicarboxylic acid component |  |  |  |  |
| Type: parts by weight | TPA: 100.00 | TPA: 100.00 | TPA: 100.00 | TPA: 100.00 |
| Diol component |  |  |  |  |
| Type: parts by weight | EG: 48.73 | EG: 48.73 | EG: 48.73 | EG: 48.73 |
| Bifunctional compound |  |  |  |  |
| Type: parts by weight | CHDM: 4.50 | CHDM: 4.50 | CHDM: 4.50 | CHDM: 4.50 |
| Multi-functional compound |  |  |  |  |
| Type: parts by weight | TMA: 0.116 | TMA: 1.272 | TMA: 0.116 | TMA: 1.272 |
| Monofunctional compound |  |  |  |  |
| Type: parts by weight | BA: 0.074 | BA: 0.662 | BA: 2.940 | BA: 0.0074 |
| Prepolymer Intrinsic viscosity (dl/g) | 0.70 | 0.69 | 0.60 | 0.70 |
| MFR (g/10 min) | 30 | 25 | 52 | 23 |
| Solid phase polymerization |  |  |  |  |
| temperature (°C.) | 210 | 210 | 200 | 210 |
| time (hr) | 28 | 19 | 72 | 19 |
| Copolyester [structural unit] |  |  |  |  |
| Dicarboxylic acid units |  |  |  |  |
| Type: mole % | TPA: 49.90 | TPA: 49.05 | TPA: 47.95 | TPA: 49.495 |
| Diol units |  |  |  |  |
| Type: mole %[1] | EG: 46.38 | EG: 46.25 | EG: 46.30 | EG: 46.29 |
| Type: mole %[1] | DEG: 1.18 | DEG: 1.29 | DEG: 1.24 | DEG: 1.26 |
| Bifuctional compound units |  |  |  |  |
| Type: mole %[1] | CHDM: 2.44 | CHDM: 2.46 | CHDM: 2.46 | CHDM: 2.45 |
| Multi-functional compound units |  |  |  |  |
| Type: mole %[1] | TMA: 0.05 | TMA: 0.50 | TMA: 0.05 | TMA: 0.50 |
| Monofunctional compound units |  |  |  |  |
| Type: mole %[1] | BA: 0.05 | BA: 0.45 | BA: 2.00 | BA: 0.005 |
| [Physical properties] Intrinsic viscosity (dl/g) | 1.11 | 1.16 | 0.72 | —[2] |
| MFR (g/10 min) | 1.6 | 1.5 | 30 | 1.0 |
| η 1 (poises) | $1.25 \times 10^5$ | $7.05 \times 10^5$ | $1.18 \times 10^3$ | $1.20 \times 10^6$ |
| η 2 (poises) | $1.37 \times 10^4$ | $1.90 \times 10^4$ | $9.80 \times 10^2$ | $2.85 \times 10^4$ |
| (½) $\log_{10}$ (η 2/η 1) | −0.32 | −0.52 | −0.03 | −0.54 |
| σ ss (dyne/cm²) | $6.8 \times 10^6$ | $6.5 \times 10^6$ | $6.5 \times 10^6$ | $6.0 \times 10^6$ |
| σ 100 (dyne/cm²) | $3.0 \times 10^6$ | $3.5 \times 10^6$ | $3.8 \times 10^5$ | $4.4 \times 10^6$ |
| Crystallinity (%) | 32 | 35 | 40 | 36 |
| Tg (°C.) | 79 | 78 | 79 | 79 |
| Tm (°C.) | 239 | 237 | 223 | 239 |

TABLE 14-continued

|  | Example 11 | Example 12 | Comp. Ex. 6 | Comp. Ex. 7 |
|---|---|---|---|---|
| Tcc (°C.) | 130 | 132 | 172 | 141 |
| ΔHcc (J/g) | 10 | 11 | 22 | 18 |

[1] Based on the sum of total constituting units of copolyesters.
[2] Could not be tested because of generation of too may gels.

TABLE 15

| | Drawdown property of parison[1] | | | Blow moldability | | | Transparency of bottle | | | Gel | Falling impact strength[3] | |
|---|---|---|---|---|---|---|---|---|---|---|---|---|
| | Draw-down time (sec) | Difference between max. and min. diameters[2] (cm) | Over-all evalu-ation | Average wall thick-ness (mm) | Thick-ness un-evenness (mm) | Over-all evalu-ation | Haze va-lue | b-va-lue | Over-all evalu-ation | gene-ration of bottle | Breakage height[4] (cm) | Over-all evalu-ation |
| Example 11 | 16 | 0.5 | ○ | 0.40 | 0.20 | ○ | 2.7 | 0.5 | ○ | ○ | 140 | ◎ |
| Example 12 | 24 | 0.2 | ○ | 0.60 | 0.15 | ○ | 2.5 | 0.9 | ○ | ○ | 130 | ◎ |
| Comp. Ex. 6 | 2 | —[5] | × | — | — | — | — | — | — | — | — | — |
| Comp. Ex. 7 | 34 | 0.5 | △ | 0.65 | 0.55 | × | 10.2 | 2.5 | × | × | 80 | × |

[1] Drawdown property of parison
[2] Difference between the maximum and minimum diameters of parison.
[3] Falling impact strength of bottle
[4] Falling breakage height of bottle
[5] Parison could not be formed and hence could not be measured.

The following discussion is based on the results shown in Tables 14 and 15.

The copolyesters of Examples 11 and 12, containing terephthalic acid units and ethylene glycol units, and further containing units ($a_1$) from an alicyclic or aliphatic bifunctional compound, and units ($b_1$) from a multifunctional compound in amounts of 1 to 4 mole % and 0.005 to 1 mole %, respectively, based on the moles of total constituent units of the copolyesters, and units (c) from a monofunctional compound in an amount satisfying the above formula (α) can, like those in Examples 1 through 10, be produced smoothly by solid phase polymerization in a period of time of not more than 30 hours to have an intrinsic viscosity suitable for melt molding such as extrusion blow molding. On producing bottles by extrusion blow molding of the copolyesters in Examples 11 and 12, the drawdown time and blow moldability were excellent, as in Examples 1 through 10. The obtained bottles had excellent transparency and surface neatness, generated very few gels, and had high falling impact strength.

The copolyester of Comparative Example 6, containing terephthalic acid units and ethylene glycol units, and further containing units ($a_1$) from an alicyclic or aliphatic bifunctional compound, and units ($b_1$) from a multifunctional compound in an amount of 1 to 4 mole % and 0.005 to 1 mole %, respectively, and while containing units (c) from a monofunctional compound, having a content of the monofunctional compound units (c) exceeding the range of the formula (α), had low viscosity, since the degree of polymerization could not be increased to a sufficient level by melt polymerization and solid phase polymerization. The copolyester could not form a parison when subjected to extrusion blow molding, thereby failing to yield molded articles.

The copolyester of Comparative Example 7, containing terephthalic acid units and ethylene glycol units, and further containing units ($a_1$) from an alicyclic or aliphatic bifunctional compound, and units ($b_1$) from a multifunctional compound in an amount of 1 to 4 mole % and 0.005 to 1 mole %, respectively and, while containing units (c) from a monofunctional compound, having a content of the monofunctional compound units (c) of less than the range of the formula (α), had problems on extrusion blow molding. That is, there occurred severely uneven extrusion and the parison was difficult to form. On producing bottles by extrusion blow molding of the copolyester, the obtained bottles had a thickness unevenness of at least 0.3 mm, thus proving poor blow moldability. Furthermore, the bottles had a haze value of at least 5, indicating poor transparency. The bottles had many agglomerates due to gelation and had a falling breakage height of 80 cm, indicating low falling impact strength and low quality.

Example 13

(1) A slurry was prepared from 100.00 parts by weight of terephthalic acid, 48.73 parts by weight of ethylene glycol, 5.75 parts by weight of 22-bis[4-(2-hydroxyethoxy)phenyl]propane, 0.081 parts by weight of trimethylolpropane, and 0.015 parts by weight of benzoic acid. To the slurry were added 0.020 parts by weight of germanium dioxide, 0.015 parts by weight of phosphorus acid, 0.015 parts by weight of cobalt acetate, and 0.015 parts by weight of tetraethylammonium hydroxide. The resulting slurry was heated under pressure (absolute pressure: 2.5 kg/cm$^2$) to a temperature of 250° C., to conduct esterification to an esterification ratio of 95%, to produce a low-polymerization-degree compound. The compound thus obtained was melt polycondensed under reduced pressure of 1 mm Hg and a temperature of 270° C. to yield a copolyester prepolymer having an intrinsic viscosity of 0.70 dl/g. The prepolymer was extruded through a nozzle into a strand, which was then cut into cylindrical chips (diameter: about 2.5 mm, length: about 3.5 mm). The pre-polymer had a melt flow rate (MFR) at 270° C. of 32 g/10 min.

(2) The copolyester prepolymer chips thus obtained were pre-dried at a temperature of 150° C. for 5 hours, then subjected to solid phase polymerization with a tumbling type vacuum solid phase polymerization apparatus under a reduced pressure of 0.1 mm Hg at 210° C. for 27 hours, to yield a high molecular copolyester.

(3) The copolyester obtained in (2) above was tested for the content of each of the structural units by the method above. The content of terephthalic acid units, ethylene glycol units, 2,2-bis[4-(2-hydroxyethoxy)phenyl]propane units, trimethylolpropane units, benzoic acid units, or diethylene glycol units was as shown in Table 17 below.

(4) The copolyester obtained in (2) above was also tested for physical properties in accordance with the above-described methods, to show, as shown in Table 17 below, an intrinsic viscosity of 1.10 dl/g, an MFR at 270° C. of 2.0 g/10 min, and melt viscosities at the same temperature and at a shear rate of 0.1 rad/sec ($\eta 1$) and at a shear rate of 100 rad/sec ($\eta 2$) of $1.36 \times 10^5$ poises and $1.40 \times 10^4$ poises, respectively, leading to a value of $(\frac{1}{3})\log_{10} (\eta 2/\eta 1)$ of $-0.33$.

The copolyester obtained in (2) above was further tested for shark-skin critical shear stress ($\sigma ss$) and shear stress ($\sigma 100$) at a shear rate of 100/sec and a temperature of 270° C., to show $5.0 \times 10^6$ dyne/cm$^2$ and $2.6 \times 10^6$ dyne/cm$^2$, respectively.

The copolyester obtained in (2) above was further tested for ($\chi c$), Tg, Tm, Tcc and $\Delta$Hcc, to show 33%, 79° C., 243° C., 143° C. and 15 J/g, respectively, as shown in Table 17 below.

The copolyester obtained in (2) above had a terminal carboxyl group concentration (CEG) of 12 µequivalent/g.

(5) The copolyester obtained in (2) above was extrusion blow molded through an extrusion blow molding machine (hollow molding machine Type BM-304.J2, made by Placo Co.) into bottles (designed capacity: 1,800 ml, designed weight: 80 g). The intermediate product parisons were tested for drawdown property and blow moldability, and the resulting bottles were tested for transparency, generation of gels, generation of agglomerates, falling breakage height, and falling impact strength, in accordance with the above-described methods, to give the results shown in Table 22 below.

Examples 14 through 16

Terephthalic acid and ethylene glycol were used in amounts as shown in Table 17 below. In addition, 2,2bis[4-(2-hydroxyethoxy) phenyl]propane, and trimethylolpropane or trimellitic anhydride, and 2-naphthoic acid, benzoic acid or 2,4,6-trimethoxybenzoic acid were used as a bifunctional compound for the diol units (I) and/or diol units (II) having a benzene ring, a multifunctional compound for the multifunctional compound units ($b_1$) and a monofunctional compound for the monofunctional compound units (c), respectively, in amounts as shown in Table 17. Esterification and melt polycondensation were conducted in the same manner as in Example 13, to prepare copolyester prepolymer chips. The series of the copolyester prepolymers obtained were each subjected to solid phase polymerization under the conditions of temperature and time as shown in Table 17, to yield copolyesters.

The copolyesters thus obtained were each tested for the content of structural units and properties in the same manner as described in Example 13. The results are shown in Table 17 below.

The copolyesters obtained in Examples 14 through 16 were each extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 22 below.

Examples 17 through 20

Terephthalic acid and ethylene glycol were used in amounts as shown in Table 18. In addition, bis[4-(2-hydroxyethoxy)phenyl]sulfone or 1,4-bis(2-hydroxyethoxy) benzene, and pentaerythritol, trimellitic anhydride or trimesic acid, and stearic acid, stearyl alcohol, m-anisic acid or benzoic acid were used as a bifunctional compound for the diol units (I) and/or diol units (II) having a benzene ring, a multifunctional compound for the multi-functional compound units ($b_1$) and a monofunctional compound for the monofunctional compound units (c), respectively, in amounts as shown in Table 18. Esterification and melt polycondensation were conducted to prepare copolyester prepolymer chips in the same manner as in Example 13. The copolyester prepolymers obtained were each subjected to solid phase polymerization under the conditions of temperature and time shown in Table 18, to yield copolyesters. The copolyesters thus obtained were each tested for the content of structural units and properties in the same manner. The results are shown in Table 18 below.

The copolyesters obtained in these Examples 17 through 20 were each extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 22 below.

Comparative Examples 8 through 11

Terephthalic acid and ethylene glycol were used in amounts as shown in Table 19. In addition, neopentyl glycol was added or not added, or isophthalic acid was added, as a bifunctional compound for bifunctional compound units. Trimethylolpropane, trimellitic acid, or pentaerythritol were present in amounts as shown in Table 19, as a multifunctional compound for the multi-functional compound units ($b_1$). Benzoic acid or m-anisic acid were present in amounts as shown, as a monofunctional compound for the monofunctional compound units (c). Esterification and melt polycondensation were conducted in the same manner as in Example 13, to prepare copolyester prepolymer chips. The copolyester prepolymers obtained were each subjected to solid phase polymerization under the conditions of temperature and time as shown in Table 19, to yield copolyesters. The copolyesters thus obtained were each tested for the content of structural units and properties in the same manner as in Example 13. The results are shown in Table 19 below.

The copolyesters obtained in Comparative Examples 8 through 11 were each extrusion blow molded into bottles in the same manner as in Example 13. The drawdown property and blow moldability of the parisons and the transparency, generation of gels, generation of agglomerates, falling breakage height, and falling impact strength of the obtained bottles were determined or evaluated by the above-described methods. The results are shown in Table 22 below.

Comparative Examples 12 through 15

Terephthalic acid and ethylene glycol were used in amounts as shown in Table 20. In addition, no bifunctional compound for the diol units (I) and/or diol units (II) having a benzene ring was used or 2,2-bis[4-(2-hydroxyethoxy)

phenylpropane was used as a bifunctional compound for the diol units (I) and/or diol units (II) having a benzene ring. No multifunctional compound for the multifunctional compound units ($b_1$) was used or trimethylolpropane was used in an amount as shown in Table 20, as a multifunctional compound for the multifunctional compound units ($b_1$). No monofunctional compound for the monofunctional compound units (c) was used or 2-naphthoic acid was used, in an amount as shown, as a monofunctional compound for the monofunctional compound units (c). Esterification and melt polycondensation were conducted in the same manner as in Example 13, to prepare copolyester prepolymer chips. The copolyester prepolymers obtained were each subjected to solid phase polymerization under the conditions of temperature and time as shown in Table 20, to yield copolyesters. In Comparative Examples 13 and 15, where the copolyester chips were amorphous, solid phase polymerization was not conducted and the chips were subjected as they were to the extrusion blow molding described below.

The copolyesters thus obtained were each tested for the content of structural units and properties in the same manner as in Example 13. Here, as described above, the tests were conducted at 210° C. in Comparative Examples 13 and 15. The results are shown in Table 20 below.

The copolyesters obtained in Comparative Examples 12 through 15 were each extrusion blow molded into bottles in the same manner as in Example 13. Here, as described above, the extrusion blow molding was conducted at 210° C. in Comparative Examples 13 and 15. The drawdown property and blow moldability of the parisons and the transparency, generation of gels, generation of agglomerates, falling breakage height, and falling impact strength of the obtained bottles were determined or evaluated by the above-described methods. The results are shown in Table 22 below.

Comparative Examples 16 through 18

Terephthalic acid and ethylene glycol were used in amounts as shown in Table 21 below. In addition, 2,2-bis [4-(2-hydroxyethoxy) phenylpropane was used as a bifunctional compound for the diol units (I) and/or diol units, (II) having a benzene ring. Trimellitic acid was present in amounts as shown in Table 21, as a multifunctional compound for the multifunctional compound units ($b_1$). Benzoic acid was present in amounts as shown, as a monofunctional compound for the monofunctional compound units (c). Esterification and melt polycondensation were conducted in the same manner as in Example 13, to prepare copolyester prepolymer chips. The copolyester prepolymers obtained were each subjected to solid phase polymerization under the conditions of temperature and time as shown in Table 21, to yield copolyesters. The copolyesters thus obtained were each tested for the content of structural units and properties in the same manner as in Example 13. The results are shown in Table 21 below.

The copolyesters obtained in Comparative Examples 16 through 18 were each extrusion blow molded into bottles in the same manner as in Example 13. The drawdown property and blow moldability of the parisons and the transparency, generation of gels, generation of agglomerates, falling breakage height, and falling impact strength of the obtained bottles were determined or evaluated by the above-described methods. The results are shown in Table 22 below.

Abbreviations used in Tables 17 through 21 are defined in Table 16 below.

TABLE 16

| Code | Compound |
|---|---|
| TPA | Terephthalic acid |
| EG | Ethylene glycol |
| DEG | Diethylene glycol |
| EOBPA | 2,2-Bis[4-(2-hydroxyethoxy)phenyl]propane |
| EOBPS | Bis[4-(2-hydroxyethoxy)phenyl]sulfone |
| BHEB | 1,4-Bis(2-hydroxyethoxy)benzene |
| NPG | Neopentyl glycol |
| IPA | Isophthalic acid |
| TMA | Trimellitic anhydride |
| TMSA | Trimesic acid |
| TMP | Trimethylolpropane |
| PENTA | Pentaerythritol |
| BA | Benzoic acid |
| NA | 2-Naphthoic acid |
| TMOBA | 2,4,6-Trimethoxybenzoic acid |
| STA | Stearic acid |
| STOH | Stearyl alcohol |
| AA | m-Anisic acid |

TABLE 17

| | Example 13 | Example 14 | Example 15 | Example 16 |
|---|---|---|---|---|
| Starting mat'l component | | | | |
| Dicarboxylic acid component | | | | |
| Type: parts by weight | TPA: 100.00 | TPA: 100.00 | TPA: 100.00 | TPA: 100.00 |
| Diol component | | | | |
| Type: parts by weight | EG: 48.73 | EG: 48.73 | EG: 48.73 | EG: 48.73 |
| Bifunctional compound | | | | |
| Type: parts by weight | EOBPA: 5.75 | EOBPA: 9.52 | EOBPA: 13.37 | EOBPA: 18.98 |
| Multi-functional compound | | | | |
| Type: parts by weight | TMP: 0.081 | TMP: 0.227 | TMA: 1.157 | TMA: 1.736 |
| Monofunctional compound | | | | |
| Type: parts by weight | BA: 0.015 | BA: 0.260 | BA: 0.765 | TMOBA: 3.832 |
| Prepolymer Intrinsic viscosity (dl/g) | 0.70 | 0.70 | 0.68 | 0.67 |
| MFR (g/10 min) | 32 | 29 | 28 | 26 |
| Solid phase polymerization | | | | |
| temperature (°C.) | 210 | 210 | 200 | 190 |

TABLE 17-continued

|  | Example 13 | Example 14 | Example 15 | Example 16 |
|---|---|---|---|---|
| time (hr) | 27 | 28 | 29 | 27 |
| Copolyester [structural unit] |  |  |  |  |
| Dicarboxylic acid units |  |  |  |  |
| Type: mole % | TPA: 49.99 | TPA: 49.90 | TPA: 48.99 | TPA: 47.76 |
| Diol units |  |  |  |  |
| Type: mole %[1)] | EG: 47.21 | EG: 46.16 | EG: 45.36 | EG: 43.84 |
| Type: mole %[1)] | DEG: 1.23 | DEG: 1.20 | DEG: 1.13 | DEG: 1.18 |
| Bifuctional compound units |  |  |  |  |
| Type: mole %[1)] | EOBPA: 1.51 | EOBPA: 2.50 | EOBPA: 3.51 | EOBPA: 4.98 |
| Multi-functional compound units |  |  |  |  |
| Type: mole %[1)] | TMP: 0.05 | TMP: 0.14 | TMA: 0.49 | TMA: 0.74 |
| Monofunctional compound units |  |  |  |  |
| Type: mole %[1)] | BA: 0.01 | BA: 0.10 | BA: 0.52 | TMOBA: 1.50 |
| [Physical properties] Intrinsic viscosity (dl/g) | 1.10 | 1.17 | 1.19 | 1.03 |
| MFR (g/10 min) | 2.0 | 0.6 | 0.5 | 0.9 |
| $\eta\,1$ (poises) | $1.36 \times 10^5$ | $6.05 \times 10^5$ | $8.03 \times 10^5$ | $7.17 \times 10^5$ |
| $\eta\,2$ (poises) | $1.40 \times 10^4$ | $2.15 \times 10^4$ | $2.14 \times 10^4$ | $1.08 \times 10^4$ |
| $(\frac{1}{2})\log_{10}(\eta\,2/\eta\,1)$ | −0.33 | −0.48 | −0.52 | −0.61 |
| $\sigma$ ss (dyne/cm$^2$) | $5.0 \times 10^6$ | $6.1 \times 10^6$ | $7.5 \times 10^6$ | $9.2 \times 10^6$ |
| $\sigma$ 100 (dyne/cm$^2$) | $2.6 \times 10^6$ | $3.7 \times 10^6$ | $3.8 \times 10^6$ | $1.7 \times 10^6$ |
| Crystallinity (%) | 33 | 29 | 26 | 25 |
| Tg (°C.) | 79 | 79 | 80 | 80 |
| Tm (°C.) | 243 | 235 | 223 | 211 |
| Tcc (°C.) | 143 | 137 | 130 | 118 |
| ΔHcc (J/g) | 15 | 12 | 9 | 6 |
| CEG (μequivalent/g) | 12 | 9 | 11 | 13 |

[1)]Based on the sum of total constituting units of copolyesters.

TABLE 18

|  | Example 17 | Example 18 | Example 19 | Example 20 |
|---|---|---|---|---|
| Starting mat'l component |  |  |  |  |
| Dicarboxylic acid component |  |  |  |  |
| Type: parts by weight | TPA: 100.00 | TPA: 100.00 | TPA: 100.00 | TPA: 100.00 |
| Diol component |  |  |  |  |
| Type: parts by weight | EG: 48.73 | EG: 48.73 | EG: 48.73 | EG: 48.73 |
| Bifunctional compound |  |  |  |  |
| Type: parts by weight | EOBPS: 9.58 | EOBPS: 18.50 | BHEB: 5.97 | BHEB: 8.38 |
| Multi-functional compound |  |  |  |  |
| Type: parts by weight | PENTA: 0.049 | TMP: 0.578 | TMSA: 0.253 | TMA: 0.463 |
| Monofunctional compound |  |  |  |  |
| Type: parts by weight | STA: 0.035 | STOH: 0.405 | AA: 0.183 | BA: 0.588 |
| Prepolymer Intrinsic viscosity (dl/g) | 0.70 | 0.70 | 0.70 | 0.69 |
| MFR (g/10 min) | 30 | 29 | 31 | 30 |
| Solid phase polymerization |  |  |  |  |
| temperature (°C.) | 210 | 200 | 210 | 200 |
| time (hr) | 29 | 26 | 26 | 28 |
| Copolyester [structural unit] |  |  |  |  |
| Dicarboxylic acid units |  |  |  |  |
| Type: mole % | TPA: 49.99 | TPA: 49.75 | TPA: 49.80 | TPA: 49.40 |
| Diol units |  |  |  |  |
| Type: mole %[1)] | EG: 46.37 | EG: 44.66 | EG: 46.33 | EG: 45.26 |
| Type: mole %[1)] | DEG: 1.25 | DEG: 1.19 | DEG: 1.17 | DEG: 1.23 |
| Bifuctional compound units |  |  |  |  |
| Type: mole %[1)] | EOBPS: 2.35 | EOBPS: 4.05 | BHEB: 2.50 | BHEB: 3.51 |
| Multi-functional compound units |  |  |  |  |
| Type: mole %[1)] | PENTA: 0.03 | TMA: 0.25 | TMA: 0.10 | TMA: 0.20 |
| Monofunctional compound units |  |  |  |  |

TABLE 18-continued

|  | Example 17 | Example 18 | Example 19 | Example 20 |
|---|---|---|---|---|
| Type: mole %[1] | STA: 0.01 | STOH: 0.10 | AA: 0.10 | BA: 0.40 |
| [Physical properties] | 1.20 | 1.11 | 1.02 | 1.08 |
| Intrinsic viscosity (dl/g) |  |  |  |  |
| MFR (g/10 min) | 1.4 | 1.0 | 1.9 | 1.5 |
| η 1 (poises) | $1.37 \times 10^5$ | $4.84 \times 10^5$ | $1.91 \times 10^5$ | $3.11 \times 10^5$ |
| η 2 (poises) | $1.72 \times 10^4$ | $1.23 \times 10^4$ | $1.27 \times 10^4$ | $1.17 \times 10^4$ |
| (½) $\log_{10}$ (η 2/η 1) | −0.30 | −0.53 | −0.39 | −0.47 |
| σ ss (dyne/cm$^2$) | $5.5 \times 10^6$ | $8.0 \times 10^6$ | $5.9 \times 10^6$ | $7.0 \times 10^6$ |
| σ 100 (dyne/cm$^2$) | $3.4 \times 10^6$ | $2.1 \times 10^6$ | $2.2 \times 10^6$ | $1.9 \times 10^6$ |
| Crystallinity (%) | 30 | 25 | 31 | 28 |
| Tg (°C.) | 80 | 82 | 79 | 78 |
| Tm (°C.) | 237 | 224 | 235 | 226 |
| Tcc (°C.) | 139 | 127 | 137 | 133 |
| ΔHcc (J/g) | 12 | 11 | 15 | 13 |
| CEG (μequivalent/g) | 8 | 15 | 16 | 14 |

[1] Based on the sum of total constituting units of copolyesters.

TABLE 19

|  | Comp. Ex. 8 | Comp. Ex. 9 | Comp. Ex. 10 | Comp. Ex. 11 |
|---|---|---|---|---|
| Starting mat'l component |  |  |  |  |
| Dicarboxylic acid component |  |  |  |  |
| Type: parts by weight | TPA: 100.00 | TPA: 100.00 | TPA: 100.00 | TPA: 100.00 |
| Diol component |  |  |  |  |
| Type: parts by weight | EG: 74.68 | EG: 45.00 | EG: 42.95 | EG: 48.73 |
| Bifunctional compound |  |  |  |  |
| Type: parts by weight | — | — | NPG: 3.13 | IPA: 4.00 |
| Multi-functional compound |  |  |  |  |
| Type: parts by weight | TMP: 0.384 | TMP: 0.636 | TMP: 0.226 | PENTA: 0.379 |
| Monofunctional compound |  |  |  |  |
| Type: parts by weight | BA: 2.098 | — | — | AA: 1.557 |
| Prepolymer | 0.68 | 0.72 | 0.69 | 0.69 |
| Intrinsic viscosity (dl/g) |  |  |  |  |
| MFR (g/10 min) | 32 | 30 | 28 | 34 |
| Solid phase polymerization |  |  |  |  |
| temperature (°C.) | 210 | 210 | 210 | 210 |
| time (hr) | 48 | 41 | 38 | 7 |
| Copolyester [structural unit] |  |  |  |  |
| Dicarboxylic acid units |  |  |  |  |
| Type: mole % | TPA: 48.60 | TPA: 49.75 | TPA: 50.00 | TPA: 47.15 |
| Diol units |  |  |  |  |
| Type: mole %[1] | EG: 48.54 | EG: 48.68 | EG: 46.39 | EG: 48.53 |
| Type: mole %[1] | DEG: 1.25 | DEG: 1.32 | DEG: 1.26 | DEG: 1.25 |
| Bifuctional compound units |  |  |  |  |
| Type: mole %[1] | — | — | NPG: 2.22 | IPA: 2.00 |
| Multi-functional compound units |  |  |  |  |
| Type: mole %[1] | TMP: 0.21 | TMA: 0.25 | TMA: 0.13 | PENTA: 0.22 |
| Monofunctional compound units |  |  |  |  |
| Type: mole %[1] | BA: 1.40 | — | — | AA: 0.85 |
| [Physical properties] | 1.28 | 1.05 | 1.11 | 1.14 |
| Intrinsic viscosity (dl/g) |  |  |  |  |
| MFR (g/10 min) | 2.4 | 2.3 | 2.1 | 2.8 |
| η 1 (poises) | $2.11 \times 10^5$ | $1.76 \times 10^5$ | $1.03 \times 10^5$ | $7.02 \times 10^4$ |
| η 2 (poises) | $8.63 \times 10^3$ | $9.73 \times 10^3$ | $1.34 \times 10^4$ | $9.44 \times 10^3$ |
| (½) $\log_{10}$ (η 2/η 1) | −0.46 | −0.42 | −0.30 | −0.29 |
| σ ss (dyne/cm$^2$) | $2.6 \times 10^6$ | $2.2 \times 10^6$ | $4.5 \times 10^6$ | $1.8 \times 10^6$ |
| σ 100 (dyne/cm$^2$) | $3.7 \times 10^6$ | $3.9 \times 10^6$ | $4.7 \times 10^6$ | $2.3 \times 10^6$ |
| Crystallinity (%) | 49 | 47 | 36 | 41 |
| Tg (°C.) | 78 | 78 | 78 | 77 |
| Tm (°C.) | 252 | 249 | 237 | 241 |
| Tcc (°C.) | 171 | 169 | 142 | 152 |
| ΔHcc (J/g) | 31 | 28 | 16 | 21 |
| CEG (μequivalent/g) | 15 | 16 | 13 | 17 |

[1] Based on the sum of total constituting units of copolyesters.

TABLE 20

|  | Comp. Ex. 12 | Comp. Ex. 13 | Comp. Ex. 14 | Comp. Ex. 15 |
|---|---|---|---|---|
| Starting mat'l component |  |  |  |  |
| Dicarboxylic acid component |  |  |  |  |
| Type: parts by weight | TPA: 100.00 | TPA: 100.00 | TPA: 100.00 | TPA: 100.00 |
| Diol component |  |  |  |  |
| Type: parts by weight | EG: 48.73 | EG: 48.73 | EG: 48.73 | EG: 48.73 |
| Bifunctional compound |  |  |  |  |
| Type: parts by weight | — | EOBPA: 57.14 | EOBPA: 1.18 | EOBPA: 58.80 |
| Multi-functional compound |  |  |  |  |
| Type: parts by weight | — | — | TMP: 0.249 | TMP: 0.227 |
| Monofunctional compound |  |  |  |  |
| Type: parts by weight | — | — | — | NA: 0.260 |
| Prepolymer Intrinsic viscosity (dl/g) | 0.68 | 0.80 | 0.70 | 0.69 |
| MFR (g/10 min) | 36 | 21 | 30 | 31 |
| Solid phase polymerization |  |  |  |  |
| temperature (°C.) | 210 | — | 210 | — |
| time (hr) | 67 | — | 35 | — |
| Copolyester [structural unit] |  |  |  |  |
| Dicarboxylic acid units |  |  |  |  |
| Type: mole % | TPA: 50.00 | TPA: 50.00 | TPA: 50.00 | TPA: 49.90 |
| Diol units |  |  |  |  |
| Type: mole %[1] | EG: 48.70 | EG: 33.64 | EG: 48.30 | EG: 33.66 |
| Type: mole %[1] | DEG: 1.30 | DEG: 1.35 | DEG: 1.25 | DEG: 1.18 |
| Bifuctional compound units |  |  |  |  |
| Type: mole %[1] | — | EOBPA: 15.01 | EOBPA: 0.30 | EOBPA: 15.01 |
| Multi-functional compound units |  |  |  |  |
| Type: mole %[1] | — | — | TMP: 0.15 | TMP: 0.15 |
| Monofunctional compound units |  |  |  |  |
| Type: mole %[1] | — | — | — | NA: 0.10 |
| [Physical properties] Intrinsic viscosity (dl/g) | 1.02 | 0.80[2] | 1.16 | 0.69[2] |
| MFR (g/10 min) | 10.5 | 5.3 | 0.4 | 2.8 |
| η 1 (poises) | $1.2 \times 10^4$ | $9.18 \times 10^4$ | $6.33 \times 10^5$ | $1.27 \times 10^5$ |
| η 2 (poises) | $6.10 \times 10^3$ | $2.01 \times 10^4$ | $2.21 \times 10^4$ | $3.84 \times 10^4$ |
| (⅓) $\log_{10}$ (η 2/η 1) | −0.10 | −0.22 | −0.49 | −0.17 |
| σ ss (dyne/cm²) | $2.2 \times 10^6$ | $2.0 \times 10^6$ | $2.6 \times 10^6$ | $3.2 \times 10^6$ |
| σ 100 (dyne/cm²) | $2.9 \times 10^5$ | $5.2 \times 10^6$ | $4.4 \times 10^6$ | $5.2 \times 10^6$ |
| Crystallinity (%) | 54 | — | 41 | — |
| Tg (°C.) | 78 | 79 | 79 | 80 |
| Tm (°C.) | 253 | — | 249 | — |
| Tcc (°C.) | 168 | — | 157 | — |
| ΔHcc (J/g) | 23 | — | 25 | — |
| CEG (μequivalent/g) | 21 | 33 | 18 | 37 |

[1] Based on the sum of total constituting units of copolyesters.
[2] The prepolymer was tested at 210° C.

TABLE 21

|  | Comp. Ex. 16 | Comp. Ex. 17 | Comp. Ex. 18 |
|---|---|---|---|
| Starting mat'l component |  |  |  |
| Dicarboxylic acid component |  |  |  |
| Type: parts by weight | TPA: 100.00 | TPA: 100.00 | TPA: 100.00 |
| Diol component |  |  |  |
| Type: parts by weight | EG: 48.73 | EG: 48.73 | EG: 48.73 |
| Bifunctional compound |  |  |  |
| Type: parts by weight | EOBPA: 9.80 | EOBPA: 13.72 | EOBPA: 9.52 |
| Multi-functional compound |  |  |  |
| Type: parts by weight | TMA: 1.785 | — | TMA: 0.231 |
| Monofunctional compound |  |  |  |
| Type: parts by weight | — | — | BA: 4.411 |
| Prepolymer Intrinsic viscosity (dl/g) | 0.65 | 0.70 | 0.61 |
| MFR (g/10 min) | 27 | 34 | 51 |
| Solid phase polymerization |  |  |  |
| temperature (°C.) | 200 | 200 | 200 |
| time (hr) | 15 | 42 | 72 |
| Copolyester [structural unit] |  |  |  |
| Dicarboxylic acid units |  |  |  |
| Type: mole % | TPA: 49.25 | TPA: 50.00 | TPA: 46.90 |

TABLE 21-continued

|  | Comp. Ex. 16 | Comp. Ex. 17 | Comp. Ex. 18 |
|---|---|---|---|
| Diol units |  |  |  |
| Type: mole %[1] | EG: 46.23 | EG: 45.15 | EG: 46.27 |
| Type: mole %[1] | DEG: 1.27 | DEG: 1.35 | DEG: 1.22 |
| Bifunctional compound units |  |  |  |
| Type: mole %[1] | EOBPA: 2.50 | EOBPA: 3.50 | EOBPA: 2.51 |
| Multi-functional compound units |  |  |  |
| Type: mole %[1] | TMA: 0.75 | — | TMA: 0.10 |
| Monofunctional compound units |  |  |  |
| Type: mole %[1] | — | — | BA: 3.00 |
| [Physical properties] |  |  |  |
| Intrinsic viscosity (dl/g) | —[2] | 1.20 | 0.81 |
| MFR (g/10 min) | 0.2 | 2.0 | 23 |
| η 1 (poises) | $3.26 \times 10^6$ | $4.32 \times 10^4$ | $9.80 \times 10^3$ |
| η 2 (poises) | $2.09 \times 10^4$ | $2.18 \times 10^4$ | $6.79 \times 10^3$ |
| (⅓) $\log_{10}$ (η 2/η 1) | −0.73 | −0.10 | −0.05 |
| σ ss (dyne/cm$^2$) | $4.0 \times 10^6$ | $7.5 \times 10^6$ | $6.0 \times 10^6$ |
| σ 100 (dyne/cm$^2$) | $4.1 \times 10^6$ | $4.3 \times 10^6$ | $1.5 \times 10^5$ |
| Crystallinity (%) | 32 | 27 | 24 |
| Tg (°C.) | 79 | 80 | 78 |
| Tm (°C.) | 231 | 229 | 220 |
| Tcc (°C.) | 152 | 131 | 157 |
| ΔHcc (J/g) | 22 | 15 | 21 |
| CEG (μequivalebt/g) | 21 | 12 | 31 |

[1]Based on the sum of total constituting units of copolyesters.
[2]Could not be tested because of generation of too may gels.

benzene ring, and units (b$_1$) from a multifunctional compound in amounts of 0.5 to 7 mole % and 0.005 to 1 mole %, respectively, based on the moles of total constituent units of the copolyesters, and units (c) from a monofunctional compound in an amount satisfying the above formula (α), can be produced smoothly by solid phase polymerization in a period of time of not more than 30 hours, to have an intrinsic viscosity suitable for melt molding such as extrusion blow molding. On producing bottles by extrusion blow molding of the copolyesters obtained in Examples 13 through 20, the drawdown time of extruded parisons was in the satisfactory range of 16 to 23 seconds, the difference between the maximum and minimum diameters of parisons was not more than 0.7 cm, the production of bottles was at least 120 pieces per hour with the defectives being less than 10 pieces per 100 pieces, which indicates excellent drawdown property of the parisons. The obtained bottles had an average wall thickness of 0.30 to 0.7 mm and thickness unevenness of less than 0.3 mm, indicating excellent blow moldability. Furthermore, the bottles obtained in Examples 13 through 20 had a haze value of not more than 4 and a b-value of not more than 4, representing excellent transparency. The bottles show gel generation of not more than 2.5% and a rate of generation of agglomerate of not more than 5 pieces/100 cm$^2$, both results being very low. The bottles have a falling breakage height of at least 100 cm, indicating excellent falling impact strength.

The following discussion is based on the results shown in Tables 19 and 22.

The copolyesters of Comparative Examples 8 and 9, containing terephthalic acid units and ethylene glycol units

TABLE 22

| | Drawdown property of parison[1] | | | Blow moldability | | | Transparency of bottle | | | Gel Generation of bottle | Generation of agglomerates of bottle | Falling impact strength[3] | |
|---|---|---|---|---|---|---|---|---|---|---|---|---|---|
| | Drawdown time (sec) | Difference between max. and min. diameters[2] (cm) | Overall evaluation | Average wall thickness (mm) | Thickness unevenness (mm) | Overall evaluation | Haze value | b-value | Overall evaluation | | | Breakage height[4] (cm) | Overall evaluation |
| Example 13 | 16 | 0.5 | ○ | 0.40 | 0.20 | ○ | 3.2 | 0.3 | ○ | ◎ | ◎ | 130 | ◎ |
| Example 14 | 21 | 0.2 | ○ | 0.55 | 0.15 | ○ | 2.7 | 1.0 | ○ | ◎ | ◎ | 140 | ◎ |
| Example 15 | 23 | 0.2 | ○ | 0.60 | 0.15 | ○ | 2.5 | 1.5 | ○ | ◎ | ◎ | 150 | ◎ |
| Example 16 | 23 | 0.2 | ○ | 0.55 | 0.15 | ○ | 2.1 | 1.9 | ○ | ◎ | ◎ | 120 | ◎ |
| Example 17 | 16 | 0.7 | ○ | 0.40 | 0.25 | ○ | 3.0 | 1.2 | ○ | ◎ | ◎ | 150 | ◎ |
| Example 18 | 20 | 0.3 | ○ | 0.55 | 0.15 | ○ | 2.4 | 1.8 | ○ | ◎ | ◎ | 130 | ◎ |
| Example 19 | 17 | 0.4 | ○ | 0.45 | 0.20 | ○ | 2.7 | 1.1 | ○ | ◎ | ◎ | 120 | ◎ |
| Example 20 | 19 | 0.3 | ○ | 0.50 | 0.15 | ○ | 2.6 | 1.9 | ○ | ◎ | ◎ | 120 | ◎ |
| Comp. Ex. 8 | 17 | 0.4 | ○ | 0.35 | 0.40 | × | 11.3 | 1.8 | × | ◎ | × | 50 | × |
| Comp. Ex. 9 | 16 | 0.5 | ○ | 0.35 | 0.35 | × | 10.5 | 2.2 | × | Δ | × | 50 | × |
| Comp. Ex. 10 | 14 | 0.6 | Δ | 0.25 | 0.35 | × | 5.7 | 3.1 | Δ | Δ | × | 80 | × |
| Comp. Ex. 11 | 13 | 0.7 | Δ | 0.30 | 0.45 | × | 8.5 | 2.2 | × | ○ | × | 50 | × |
| Comp. Ex. 12 | 5 | 3.2 | × | — | — | — | — | — | — | — | — | — | — |
| Comp. Ex. 13[6] | 11 | 1.5 | Δ | 0.25 | 0.45 | × | 9.5 | 4.5 | × | ◎ | ○ | 50 | × |
| Comp. Ex. 14 | 20 | 0.3 | ○ | 0.50 | 0.3 | × | 8.3 | 2.3 | × | ○ | × | 80 | × |
| Comp. Ex. 15[5] | 14 | 0.8 | Δ | 0.30 | 0.45 | × | 9.2 | 4.1 | × | ◎ | ○ | 50 | × |
| Comp. Ex. 16 | 28 | 0.1 | Δ | 0.65 | 0.35 | × | 8.6 | 2.1 | × | × | × | 70 | × |
| Comp. Ex. 17 | 8 | 2.5 | × | 0.20 | 0.50 | × | 3.3 | 1.8 | ○ | ◎ | ○ | 50 | × |
| Comp. Ex. 18 | 4 | —[6] | × | — | — | — | — | — | — | — | — | — | — |

[1]Drawdown property of parison
[2]Difference between the maximum and minimum diameters of parison.
[3]Falling impact strength of bottle
[4]Falling breakage height of bottle
[5]Molded at 210° C.
[6]Could not be measured because parsion could not be formed.

The following discussion is based on the results shown in Tables 17, 18 and 22.

The copolyesters of Examples 13 through 20, containing terephthalic acid units and ethylene glycol units, and further containing diol units (I) and/or diol units (II) having a and, while containing no diol units (I) and/or units (II) having a benzene ring, further containing only units (b$_1$) from a multifunctional compound or only units (b$_1$) from a multifunctional compound, and units (c) from a monofunctional compound, require a solid phase polymerization time of as long as at least 40 hours and thus have poor productivity. Bottles obtained by extrusion blow molding of the copolyesters had a thickness unevenness of at least 0.30 mm, indicating poor blow moldability. Furthermore, the bottles had a haze value of at least 10, indicating poor transparency. The bottles had a gel generation exceeding 5% (Comparative Example 9) and a rate of agglomerate generation exceeding 10 pieces/100 cm², indicating poor appearance and tactility. The bottles had a falling breakage height of 50 cm, indicating low falling impact strength.

The copolyester of Comparative Example 10, containing terephthalic acid units and ethylene glycol units and containing no diol units (I) and/or units (II) having a benzene ring, but instead containing bifunctional compound units from neopentyl glycol, and further containing multifunctional compound units ($b_2$) from trimethylolpropane and no monofunctional compound units (c), required a relatively long solid phase polymerization time of more than 30 hours, and thus had poor productivity. On producing bottles by extrusion blow molding of the copolyester, the obtained bottles had a thickness unevenness of 0.35 mm, indicating poor blow moldability. Furthermore, the bottles obtained had a haze value exceeding 4, indicating poor transparency. The bottles had a gel generation exceeding 5% and a rate of generation of agglomerates exceeding 10 pieces/100 cm², thus showing poor appearance and tactility. The bottles had a falling breakage height of 80 cm, indicating low falling impact strength and low quality.

When extrusion blow molded, the copolyester of Comparative Example 11, containing terephthalic acid units and ethylene glycol units, and containing no diol units (I) and/or units (II) having a benzene ring, but instead containing bifunctional compound units from isophthatic acid, and further containing multifunctional compound units ($b_1$) from pentaerythritol and monofunctional compound units (c) from m-anisic acid, gave bottles having a thickness unevenness of 0.45 mm, indicating poor blow moldability. Furthermore, the bottles obtained had a finely roughened surface and a haze value of 8.5, indicating poor transparency and tactility. The bottles had a falling breakage height of 50 cm, i.e., low falling impact strength and low quality. The following discussion is based on the results shown in Tables 20 and 22.

With the copolyester of Comparative Example 12, produced only from terephthalic acid and ethylene glycol and containing no diol units (I) and/or units (II) having a benzene ring, multifunctional compound units ($b_1$), and monofunctional compound units (c) (the polyester of Comparative Example 12 further contained diethylene glycol, which is an undesirable copolymerization unit, as described above, in an amount of 1.30 mole %), the resulting parison had a drawdown time of 5 seconds, with the difference between the maximum and minimum diameters being at least 3.0 cm, thus having markedly poor drawdown property. In fact, the extrusion blow molding itself was difficult. Furthermore, the solid phase polymerization required as long a time period as 67 hours, which indicates the low productivity of the polyester.

The copolyesters of Comparative Examples 13 and 15, containing terephthalic acid units and ethylene glycol units and, while containing diol units (I) and/or units (II) having a benzene ring, containing them in an amount exceeding 7 mole %, based on the moles of total constituent units of the copolyesters, were amorphous. The degree of polymerization of the copolyesters could therefore not be increased by solid phase polymerization. The copolyesters could not show a high melt viscosity at a temperature of 270° C., so that extrusion blow molding was impossible at this temperature. Extrusion blow molding was therefore conducted at a temperature of 210° C., at which temperature molding was barely possible. The resulting parisons had poor drawdown property. Bottles obtained had a thickness unevenness of 0.45 mm, indicating poor blow moldability. Furthermore, the bottles obtained in Comparative Examples 13 and 15, having been molded at a low temperature, have a finely roughened surface, thereby showing a haze value exceeding 8, indicating poor transparency, and poor tactility. The bottles had a falling breakage height of 50 cm, indicating low falling impact strength and low quality.

The copolyester of Comparative Example 14, containing terephthalic acid units and ethylene glycol units and, while containing diol units (I) and/or units (II) having a benzene ring and multifunctional compound units ($b_1$), contain the former in an amount of less than 0.5 mole %, based on the moles of total constituent units of the copolyesters, gave poor bottles as described below, on extrusion blow molding. That is, the bottles had a thickness unevenness of 0.3 mm, thus indicating poor blow moldability of the copolyester. The bottles had a haze value of at least 8, due to too high a rate of crystallization, indicating poor transparency. The bottles had a falling breakage height of 80 cm, i.e., low falling impact strength and low quality.

The following discussion is based on the results shown in Tables 21 and 22.

The copolyester of Comparative Example 16, containing terephthalic acid units and ethylene glycol units and, while containing diol units (I) and/or units (II) having a benzene ring and multifunctional compound units ($b_1$), contain no monofunctional compound units (c), and have a content of diol units (I) and/or diol units (II) and multifunctional compound units ($b_1$), of more than 7 mole % and more than 1 mole %, respectively, based on the moles of total constituent units of the copolyester. When extrusion blow molded, the copolyester provided bottles having a thickness unevenness of 0.35 mm, indicating poor blow moldability. The obtained bottles had a finely roughened surface and a haze value of at least 8, thus showing poor transparency. The bottles contained many gels and unmelted agglomerates and a falling breakage height of 50 cm, indicating low falling impact strength and low quality.

With the copolyester of Comparative Example 17, containing terephthalic acid units and ethylene glycol units and, while containing diol units (I) and/or units (II) having a benzene ring, but containing neither multifunctional compound units ($b_1$) nor monofunctional compound units (c), the resulting parisons have poor drawdown property. On extrusion blow molding, the copolyester gave bottles having an average wall thickness of 0.20 mm and a thickness unevenness of 0.50 mm, thus showing poor blow moldability. The obtained bottles had a very thin part at the central part of the body, and had a falling breakage height of 50 cm, thus having a low falling impact strength and low quality.

The copolyester of Comparative Example 18, containing terephthalic acid units and ethylene glycol units and, while containing diol units (I) and/or units (II) having a benzene ring, multifunctional compound units ($b_1$), and monofunctional compound units (c), having a content of the monofunctional compound units (c) exceeding the range of the above formula ($\alpha$) could not have its degree of polymerization increased by melt polymerization and solid phase polymerization and hence had a low viscosity. As a result, the copolyester could not form parisons or give molded articles when subjected to extrusion blow molding.

Example 21

(1) A slurry was prepared from 100.00 parts by weight of terephthalic acid, 48.73 parts by weight of ethylene glycol, 9.49 parts by weight of 22-bis [4-(2-hydroxyethoxy)phenyl] propane and 0.578 parts by weight of trimellitic anhydride. To the slurry were added 0.020 parts by weight of germanium dioxide, 0.015 parts by weight of phosphorus acid, 0.015 parts by weight of cobalt acetate, and 0.015 parts by weight of tetraethylammonium hydroxide. The resulting slurry was heated, under pressure (absolute pressure: 2.5 kg/cm$^2$), to a temperature of 250° C., to conduct esterification to an esterification ratio of 95%, to produce a low-polymerization degree compound. The compound thus obtained was melt polycondensed under reduced pressure of 1 mm Hg and at a temperature of 270° C. to yield a copolyester prepolymer having an intrinsic viscosity of 0.69 dl/g. The prepolymer was extruded through a nozzle into a strand, which was then cut into cylindrical chips (diameter: about 2.5 mm, length: about 3.5 mm). The prepolymer had a melt flow rate (MFR) at 270° C. of 29 g/10 min.

(2) The copolyester prepolymer chips thus obtained were pre-dried at a temperature of 150° C. for 5 hours, then subjected to solid phase polymerization with a tumbling type vacuum solid phase polymerization apparatus under a reduced pressure of 0.1 mm Hg at 210° C. for 20 hours, to yield a high molecular copolyester.

(3) The copolyester obtained in (2) above was tested for the content of each structural units by the above-described method. The content of terephthalic acid units, ethylene glycol units, 2,2-bis[4-(2-hydroxyethoxy)phenyl]propane units, trimellitic acid units or diethylene glycol units was as shown in Table 24 below.

(4) The copolyester obtained in (2) above was also tested for the physical properties according to the above-described methods, to show, as shown in Table 24 below, an intrinsic viscosity of 1.18 dl/g, an MFR at 270° C. of 0.6 g/10 min and melt viscosities at the same temperature and at a shear rate of 0.1 rad/sec ($\eta1$) and at a shear rate of 100 rad/sec ($\eta2$) of 6.79×10$^5$ poises and 1.57×10$^4$ poises, respectively, which led to a value of ($\frac{1}{3}$)log$_{10}$ ($\eta2/\eta1$) of −0.55.

The copolyester obtained in (2) above was further tested for shark-skin critical shear stress ($\sigma$ss) and shear stress ($\sigma$100) at a shear rate of 100/sec, at a temperature of 270° C., to show 5.9×10$^6$ dyne/cm$^2$ and 2.9×10$^6$ dyne/cm$^2$, respectively.

The copolyester obtained in (2) above was further tested for $\chi$c, Tg, Tm, Tcc and $\Delta$Hcc, to show 30%, 80° C., 235° C., 138° C. and 13 J/g, respectively, as shown in Table 24.

The copolyester obtained in (2) above had a terminal carboxyl group concentration (CEG) of 12 μequivalent/g.

(5) The copolyester obtained in (2) above was extrusion blow molded through an extrusion blow molding machine (hollow molding machine Type BM-304.J2, made by Placo Co.) into bottles (designed capacity: 1,800 ml, designed weight: 80 g). The intermediate product parisons were tested for drawdown property and blow moldability, and the resulting bottles for transparency, generation of gels, generation of agglomerates, falling breakage height, and falling impact strength, in accordance with the above-described methods, to give the results shown in Table 27 below.

Examples 22 through 24

Terephthalic acid and ethylene glycol were used in amounts as shown in Table 24 below. In addition, 2,2bis[4-(2-hydroxyethoxy)phenyl]propane or bis[4-(2-hydroxyethoxy)phenyl]sulfone, and trimellitic anhydride or pyromellitic anhydride were used as a bifunctional compound for the diol units (I) and/or diol units (II) having a benzene ring, and a multifunctional compound for the multifunctional compound units (b$_1$), respectively, in amounts as shown in Table 24. Esterification and melt polycondensation were conducted in the same manner as in Example 21, to prepare copolyester prepolymer chips. The copolyester prepolymers obtained were each subjected to solid phase polymerization under the conditions of temperature and time as shown in Table 24, to yield copolyesters.

The copolyesters thus obtained were each tested for the content of structural units and properties in the same manner as in Example 21. The results are shown in Table 24 below.

The copolyesters obtained in Examples 22 through 24 were each extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 27 below.

Example 25

Terephthalic acid and ethylene glycol were used in amounts as shown in Table 25. In addition, 1,4-bis(2-hydroxyethoxy]benzene and trimellitic anhydride were used as a bifunctional compound for the diol units (I) and/or diol units (II) having a benzene ring, and a multifunctional compound for the multifunctional compound units (b$_2$), respectively, in amounts as shown in Table 25. Esterification and melt polycondensation were conducted in the same manner as in Example 21, to prepare copolyester prepolymer chips. The copolyester prepolymer obtained was subjected to solid phase polymerization under the conditions of temperature and time as shown in Table 25, to yield a copolyester.

The copolyester thus obtained was tested for the content of structural units and properties in the same manner. The results are shown in Table 25 below.

The copolyester obtained in Example 25 was extrusion blow molded into bottles in the same manner. The drawdown property and blow moldability of the parisons and the transparency, generation of gels, generation of agglomerates, falling breakage height, and falling impact strength of the obtained bottles were determined or evaluated by the results shown in Table 27.

Comparative Examples 19 and 20

Terephthalic acid and ethylene glycol were used in amounts as shown in Table 25. In addition, 2,2-bis[4-(2-hydroxyethoxy)phenyl]propane and trimellitic anhydride were used as a bifunctional compound for the diol units (I) and/or diol units (II) having a benzene ring and a multifunctional compound for the multifunctional compound units (b$_2$), respectively, in amounts as shown in Table 25. Esterification and melt polycondensation were conducted in the same manner as in Example 21, to prepare copolyester prepolymer chips. The two copolyester prepolymers obtained were each subjected to solid phase polymerization under the conditions of temperature and time as shown in Table 25, to yield copolyesters.

The copolyesters thus obtained were each tested for the content of structural units and properties in the same manner as in Example 21. The results are shown in Table 25 below.

The copolyesters obtained in Comparative Examples 19 and 20 were each extrusion blow molded in the same manner as in Example 21 into bottles. The drawdown property and blow moldability of the parisons and the transparency, generation of gels, generation of agglomerates, falling breakage height, and falling impact strength of the obtained bottles were determined or evaluated by the above-described methods. The results are shown in Table 27 below.

Comparative Example 21

(1) A slurry was prepared from 100.00 parts by weight of dimethyl terephthalate and 80.12 parts by weight of ethylene glycol. To the slurry was added 0.032 parts by weight of manganese acetate. The resulting slurry was heated at 190° C. for 2 hours and then at 210° C. for 2 hours, under a nitrogen stream. Methanol was continuously distilled off during the heating and a low-polymerization-degree compound was prepared. There were then added to the obtained compound, 26.12 parts by weight of bis [4-(2-hydroxyethoxy)phenyl]sulfone, 0.989 parts by weight of trimellitic anhydride, 0.038 parts by weight of antimony trioxide, 0.077 parts by weight of triphenyl phosphate and 0.031 parts by weight of tetrakis[2,4-di-tert-butylphenyl]4,4'-biphenylene diphosphonite, and the reaction temperature was elevated to 260° C. After 1 hour and 20 minutes, the nitrogen stream was stopped, and melt polymerization was effected at a temperature of 275° C. under a reduced pressure of 0.4 mm Hg, to obtain a copolyester having an intrinsic viscosity of 1.08 dl/g. The copolyester was extruded through a nozzle into a strand, which was then cut into cylindrical chips (diameter: about 2.5 mm, length: about 3.5 mm).

(2) The copolyester obtained in (1) above was tested for the content of each structural units by the above-described method. The content of terephthalic acid units, ethylene glycol units, bis[4-(2-hydroxyethoxy)phenyl]sulfone units, trimellitic acid units or diethylene glycol units was as shown in Table 26 below.

(3) The copolyester obtained in (1) above was also tested for physical properties in accordance with the above-described methods, to show, as shown in Table 26 below, an MFR at 270° C. of 0.2 g/10 min, and melt viscosities at the same temperature and a shear rate of 0.1 rad/sec ($\eta 1$) and at a shear rate of 100 rad/sec ($\eta 2$) of $2.76 \times 10^6$ poises and $1.89 \times 10^4$ poises, respectively, which led to a value of $(\frac{1}{3})\log_{10}(\eta 2/\eta 1)$ of $-0.72$.

The copolyester obtained in (1) above was further tested for shark-skin critical shear stress ($\sigma ss$) and shear stress ($\sigma 100$) at a shear rate of 100/sec, and a temperature of 270° C., to show $3.5 \times 10^6$ dyne/cm$^2$ and $3.8 \times 10^6$ dyne/cm$^2$, respectively.

The copolyester obtained in (1) above was further tested for $\chi c$, Tg, Tm, Tcc and $\Delta$Hcc, to show, as shown in Table 26 below, a $\chi c$, Tg and Tm of 8%, 86° C. and 212° C., respectively, but no detectable Tcc or $\Delta$Hcc.

The copolyester obtained in (1) above had a terminal carboxyl group concentration (CEG) of 12 µequivalent/g.

(5) The copolyester obtained in (1) above was extrusion blow molded through an extrusion blow molding machine (hollow molding machine Type BM-304.J2, made by Placo Co.) into bottles (designed capacity: 1,800 ml, designed weight: 80 g). The intermediate product parisons were tested for drawdown property and blow moldability, and the resulting bottles were tested for transparency, generation of gels, generation of agglomerates, falling breakage height, and falling impact strength, in accordance with the above-described methods, to give the results shown in Table 27 below.

Comparative Examples 22 and 23

Terephthalic acid and ethylene glycol were used in amounts as shown in Table 26 below. In addition, bis[4(2-hydroxyethoxy)phenyl]sulfone and trimellitic anhydride were used as a bifunctional compound for the diol units (I) and/or diol units (II) having a benzene ring and a multifunctional compound for multifunctional compound units (b$_2$), respectively, in amounts as shown in Table 26. Transesterification and melt polymerization were conducted in the same manner as in Comparative Example 21, to prepare copolyesters. The copolyesters thus obtained were each tested for content of structural units and properties in the same manner as in Comparative Example 21. The results are shown in Table 26 below.

The copolyesters obtained in Comparative Examples 22 and 23 were each extrusion blow molded into bottles in the same manner as in Comparative Example 21. The drawdown property and blow moldability of the parisons and the transparency, generation of gels, generation of agglomerates, falling breakage height, and falling impact strength of the obtained bottles were determined or evaluated by the above-described methods. The results are shown in Table 27 below.

Abbreviations used in Tables 24 through 26 are defined in Table 23 below.

TABLE 23

| Code | Compound |
|---|---|
| TPA | Terephthalic acid |
| DMT | Dimethyl terephthalate |
| EG | Ethylene glycol |
| DEG | Diethylene glycol |
| EOBPA | 2,2-Bis[4-(2-hydroxyethoxy)phenyl]propane |
| EOBPS | Bis[4-(2-hydroxyethoxy)phenyl]sulfone |
| BHEB | 1,4-Bis(2-hydroxyethoxy)benzene |
| TMA | Trimellitic anhydride |
| PMA | Pyromellitic anhydride |

TABLE 24

|  | Example 21 | Example 22 | Example 23 | Example 24 |
|---|---|---|---|---|
| Starting mat'l component |  |  |  |  |
| Dicarboxylic acid component |  |  |  |  |
| Type: parts by weight | TPA: 100.00 | TPA: 100.00 | TPA: 100.00 | TPA: 100.00 |
| Diol component |  |  |  |  |
| Type: parts by weight | EG: 48.73 | EG: 48.73 | EG: 48.73 | EG: 48.73 |
| Bifunctional compound |  |  |  |  |
| Type: parts by weight | EOBPA: 9.49 | EOBPA: 15.28 | EOBPA: 10.23 | EOBPA: 16.30 |
| Multi-functional compound |  |  |  |  |
| Type: parts by weight | TMA: 0.578 | TMA: 0.925 | PMA: 0.263 | TMA: 0.695 |
| Monofunctional compound |  |  |  |  |

TABLE 24-continued

|  | Example 21 | Example 22 | Example 23 | Example 24 |
|---|---|---|---|---|
| Type: parts by weight |  |  |  |  |
| Prepolymer | 0.69 | 0.67 | 0.71 | 0.68 |
| Intrinsic viscosity (dl/g) |  |  |  |  |
| MFR (g/10 min) | 29 | 28 | 31 | 29 |
| Solid phase polymerization |  |  |  |  |
| temperature (°C.) | 210 | 200 | 210 | 200 |
| time (hr) | 20 | 21 | 22 | 24 |
| Copolyester [structural unit] |  |  |  |  |
| Dicarboxylic acid units |  |  |  |  |
| Type: mole % | TPA: 49.75 | TPA: 49.60 | TPA: 49.90 | TPA: 49.70 |
| Diol units |  |  |  |  |
| Type: mole %[1] | EG: 46.30 | EG: 44.74 | EG: 46.32 | EG: 44.80 |
| Type: mole %[1] | DEG: 1.21 | DEG: 1.25 | DEG: 1.18 | DEG: 1.20 |
| Bifuctional compound units |  |  |  |  |
| Type: mole %[1] | EOBPA: 2.49 | EOBPA: 4.01 | EOBPA: 2.50 | EOBPA: 4.00 |
| Multi-functional compound units |  |  |  |  |
| Type: mole %[1] | TMA: 0.25 | TMA: 0.40 | PMA: 0.10 | PMA: 0.30 |
| [Physical properties] | 1.18 | 1.09 | 1.14 | 1.10 |
| Intrinsic viscosity (dl/g) |  |  |  |  |
| MFR (g/10 min) | 0.6 | 0.9 | 1.3 | 1.0 |
| η 1 (poises) | $6.79 \times 10^5$ | $5.54 \times 10^5$ | $2.64 \times 10^5$ | $4.57 \times 10^5$ |
| η 2 (poises) | $1.57 \times 10^4$ | $1.38 \times 10^4$ | $1.43 \times 10^4$ | $1.35 \times 10^4$ |
| (½) $\log_{10}$ (η 2/η 1) | −0.55 | −0.53 | −0.42 | −0.51 |
| σ ss (dyne/cm$^2$) | $5.9 \times 10^6$ | $8.1 \times 10^6$ | $5.8 \times 10^6$ | $7.8 \times 10^6$ |
| σ 100 (dyne/cm$^2$) | $2.9 \times 10^6$ | $2.4 \times 10^6$ | $2.7 \times 10^6$ | $2.4 \times 10^6$ |
| Crystallinity (%) | 30 | 25 | 29 | 25 |
| Tg (°C.) | 80 | 80 | 81 | 82 |
| Tm (°C.) | 235 | 224 | 236 | 225 |
| Tcc (°C.) | 138 | 127 | 139 | 125 |
| ΔHcc (J/g) | 13 | 9 | 14 | 8 |
| CEG (μequivalent/g) | 12 | 14 | 10 | 13 |

[1]Based on the sum of total constituting units of copolyesters.

TABLE 25

|  | Example 25 | Comp. Ex. 19 | Comp. Ex. 20 |
|---|---|---|---|
| Starting mat'l component |  |  |  |
| Dicarboxylic acid component |  |  |  |
| Type: parts by weight | TPA: 100.00 | TPA: 100.00 | TPA: 100.00 |
| Diol component |  |  |  |
| Type: parts by weight | EG: 48.73 | EG: 48.73 | EG: 48.73 |
| Bifunctional compound |  |  |  |
| Type: parts by weight | BHEB: 8.38 | EOBPA: 1.18 | EOBPA: 58.80 |
| Multi-functional compound |  |  |  |
| Type: parts by weight | TMA: 0.116 | TMA: 0.348 | TMP: 0.348 |
| Prepolymer | 0.71 | 0.69 | 0.69 |
| Intrinsic viscosity (dl/g) |  |  |  |
| MFR (g/10 min) | 32 | 32 | 28 |
| Solid phase polymerization |  |  |  |
| temperature (°C.) | 205 | 210 | — |
| time (hr) | 27 | 38 | — |
| Copolyester [structural unit] |  |  |  |
| Dicarboxylic acid units |  |  |  |
| Type: mole % | TPA: 49.95 | TPA: 49.85 | TPA: 49.85 |
| Diol units |  |  |  |
| Type: mole %[1] | EG: 45.28 | EG: 48.47 | EG: 33.72 |
| Type: mole %[1] | DEG: 1.21 | DEG: 1.23 | DEG: 1.26 |
| Bifuctional compound units |  |  |  |
| Type: mole %[1] | BHEB: 3.51 | EOBPA: 0.30 | EOBPA: 15.02 |
| Multi-functional compound units |  |  |  |
| Type: mole %[1] | TMA: 0.05 | TMA: 0.15 | TMA: 0.15 |
| [Physical properties] | 1.20 | 1.15 | 0.69[2] |
| Intrinsic viscosity (dl/g) |  |  |  |
| MFR (g/10 min) | 1.5 | 0.5 | 2.5 |
| η 1 (poises) | $1.55 \times 10^5$ | $5.69 \times 10^5$ | $1.53 \times 10^5$ |
| η 2 (poises) | $1.87 \times 10^4$ | $2.15 \times 10^4$ | $4.02 \times 10^4$ |
| (½) $\log_{10}$ (η 2/η 1) | −0.31 | −0.47 | −0.19 |
| σ ss (dyne/cm$^2$) | $7.1 \times 10^6$ | $2.8 \times 10^6$ | $2.8 \times 10^6$ |
| σ 100 (dyne/cm$^2$) | $3.2 \times 10^6$ | $4.1 \times 10^6$ | $5.5 \times 10^6$ |
| Crystallinity (%) | 27 | 40 | — |
| Tg (°C.) | 78 | 79 | 80 |
| Tm (°C.) | 230 | 249 | — |
| Tcc (°C.) | 131 | 156 | — |
| ΔHcc (J/g) | 11 | 24 | — |
| CEG (μequivalent/g) | 8 | 20 | 42 |

[1]Based on the sum of total constituting units of copolyesters.
[2]The prepolymer was tested at 210° C.

TABLE 26

|  | Comp. Ex. 21 | Comp. Ex. 22 | Comp. Ex. 23 |
|---|---|---|---|
| Starting mat'l component |  |  |  |
| Dicarboxylic acid component |  |  |  |
| Type: parts by weight | TPA: 100.00 | TPA: 100.00 | TPA: 100.00 |
| Diol component |  |  |  |
| Type: parts by weight | EG: 80.12 | EG: 80.12 | EG: 80.12 |
| Bifunctional compound |  |  |  |
| Type: parts by weight | EOBPS: 26.12 | EOBPS: 3.48 | EOBPS: 26.12 |
| Multi-functional compound |  |  |  |
| Type: parts by weight | TMA: 0.989 | TMA 0.198 | TMA: 0.723 |
| Prepolymer |  |  |  |
| Intrinsic viscosity (dl/g) | 1.08 | 0.80 | 0.89 |
| MFR (g/10 min) | 0.2 | 19 | 10 |
| Solid phase polymerization |  |  |  |
| temperature (°C.) | — | — | — |
| time (hr) | — | — | — |
| Copolyester [structural unit] |  |  |  |
| Dicarboxylic acid units |  |  |  |
| Type: mole % | TPA: 49.50 | TPA: 49.90 | TPA: 49.65 |
| Diol units |  |  |  |
| Type: mole %[1] | EG: 41.23 | EG: 47.66 | EG: 41.20 |
| Type: mole %[1] | DEG: 1.27 | DEG: 1.34 | DEG: 1.30 |
| Bifuctional compound units |  |  |  |
| Type: mole %[1] | EOBPS: 7.50 | EOBPS: 1.00 | EOBPS: 7.50 |
| Multi-functional compound units |  |  |  |
| Type: mole %[1] | TMA: 0.50 | TMA: 0.10 | TMA: 0.35 |
| [Physical properties] Intrinsic viscosity (dl/g) | 1.08 | 0.80 | 0.89 |
| MFR (g/10 min) | 0.2 | 19 | 10 |
| $\eta\,1$ (poises) | $2.76 \times 10^6$ | $2.17 \times 10^6$ | $4.23 \times 10^4$ |
| $\eta\,2$ (poises) | $1.89 \times 10^4$ | $9.03 \times 10^3$ | $1.19 \times 10^4$ |
| $(1/3)\log_{10}(\eta\,2/\eta\,1)$ | −0.72 | −0.13 | −0.18 |
| $\sigma$ ss (dyne/cm$^2$) | $3.5 \times 10^6$ | $5.0 \times 10^6$ | $4.0 \times 10^6$ |
| $\sigma$ 100 (dyne/cm$^2$) | $3.8 \times 10^6$ | $2.8 \times 10^6$ | $3.2 \times 10^6$ |
| Crystallinity (%) | 8 | 38 | 9 |
| Tg (°C.) | 86 | 79 | 86 |
| Tm (°C.) | 212 | 244 | 212 |
| Tcc (°C.) | — | 171 | — |
| ΔHcc (J/g) | — | 32 | — |
| CEG (μequivaleNt/g) | 32 | 34 | 37 |

[1]Based on the sum of total constituting units of copolyesters.

TABLE 27

|  | Drawdown property of parison[1] | | | Blow moldability | | | Transparency of bottle | | | Gel | Generation of agglomerates of bottle | Falling impact strength[3] | |
|---|---|---|---|---|---|---|---|---|---|---|---|---|---|
|  | Drawdown time (sec) | Difference between max. and min. diameters[2] (cm) | Overall evaluation | Average wall thickness (mm) | Thickness unevenness (mm) | Overall evaluation | Haze value | b-value | Overall evaluation | generation of bottle | | Breakage height[4] (cm) | Overall evaluation |
| Example 21 | 23 | 0.2 | o | 0.60 | 0.15 | o | 3.5 | 1.4 | o | o | o | 130 | ⊚ |
| Example 22 | 21 | 0.2 | o | 0.55 | 0.15 | o | 3.4 | 1.6 | o | o | o | 110 | o |
| Example 23 | 18 | 0.3 | o | 0.50 | 0.20 | o | 3.6 | 1.5 | o | o | o | 120 | ⊚ |
| Example 24 | 20 | 0.3 | o | 0.50 | 0.15 | o | 3.3 | 1.2 | o | o | o | 130 | ⊚ |
| Example 25 | 16 | 0.3 | o | 0.40 | 0.25 | o | 3.4 | 1.8 | o | ⊚ | o | 140 | ⊚ |
| Comp. Ex. 19 | 20 | 0.3 | o | 0.50 | 0.30 | x | 8.3 | 2.3 | x | o | x | 80 | x |
| Comp. Ex. 20[5] | 10 | 1.7 | Δ | 0.25 | 0.45 | x | 10.2 | 4.8 | x | ⊚ | o | 50 | x |
| Comp. Ex. 21 | 29 | 1.0 | o | 0.60 | 0.35 | x | 10.3 | 8.7 | x | Δ | Δ | 90 | x |
| Comp. Ex. 22 | 11 | 1.5 | x | 0.25 | 0.40 | x | 5.3 | 5.5 | Δ | ⊚ | o | 80 | x |
| Comp. Ex. 23 | 12 | 1.5 | Δ | 0.25 | 0.35 | x | 5.7 | 8.5 | x | ⊚ | o | 80 | x |

[1]Drawdown property of parison
[2]Difference between the maximum and minimum diameters of parison.
[3]Falling impact strength of bottle
[4]Falling breakage height of bottle
[5]Molded at 210° C.
[6]Could not be measured because parsion could not be formed.

The following discussion is based on the results shown in Tables 24, 25 and 27.

The copolyesters of Examples 21 through 25, containing terephthalic acid units and ethylene glycol units and further containing diol units (I) and/or diol units (II) having a benzene ring and units ($b_2$) from a multifunctional compound in amounts of 0.5 to 7 mole % and 0.005 to 0.5 mole %, respectively, based on the moles of total constituent units of the copolyesters, can be produced smoothly by solid phase polymerization in a relatively short period of time of not more than 30 hours, to have an intrinsic viscosity suited for melt molding, e.g., extrusion blow molding. On producing bottles by extrusion blow molding of the copolyesters obtained in Examples 21 through 25, the drawdown time of extruded parisons was in a proper range of 16 to 23 seconds, the difference between the maximum and minimum diameters of parisons was not more than 0.3 cm, the production of bottles was at least 120 pieces per hour with the defectives being less than 10 pieces per 100 pieces, indicating excellent drawdown property. The obtained bottles had an average wall thickness of 0.3 to 0.7 mm and thickness unevenness of less than 0.3 mm, thus showing excellent blow moldability. Furthermore, the bottles obtained in Examples 21 through 25 had a haze value of not more than 4 and a b-value of not more than 4, indicating excellent transparency. The bottles had a gel generation of not more than 5% and a rate of generation of agglomerates of not more than 5 pieces/100 cm², both results being very low. The bottles had a falling breakage height of at least 100 cm, indicating excellent falling impact strength.

The following discussion is based on the results shown in Tables 25 and 27.

The copolyester of Comparative Example 19, containing terephthalic acid units and ethylene glycol units and, while containing diol units (I) and/or units (II) having a benzene ring and units (b₂) from a multifunctional compound, having a content of the diol units (I) and/or units (II) having a benzene ring of less than 0.5 mole %, based on the moles of total constituent units of the copolyester, gave bottles by extrusion blow molding having a thickness unevenness of 0.3 mm, indicating poor blow moldability. Furthermore, the bottles had a haze value of at least 8, due to too high a rate of crystallization, indicating poor transparency. The bottles had a falling breakage height of 80 cm, indicating low falling impact strength and low quality.

The copolyester of Comparative Example 20, containing terephthalic acid units and ethylene glycol units and, while containing diol units (I) and/or units (II) having a benzene ring and units (b₂) from a multifunctional compound, having a content of the diol units (i) and/or units (II) having a benzene ring exceeding 7 mole %, based on the moles of total constituent units of the copolyester, was amorphous. The degree of Polymerization of the copolyester could therefore not be increased by solid phase polymerization. The copolyester could not show a high melt viscosity at a temperature of 270° C., so that extrusion blow molding was impossible at this temperature. Extrusion blow molding was hence conducted at a temperature of 210° C., at which molding was barely possible. The resulting parisons had poor drawdown property. The bottles obtained had a thickness unevenness of 0.45 mm, indicating poor blow moldability. Furthermore, the bottles obtained in Comparative Example 20, having been molded at a low temperature, have a pronounced finely roughened surface, thereby showing a haze value exceeding 8, indicating poor transparency and poor tactility. The bottles had a falling breakage height of 50 cm, indicating low falling impact strength and low quality.

The following discussion is based on the results shown in Tables 26 and 27.

The copolyester of Comparative Example 21, containing terephthalic acid units and ethylene glycol units and, while containing bis[4-(2-hydroxyethoxy)phenyl]sulfone units and trimellitic acid units as diol units (I) and/or units (II) having a benzene ring and multifunctional compound units (b₂), respectively, contain bis[4-(2-hydroxyethoxy)phenyl] sulfone units in an amount exceeding 7 mole %, based, on the moles of total constituent units of the copolyesters, and could not have its degree of polymerization increased by solid phase polymerization due to the large content of bis[4-(2-hydroxyethoxy)phenyl]sulfone units and low crystallinity. The intrinsic viscosity was hence increased by conducting melt polycondensation at a high temperature. As a result, the bis[4-(2-hydroxyethoxy)phenyl]sulfone units underwent extensive thermal degradation. Bottles produced by extrusion blow molding had a haze value and b-value both exceeding 8, i.e., poor transparency. Furthermore, with the copolyester obtained in Comparative Example 21, the melt viscosity behavior had not been controlled adequately, so that the resulting parisons had poor drawdown property. The bottles obtained had a thickness unevenness of 0.35 mm, which indicates the poor blow moldability of the copolyester. Besides, the bottles obtained in Comparative Example 21 had a markedly and finely roughened surface and hence had a haze value exceeding 8 and had poor tactility. The bottles had a falling breakage height of 90 cm, thus having a low falling impact strength and low quality.

The copolyester of Comparative Example 22, containing terephthalic acid units and ethylene glycol units and, while containing bis[4-(2-hydroxyethoxy)phenyl]sulfone units and trimellitic acid units as diol units (I) and/or units (II) having a benzene ring and multifunctional compound units (b₂), respectively, had its intrinsic viscosity increased to 0.8 dl/g solely by melt polymerization. The then copolyester did not show a high melt viscosity at a temperature of 270° C. The copolyester yielded more than 30 poorly molded bottles per 100 pieces, which indicates poor drawdown property of the parison. On producing bottles by extrusion blow molding, the obtained bottles had an average wall thickness of 0.25 mm and a thickness unevenness of 0.40 mm, indicating poor blow moldability. The obtained bottles further had a haze value and b-value of both more than 4 due to whitening, and thermal degradation of the bis [4-(2-hydroxyethoxy)phenyl]sulfone units, indicating poor transparency. The bottles had a falling breakage height of 80 cm, indicating a low falling impact strength and low quality.

The copolyester of Comparative Example 23, containing terephthalic acid units and ethylene glycol units, and while containing bis[4-(2-hydroxyethoxy)phenyl]sulfone units and trimellitic acid units as diol units (I) and/or units (II) having a benzene ring and multifunctional compound units (b₂), respectively, contain the bis[4-(2-hydroxyethoxy) phenyl]sulfone units in an amount exceeding 7 mole %, based on the moles of total constituent units of the copolyesters, and could not have its degree of polymerization increased by solid phase polymerization due to the large content of bis[4-(2-hydroxyethoxy)phenyl]sulfone units and low crystallinity. The intrinsic viscosity was hence increased by conducting melt polycondensation at a high temperature. As a result, the bis[4-(2-hydroxyethoxy)phenyl]sulfone units underwent extensive thermal degradation. Bottles obtained by extrusion blow molding had a haze value and b-value of exceeding 4 and 8, respectively, thus having poor transparency. The copolyester of Comparative Example 23, having a low intrinsic viscosity of less than 1.0 dl/g, did not have a sufficient melt viscosity, so that the resulting parisons had poor drawdown property. Bottles obtained had an average wall thickness and thickness unevenness of 0.25 mm and 0.35 mm, respectively, indicating poor blow moldability. The bottles had a falling breakage height of 80 cm, indicating low falling impact strength and low quality.

Example 26

(1) A slurry was prepared from 100.00 parts by weight of terephthalic acid, 48.73 parts by weight of ethylene glycol, 5.71 parts by weight of 2,2-bis(4-(2-hydroxyethoxy)phenyl] propane and 0.081 parts by weight of trimethylolpropane. To the slurry were added 0.020 parts by weight of germanium dioxide, 0.015 parts by weight of phosphorus acid, 0.015 parts by weight of cobalt acetate and 0.015 parts by weight of tetraethylammonium hydroxide. The resulting slurry was heated under pressure (absolute pressure: 2.5 kg/cm²) to a temperature of 250° C. to conduct esterification to an esterification ratio of 95%, to produce a low-polymerization degree compound. The compound thus obtained was melt polycondensed under a reduced pressure of 1 mm Hg and at a temperature of 270° C. to yield a copolyester prepolymer having an intrinsic viscosity of 0.72 dl/g. The prepolymer was extruded through a nozzle into a strand, which was then cut into cylindrical chips (diameter: about 2.5 mm, length: about 3.5 mm). The prepolymer had a melt flow rate (MFR) at 270° C. of 31 g/10 min.

(2) The copolyester prepolymer chips thus obtained were pre-dried at a temperature of 150° C. for 5 hours, then subjected to solid phase polymerization with a tumbling type vacuum solid phase polymerization apparatus under a reduced pressure of 0.1 mm Hg at 210° C. for 24 hours to yield a high molecular copolyester.

(3) The copolyester obtained in (2) above was tested for the content of each structural unit by the method described above. The content of terephthalic acid units, ethylene glycol units, 2,2-bis[4-(2-hydroxyethoxy)phenyl]propane units, trimethylolpropane units or diethylene glycol units is given in Table 29 below.

(4) The copolyester obtained in (2) above was also tested for the physical properties according to the above-described methods, to show as given in Table 29 an intrinsic viscosity of 1.15 dl/g, an MFR at 270° C. of 1.3 g/10 min, and melt viscosities at the same temperature and at a shear rate of 0.1 rad/sec ($\eta 1$) and at a shear rate of 100 rad/sec ($\eta 2$) of $2.03 \times 10^4$ poises, and $1.68 \times 10^4$ poises, respectively, which led to a value of $(\frac{1}{2})\log_{10}(\eta 2/\eta 1)$ of $-0.36$.

The copolyester obtained in (2) above was further tested for shark-skin critical shear stress ($\sigma$ss) and shear stress ($\sigma$100) at a shear rate of 100/sec at a temperature of 270° C., to show $4.5 \times 10^6$ dyne/cm$^2$ and $3.0 \times 10^6$ dyne/cm$^2$, respectively.

The copolyester obtained in (2) above was further tested for $\chi c$, Tg, Tm, Tcc and $\Delta$Hcc to give values of 31%, 79° C., 243° C., 144° C. and 17 J/g, respectively, as shown in Table 29 below.

The copolyester obtained in (2) above had a terminal carboxyl group concentration (CEG) of 11 µequivalent/g.

(5) The copolyester obtained in (2) above was extrusion blow molded through an extrusion blow molding machine (hollow molding machine Type BM-304.j2, made by Placo Co.) into bottles (designed capacity: 1,800 ml, designed weight: 80 g). The intermediate product parisons were tested for drawdown property and blow moldability, and the resulting bottles for transparency, generation of gels, generation of agglomerates, falling breakage height, and falling impact strength, in accordance with the above-described methods, to give the results shown in Table 32 below.

Examples 27 through 29

Terephthalic acid and ethylene glycol were used in amounts as shown in Table 29 below. In addition, 2,2-bis[4-(2-hydroxyethoxy)phenyl]propane or bis[4-(2-hydroxyethoxy)phenyl]sulfone, and trimethylolpropane or pentaerythritol were used as a bifunctional compound for the diol units (I) and/or diol units (II) having a benzene ring, and a multifunctional compound for the multifunctional compound units (b$_3$), respectively, in amounts as shown in Table 29. Esterification and melt polycondensation were conducted in the same manner as in Example 26, to prepare copolyester prepolymer chips. The copolyester prepolymers obtained were each subjected to solid phase polymerization under the conditions of temperature and time as shown in Table 29, to yield copolyesters.

The copolyesters thus obtained were each tested for the content of structural units and properties in the same manner as in Example 26. The results are shown in Table 29 below.

The copolyesters obtained in Examples 27 through 29 were each extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 32 below.

Examples 30 and 31

Terephthalic acid and ethylene glycol were used in amounts as shown in Table 30. In addition, bis(4-(2-hydroxyethoxy)phenyl]sulfone or 1,4-bis(2-hydroxyethoxy)benzene, and trimethylolpropane were used as a bifunctional compound for the diol units (I) and/or diol units (II) having a benzene ring, and a multifunctional compound for the multifunctional compound units (b$_3$), respectively, in amounts as shown in Table 30. Esterification and melt polycondensation were conducted in the same manner as in Example 26, to prepare copolyester prepolymer chips. The copolyester prepolymers obtained were subjected to solid phase polymerization under the conditions of temperature and time as shown in Table 30, to yield copolyesters.

The copolyesters thus obtained were tested for the content of structural units and properties in the same manner. The results are shown in Table 30 below.

The copolyesters obtained in Examples 30 and 31 were extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 32 below.

COMPARATIVE EXAMPLES 24 and 25

Terephthalic acid and ethylene glycol were used in amounts as shown in Table 31. In addition, 2,2-bis[4-(2-hydroxyethoxy)phenyl]propane and trimethylolpropane were used as bifunctional compound for the diol units (I) and/or diol units (II) having a benzene ring and multifunctional compound for the multifunctional compound units (b$_3$), respectively, in amounts as shown in Table 31. Esterification and melt polycondensation were conducted in the same manner as in Example 26, to prepare copolyester prepolymer chips. The copolyester prepolymers obtained were subjected to solid phase polymerization under the conditions of temperature and time as shown in Table 31, to yield copolyesters. In Comparative Example 25, the copolyester prepolymer chips were amorphous, and were subjected to the extrusion blow molding described below, without solid phase polymerization.

The copolyesters thus obtained were each tested for the content of structural units and properties in the same manner as in Example 26. In Comparative Example 25, the determinations were made at 210° C. for the above reason. The results are shown in Table 31 below.

The copolyesters obtained in Comparative Examples 24 and 25 were each extrusion blow molded into bottles in the same manner as in Example 26. In Comparative Example 25, the extrusion blow molding was conducted at 210° C. for the above reason. The drawdown property and blow moldability of the parisons and the transparency, generation of gels, generation of agglomerates, falling breakage height, and falling impact strength of the obtained bottles were determined or evaluated by the above-described methods. The results are shown in Table 32 below.

COMPARATIVE EXAMPLE 26

(1) A slurry was prepared from 100.00 parts by weight of dimethyl terephthalate, 79.90 parts by weight of ethylene glycol, 8.144 parts by weight of 2,2-bis[4-(2-hydroxyethoxy)phenyl]propane, and 0.035 parts by weight of pentaerythritol. To the slurry, 0.010 parts by weight of zinc dust were added. The resulting slurry was heated at 190° C. for 2 hours, at 210° C. for 2 hours, and then at 240° C. for 2 hours, under a nitrogen stream. Methanol was continuously distilled off during the heating and a low-polymerization-degree compound was prepared. There were then added to the obtained compound 0.038 parts by weight of antimony trioxide, 0.077 parts by weight of triphenyl phosphate and 0.031 parts by weight of tetrakis[2,4-ditert-butylphenyl]4,4'-biphenylene diphosphonite, and the reaction temperature was elevated to 260° C. After 1 hour and 20 minutes, the nitrogen stream was stopped, and melt polymerization was effected at a temperature of 270° C. under a reduced pressure of 0.4 mm Hg, to obtain a copolyester having an intrinsic viscosity of 0.70 dl/g. The copolyester was extruded through a nozzle into a strand, which was then cut into cylindrical chips (diameter: about 2.5 mm, length: about 3.5 mm).

(2) The copolyester obtained in (1) above was tested for the content of each structural units by the above-described method. The content of terephthalic acid units, ethylene glycol units, 2,2-bis[4-(2-hydroxyethoxy)phenyl]propane units, pentaerythritol units or diethylene glycol units is given in Table 31 below.

(3) The copolyester obtained in (1) above was also tested for the physical properties in accordance with the above-described methods, to show, as given in Table 31 below, an MFR at 270° C. of 34 g/10 min and melt viscosities at the same temperature and at a shear rate of 0.1 rad/sec ($\eta 1$) and at a shear rate of 100 rad/sec ($\eta 2$) of $5.62 \times 10^3$ poises and $3.17 \times 10^2$ poises, respectively, which led to a value of ($\frac{1}{2}$)$\log_{10}$ ($\eta 2/\eta 1$) of $-0.08$.

The copolyester obtained in (1) above was further tested for shark-skin critical shear stress ($\sigma$, ss) and shear stress ($\sigma 100$) at a shear rate of 100/sec at a temperature of 270° C., to give $5.5 \times 10^6$ dyne/cm$^2$ and $1.5 \times 10^6$ dyne/cm$^2$, respectively.

The copolyester obtained in (1) above was further tested for $\chi c$, Tg, Tm, Tcc and $\Delta$Hcc, giving values of 28%, 79° C., 234° C., 152° C. and 21 J/g, respectively, as shown in Table 31 below.

The copolyester obtained in (1) above had a terminal carboxyl group concentration (CEG) of 33 μequivalent/g.

(5) The copolyester obtained in (1) above was extrusion blow molded through an extrusion blow molding machine (hollow molding machine Type BM-304.J2, made by Placo Co.) into bottles (designed capacity: 1,800 ml, designed weight: 80 g). The intermediate product parisons were tested for drawdown property and blow moldability, and the resulting bottles for transparency, generation of gels, generation of agglomerates, falling breakage height, and falling impact strength, in accordance with the above-described methods, to give the results shown in Table 32 below.

Abbreviations used in Tables 29 through 31 are defined in Table 28 below.

Table 28

| Code | Compound |
| --- | --- |
| TPA | Terephthalic acid |
| DMT | Dimethyl terephthalate |
| EG | Ethylene glycol |
| DEG | Diethylene glycol |
| EOBPA | 2,2-Bis[4-(2-hydroxyethoxy)phenyl]propane |
| EOBPS | Bis[4-(2-hydroxyethoxy)phenyl]sulfone |
| BHEB | 1,4-Bis(2-hydroxyethoxy)benzene |
| TMP | Trimethylolpropane |
| PENTA | Pentaerythritol |

TABLE 29

| | Example 26 | Example 27 | Example 28 | Example 29 |
| --- | --- | --- | --- | --- |
| Starting mat'l component | | | | |
| Dicarboxylic acid component | | | | |
| Type: parts by weight | TPA: 100.00 | TPA: 100.00 | TPA: 100.00 | TPA: 100.00 |
| Diol component | | | | |
| Type: parts by weight | EG: 48.73 | EG: 48.73 | EG: 48.73 | EG: 48.73 |
| Bifunctional compound | | | | |
| Type: parts by weight | EOBPA: 5.71 | EOBPA: 9.49 | EOBPA: 15.28 | EOBPS: 10.23 |
| Multi-functional compound | | | | |
| Type: parts by weight | TMP: 0.081 | TMP: 0.405 | TMP: 0.567 | PENTA: 0.173 |
| Prepolymer | 0.72 | 0.70 | 0.68 | 0.70 |
| Intrinsic viscosity (dl/g) | | | | |
| MFR (g/10 min) | 31 | 26 | 25 | 33 |
| Solid phase polymerization | | | | |
| temperature (°C.) | 210 | 210 | 200 | 210 |
| time (hr) | 24 | 18 | 20 | 20 |
| Copolyester [structural unit] | TPA: 50.00 | TPA: 50.00 | TPA: 50.00 | TPA: 50.00 |
| Dicarboxylic acid units | | | | |
| Type: mole % | | | | |
| Diol units | | | | |
| Type: mole %[1)] | EG: 47.19 | EG: 46.02 | EG: 44.42 | EG: 46.20 |
| Type: mole %[1)] | DEG: 1.26 | DEG: 1.23 | DEG: 1.22 | DEG: 1.20 |
| Bifuctional compound units | | | | |
| Type: mole %[1)] | EOBPA: 1.50 | EOBPA: 2.50 | EOBPA: 4.01 | EOBPS: 2.50 |
| Multi-functional compound units | | | | |
| Type: mole %[1)] | TMP: 0.05 | TMP: 0.25 | TMP: 0.35 | PENTA: 0.10 |
| [Physical properties] | | | | |
| Intrinsic viscosity (dl/g) | 1.15 | 1.20 | 1.12 | 1.15 |
| MFR (g/10 min) | 1.3 | 0.6 | 0.8 | 1.3 |
| $\eta$ 1 (poises) | $2.03 \times 10^5$ | $7.53 \times 10^5$ | $6.11 \times 10^5$ | $3.03 \times 10^5$ |
| $\eta$ 2 (poises) | $1.68 \times 10^4$ | $1.62 \times 10^4$ | $1.42 \times 10^4$ | $1.47 \times 10^4$ |
| ($\frac{1}{2}$) $\log_{10}$ ($\eta$ 2/$\eta$ 1) | $-0.36$ | $-0.56$ | $-0.54$ | $-0.44$ |

TABLE 29-continued

|  | Example 26 | Example 27 | Example 28 | Example 29 |
|---|---|---|---|---|
| $\sigma$ ss (dyne/cm$^2$) | $4.5 \times 10^5$ | $5.8 \times 10^5$ | $8.0 \times 10^5$ | $5.8 \times 10^5$ |
| $\sigma$ 100 (dyne/cm$^2$) | $3.0 \times 10^5$ | $3.0 \times 10^5$ | $2.6 \times 10^5$ | $2.9 \times 10^5$ |
| Crystallinity (%) | 31 | 30 | 25 | 29 |
| Tg (°C.) | 79 | 80 | 80 | 81 |
| Tm (°C.) | 243 | 235 | 224 | 236 |
| Tcc (°C.) | 144 | 139 | 129 | 139 |
| ΔHcc (J/g) | 17 | 14 | 10 | 15 |
| CEG (μequivalent/g) | 11 | 13 | 14 | 11 |

[1] based on the sum of total constituting units of copolyesters.

TABLE 30

|  | Example 30 | Example 31 |
|---|---|---|
| Starting mat'l component |  |  |
| Dicarboxylic acid component |  |  |
| Type: parts by weight | TPA: 100.00 | TPA: 100.00 |
| Diol component |  |  |
| Type: parts by weight | EG: 48.73 | EG: 48.73 |
| Bifunctional compound |  |  |
| Type: parts by weight | EOBPS: 16.30 | BHEB: 8.38 |
| Multi-functional compound |  |  |
| Type: parts by weight | TMP: 0.486 | TMP: 0.081 |
| Prepolymer |  |  |
| Intrinsic viscosity (dl/g) | 0.69 | 0.71 |
| MFR (g/10 min) | 27 | 32 |
| Solid phase polymerization |  |  |
| temperature (°C.) | 200 | 205 |
| time (hr) | 20 | 25 |
| Copolyester |  |  |
| [structural unit] |  |  |
| Dicarboxylic acid units |  |  |
| Type: mole % | TPA: 50.00 | TPA: 50.00 |
| Diol units |  |  |
| Type: mole %[1] | EG: 44.48 | EG: 45.26 |
| Type: mole %[1] | DEG: 1.22 | DEG: 1.19 |
| Bifuctional compound units |  |  |
| Type: mole %[1] | EOBPS: 4.00 | BHEB: 3.50 |
| Multi-functional compound units |  |  |
| Type: mole %[1] | TMP: 0.30 | TMP: 0.05 |
| [Physical properties] |  |  |
| Intrinsic viscosity (dl/g) | 1.09 | 1.22 |
| MFR (g/10 min) | 1.0 | 1.3 |
| η 1 (poises) | $5.14 \times 10^5$ | $1.73 \times 10^5$ |
| η 2 (poises) | $1.39 \times 10^4$ | $1.93 \times 10^4$ |
| (⅓) log$_{10}$ (η 2/η 1) | −0.52 | −0.32 |
| σ ss (dyne/cm$^2$) | $7.6 \times 10^5$ | $7.0 \times 10^5$ |
| σ 100 (dyne/cm$^2$) | $2.5 \times 10^5$ | $3.5 \times 10^5$ |
| Crystallinity (%) | 25 | 27 |
| Tg (°C.) | 82 | 78 |
| Tm (°C.) | 225 | 230 |
| Tcc (°C.) | 128 | 132 |
| ΔHcc (J/g) | 10 | 13 |
| CEG (μequivalent/g) | 12 | 9 |

[1] Based on the sum of total constituting units of copolyesters.

TABLE 31

|  | Example 24 | Example 25 | Example 26 |
|---|---|---|---|
| Starting mat'l component |  |  |  |
| Dicarboxylic acid component |  |  |  |
| Type: parts by weight | TPA: 100.00 | TPA: 100.00 | TPA: 100.00 |
| Diol component | EG: 48.73 | EG: 48.73 | EG: 79.90 |
| Type: parts by weight |  |  |  |
| Bifunctional compound | EOBPA: 9.80 | EOBPA: 58.80 | EOBPA: 8.144 |
| Type: parts by weight |  |  |  |
| Multi-functional compound | TMP: 1.245 | TMP: 0.249 | PENTA: 0.035 |
| Type: parts by weight |  |  |  |
| Prepolymer | 0.65 | 0.68 | 0.70 |
| Intrinsic viscosity (dl/g) |  |  |  |
| MFR (g/10 min) | 26 | 28 | 34 |
| Solid phase polymerization |  |  |  |
| temperature (°C.) | 200 | — | — |
| time (hr) | 13 | — | — |
| Copolyester | TPA: 50.00 | TPA: 50.00 | TPA: 50.00 |
| [structural unit] |  |  |  |
| Dicarboxylic acid units |  |  |  |
| Type: mole % |  |  |  |
| Diol units |  |  |  |
| Type: mole %[1] | EG: 45.49 | EG: 33.59 | EG: 46.185 |
| Type: mole %[1] | DEG: 1.26 | DEG: 1.25 | DEG: 1.29 |
| Bifuctional compound units | EOBPA: 2.50 | EOBPA: 15.01 | EOBPA: 2.50 |
| Type: mole %[1] |  |  |  |
| Multi-functional compound units | TMP: 0.75 | TMP: 0.15 | PENTA: 0.025 |
| Type: mole %[1] |  |  |  |
| [Physical properties] | —[3] | 0.68[2] | 0.70 |
| Intrinsic viscosity (dl/g) |  |  |  |
| MFR (g/10 min) | 0.2 | 2.3 | 34 |
| η 1 (poises) | $3.62 \times 10^5$ | $1.65 \times 10^5$ | $5.62 \times 10^3$ |
| η 2 (poises) | $2.15 \times 10^4$ | $4.32 \times 10^4$ | $3.17 \times 10^3$ |
| (⅓) log$_{10}$ (η 2/η 1) | −0.74 | −0.19 | −0.08 |
| σ ss (dyne/cm$^2$) | $3.7 \times 10^5$ | $2.5 \times 10^5$ | $5.5 \times 10^5$ |
| σ 100 (dyne/cm$^2$) | $4.2 \times 10^5$ | $5.4 \times 10^5$ | $1.5 \times 10^5$ |
| Crystallinity (%) | 31 | — | 28 |
| Tg (°C.) | 79 | 80 | 79 |
| Tm (°C.) | 231 | — | 234 |
| Tcc (°C.) | 154 | — | 152 |
| ΔHcc (J/g) | 26 | — | 21 |
| CEG (μequivalent/g) | 22 | 40 | 33 |

[1] Based on the sum of total constituting units of copolyesters.
[2] The prepolymer was tested at 210° C.
[3] Could not be tested because of generation of many gels.

TABLE 32

| | Drawdown property of parison[1] | | | Blow moldability | | | Transparency of bottle | | | Gel generation of bottle | Generation of agglomerates of bottle | Falling impact strength[3] | |
|---|---|---|---|---|---|---|---|---|---|---|---|---|---|
| | Drawdown time (sec) | Difference between max. and min. diameters[2] (cm) | Overall evaluation | Average wall thickness (mm) | Thickness unevenness (mm) | Overall evaluation | Haze value | b-value | Overall evaluation | | | Breakage height[4] (cm) | Overall evaluation |
| Example 26 | 17 | 0.4 | ○ | 0.40 | 0.20 | ○ | 3.7 | 0.9 | ○ | ◉ | ○ | 110 | ○ |
| Example 27 | 23 | 0.2 | ○ | 0.60 | 0.15 | ○ | 3.8 | 1.5 | ○ | ○ | ○ | 120 | ◉ |
| Example 28 | 22 | 0.2 | ○ | 0.55 | 0.15 | ○ | 3.2 | 1.5 | ○ | ○ | ○ | 110 | ○ |
| Example 29 | 19 | 0.3 | ○ | 0.55 | 0.20 | ○ | 3.5 | 1.6 | ○ | ○ | ○ | 120 | ◉ |
| Example 30 | 21 | 0.2 | ○ | 0.55 | 0.15 | ○ | 3.4 | 1.1 | ○ | ○ | ○ | 120 | ◉ |
| Example 31 | 17 | 0.3 | ○ | 0.45 | 0.20 | × | 3.5 | 1.8 | ○ | ◉ | ○ | 130 | ◉ |
| Comp. Ex. 24 | 29 | 0.1 | △ | 0.65 | 0.35 | × | 9.3 | 2.8 | × | × | × | 60 | × |
| Comp. Ex. 25[5] | 10 | 1.8 | △ | 0.25 | 0.45 | × | 10.5 | 4.7 | × | ◉ | ○ | 50 | × |
| Comp. Ex. 26 | 9 | 2.1 | × | 0.25 | 0.45 | × | 3.5 | 3.3 | ○ | ◉ | ○ | 50 | × |

[1]Drawdown property of parison
[2]Difference between the maximum and minimum diameters of parison.
[3]Falling impact strength of bottle
[4]Falling breakage height of bottle
[5]Molded at 210° C.
[6]Could not be measured because parison could not be formed.

The following discussion is based on results in Tables 29, 30 and 32.

The copolyesters of Examples 26 through 31, containing terephthalic acid units and ethylene glycol units and further containing diol units (I) and/or diol units (II) having a benzene ring, and units (b$_3$) from a multifunctional compound in amounts of 0.5 to 7 mole % and 0.005 to 0.5 mole %, respectively, based on the moles of total constituent units of the copolyesters, can be produced smoothly by solid phase polymerization in a short period of time of not more than 30 hours, to have an intrinsic viscosity suited for melt molding, e.g., extrusion blow molding. On producing bottles by extrusion blow molding of the copolyesters obtained in Examples 26 through 31, the drawdown time of extruded parisons was in a proper range of 17 to 23 seconds, the difference between the maximum and minimum diameters of parisons was not more than 0.4 cm, the production of bottles was at least 120 pieces per hour, with the defectives being less than 10 pieces per 100 pieces, thus proving excellent drawdown property. The obtained bottles had an average wall thickness of 0.3 to 0.7 mm and thickness unevenness of less than 0.3 mm, thus showing excellent blow moldability. Furthermore, the bottles obtained in Examples 26 through 31 had a haze value of not more than 4 and a b-value of not more than 4, indicating excellent transparency. The bottles had a gel generation of not more than 5% and a rate of generation of agglomerates of not more than 5 pieces/100 cm$^2$, both being very low. The bottles had a falling breakage height of at least 100 cm, indicating excellent falling impact strength.

The following discussion is based on the results shown in Tables 31 and 32.

The copolyester of Comparative Example 24, containing terephthalic acid units and ethylene glycol units and, while containing diol units (I) and/or units (II) having a benzene ring and units (b$_3$) from a multifunctional compound, having a content of the multifunctional compound units (b$_3$) exceeding 0.5 mole %, based on the moles of total constituent units of the copolyester, gave by extrusion blow molding bottles having a thickness unevenness of 0.35 mm, indicating poor blow moldability. Furthermore, the bottles had a minutely roughened surface and had a haze value of at least 8, indicating poor transparency. The bottles had a large number of gels and unmelted agglomerates and had a falling breakage height of 60 cm, indicating low falling impact strength and low quality.

The copolyester of Comparative Example 25, containing terephthalic acid units and ethylene glycol units and, while containing diol units (I) and/or units (II) having a benzene ring, and units (b$_3$) from a multifunctional compound, having a content of the diol units (I) and/or units (II) having a benzene ring exceeding 7 mole %, based on the moles of total constituent units of the copolyester, was amorphous. The degree of polymerization of the copolyester could therefore not be increased by solid phase polymerization. The copolyester could not show a high melt viscosity at a temperature of 270° C., so that extrusion blow molding was impossible at this temperature. Extrusion blow molding was hence conducted at a temperature of 210° C., at which the molding was barely possible. The resulting parisons had poor drawdown property. Bottles obtained had a thickness unevenness of 0.45 mm, indicating poor blow moldability. Furthermore, the bottles obtained in Comparative Example 25, having been molded at a low temperature, had a pronounced finely roughened surface, thereby showing a haze value exceeding 8, which means poor transparency, and poor tactility. The bottles had a falling breakage height of 50 cm, indicating low falling impact strength and low quality.

The copolyester of Comparative Example 26, containing terephthalic acid units and ethylene glycol units and, while containing 2,2-bis [4-(2-hydroxyethoxy)phenyl]propane units and pentaerythritol units as diol units (I) and/or units (II), having a benzene ring and multifunctional compound units (b$_3$), respectively, had its intrinsic viscosity increased to 0.7 dl/g solely by melt polycondensation. The copolyester did not show a high melt viscosity at a temperature of 270° C., thereby giving parisons having poor drawdown property. Bottles obtained by extrusion blow molding had an average wall thickness of 0.25 mm and a thickness unevenness of 0.45 mm, indicating poor blow moldability. The bottles had a falling breakage height of 50 cm, thus having a low falling impact strength and low quality.

Example 32

(1) A slurry was prepared from 97.00 parts by weight of terephthalic acid, 48.73 parts by weight of ethylene glycol, 3.90 parts by weight of 2,6-naphthalenedicarboxylic acid, 0.063 parts by weight of trimethylolpropane, and 0.016 parts by weight of benzoic acid. To the slurry were added 0.020 parts by weight of germanium dioxide, 0.015 parts by weight of phosphorus acid, 0.015 parts by weight of cobalt acetate, and 0.015 parts by weight of tetraethylammonium hydroxide. The resulting slurry was heated under a pressure (absolute pressure: 2.5 kg/cm$^2$) to a temperature of 250° C., to conduct esterification to an esterification ratio of 95%, to produce a low-polymerization-degree compound. The compound thus obtained was melt polycondensed under a reduced pressure of 1 mm Hg and at a temperature of 270° C. to yield a copolyester prepolymer having an intrinsic viscosity of 0.69 dl/g. The prepolymer was extruded through a nozzle into a strand, which was then cut into cylindrical chips (diameter: about 2.5 mm, length: about 3.5 mm). The prepolymer had a melt flow rate (MFR) at 270° C. of 28 g/10 min.

(2) The copolyester prepolymer chips thus obtained were pre-dried at a temperature of 150° C. for 5 hours, then subjected to solid phase polymerization with a tumbling type vacuum solid phase polymerization apparatus under a reduced pressure of 0.1 mm Hg at 210° C. for 24 hours, to yield a high molecular copolyester.

(3) The copolyester obtained in (2) above was tested for the content of each structural units by the above-described method. The content of terephthalic acid units, ethylene glycol units, 2,6-naphthalenedicarboxylic acid units, trimethylolpropane units, benzoic acid units or diethylene glycol units was as shown in Table 34 below.

(4) The copolyester obtained in (2) above was also tested for the physical properties according to the above-described methods, to show, as given in Table 34 below, an intrinsic viscosity of 1.11 dl/g, an MFR at 270° C. of 1.9 g/10 min, and melt viscosities at the same temperature and at a shear rate of 0.1 rad/sec ($\eta 1$) and at a shear rate of 100 rad/sec ($\eta 2$) of $1.77 \times 10^5$ poises and $1.70 \times 10^4$ poises, respectively, which led to a value of $(\frac{1}{2})\log_{10}(\eta 2/\eta 1)$ of –0.34.

The copolyester obtained in (2) above was further tested for shark-skin critical shear stress ($\eta ss$) and shear stress ($\sigma 100$) at a shear rate of 100/sec, at a temperature of 270° C., to show $6.0 \times 10^6$ dyne/cm$^2$ and $2.3 \times 10^6$ dyne/cm$^2$, respectively.

The copolyester obtained in (2) above was further tested for X c, Tg, Tm, Tcc and $\Delta$Hcc, to show, as given in Table 34 below, 30%, 79° C., 245° C., 138° C. and 13 J/g, respectively.

The copolyester obtained in (2) above had a terminal carboxyl group concentration (CEG) of 12 μequivalent/g.

(5) The copolyester obtained in (2) above was extrusion blow molded through an extrusion blow molding machine (hollow molding machine Type BM-304.J2, made by Placo Co.) into bottles (designed capacity: 1,800 ml, designed weight: 80 g). The intermediate product parisons were tested for drawdown property and blow moldability, and the resulting bottles were tested for transparency, generation of gels, generation of agglomerates, falling breakage height, and falling impact strength, in accordance with the above-described methods, to give the results shown in Table 40 below.

Examples 33 through 35

Terephthalic acid and ethylene glycol were used in amounts as shown in Table 34 below. In addition, 2,6-naphthalenedicarboxylic acid, and trimethylolpropane or trimellitic anhydride, and 2-naphthoic acid, benzoic acid or 2,4,6-trimethoxybenzoic acid were used as a bifunctional compound for the bifunctional compound units (a$_3$), a multifunctional compound for the multifunctional compound units (b$_1$), and a monofunctional compound for the monofunctional compound units (c), respectively, in amounts as shown in Table 34. Esterification and melt polycondensation were conducted in the same manner as in Example 32, to prepare copolyester prepolymer chips. The copolyester prepolymers obtained were each subjected to solid phase polymerization under the conditions of temperature and time as shown in Table 34, to yield copolyesters.

The copolyesters thus obtained were each tested for the content of structural units and properties in the same manner as in Example 32. The results are shown in Table 34 below.

The copolyesters obtained in Examples 33 through 35 were each extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 40 below.

Examples 36 through 39

Terephthalic acid and ethylene glycol were used in amounts as shown in Table 35. In addition, 4,4'-biphenyldicarboxylic acid, and pentaerythritol, trimellitic anhydride or trimethylolpropane, and stearic acid, stearyl alcohol, m-anisic acid or benzoic acid were used as a bifunctional compound for the bifunctional compound units (a$_3$), a multifunctional compound for the multifunctional compound units (b$_1$), and a monofunctional compound for the monofunctional compound units (c), respectively, in amounts as shown in Table 35. Esterification and melt polycondensation were conducted in the same manner as in Example 32, to prepare copolyester prepolymer chips. The copolyester prepolymers obtained were subjected to solid phase polymerization under the conditions of temperature and time as shown in Table 35, to yield copolyesters.

The copolyesters thus obtained were tested for the content of structural units and properties in the same manner. The results are shown in Table 35 below.

The copolyesters obtained in Examples 36 through 39 were extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 40 below.

Examples 40 through 43

Terephthalic acid and ethylene glycol were used in amounts as shown in Table 36. In addition, 2,6-naphthalenedicarboxylic acid or 4,4'-biphenyldicarboxylic acid, and trimethylolpropane, trimellitic anhydride or pyromellitic anhydride were used in amounts as shown in Table 36, as a bifunctional compound for the bifunctional compound units (a$_3$) and a multifunctional compound for the multifunctional compound units (b$_1$), respectively, without using any monofunctional compound for the monofunctional compound units (c). Esterification and melt polycondensation were conducted in the same manner as in Example 32, to prepare copolyester prepolymer chips. The copolyester prepolymers obtained were subjected to solid phase polymerization under the conditions of temperature and time as shown in Table 36, to yield copolyesters.

The copolyesters thus obtained were tested for the content of structural units and properties in the same manner. The results are shown in Table 36 below.

The copolyesters obtained in Examples 40 through 43 were extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 40 below.

Examples 44 and 45

Terephthalic acid and ethylene glycol biphenyldicarboxylic acid and trimellitic anhydride were used in amounts as shown in Table 37, as a bifunctional compound for the bifunctional compound units ($a_3$) and a multifunctional compound for the multifunctional compound units ($b_1$), respectively, without using any monofunctional compound for the monofunctional compound units (c). Esterification and melt polycondensation were conducted in the same manner as in Example 32, to prepare copolyester prepolymer chips. The copolyester prepolymers obtained were subjected to solid phase polymerization under the conditions of temperature and time as shown in Table 37, to yield copolyesters.

The copolyesters thus obtained were tested for the content of structural units and properties in the same manner. The results are shown in Table 37 below.

The copolyesters obtained in these Examples 44 and 45 were extrusion blow molded into bottles in the same manner. The drawdown property and blow moldability of the parisons and the transparency, generation of gels, generation of agglomerates, falling breakage height, and falling impact strength of the obtained bottles were determined or evaluated by the above-described methods. The results are shown in Table 40 below.

Comparative Examples 27 through 29

Terephthalic acid and ethylene glycol were used in amounts as shown in Table 38. In addition, 2,6-naphthalenedicarboxylic acid was used as a bifunctional compound for the bifunctional compound units ($a_3$), and no multifunctional compound for the multifunctional compound units ($b_1$) was used or trimethylolpropane was used as the multifunctional compound units ($b_1$), in amounts as shown in Table 38. Further, no monofunctional compound for the multifunctional compound units (c) was used or benzoic acid was used as the monofunctional compound units (c), in an amount as shown in Table 38. Esterification and melt polycondensation were conducted in the same manner as in Example 32, to prepare copolyester prepolymer chips. The copolyester prepolymers obtained were subjected to solid phase polymerization under the conditions of temperature and time as shown in Table 38, to yield copolyesters. In Comparative Examples 27 and 29, the obtained copolyester prepolymer chips were amorphous, and they were subjected to the below-described extrusion blow molding without being subjected to the solid phase polymerization.

The copolyesters thus obtained were each tested for the content of structural units and properties in the same manner as in Example 32 (in Comparative Examples 27 and 29, the determinations were made at 210° C. for the above reason). The results are shown in Table 38 below.

The copolyesters obtained in Comparative Examples 27 through 29 were each extrusion blow molded in the same manner as in Example 32 into bottles. In Comparative Examples 27 and 29, the extrusion blow molding was conducted at 210° C. The drawdown property and blow moldability of the parisons and the transparency, generation of gels, generation of agglomerates, falling breakage height, and falling impact strength of the obtained bottles were determined or evaluated by the above-described methods. The results are shown in Table 41 below.

Comparative Examples 30 through 32

Terephthalic acid and ethylene glycol were used in amounts as shown in Table 39. In addition, 2,6-naphthalenedicarboxylic acid was used as a bifunctional compound for the bifunctional compound units ($a_3$), and no multifunctional compound for the multifunctional compound units ($b_1$) was used or trimellitic acid or trimethylolpropane was used for the multifunctional compound units ($b_1$), in amounts as shown in Table 39. Further, no monofunctional compound for the monofunctional compound units (c) was used or benzoic acid was used for the monofunctional compound units (c), in amounts as shown in Table 39. Esterification and melt polycondensation were conducted in the same manner as in Example 32, to prepare copolyester prepolymer chips. The copolyester prepolymers obtained were subjected to solid phase polymerization under the conditions of temperature and time as shown in Table 39, to yield copolyesters.

The copolyesters thus obtained were tested for the content of structural units and properties in the same manner as in Example 32. The results are shown in Table 38 below.

The copolyesters obtained in Comparative Examples 30 through 32 were each extrusion blow molded into bottles in the same manner as in Example 32. The drawdown property and blow moldability of the parisons and the transparency, generation of gels, generation of agglomerates, falling breakage height, and falling impact strength of the obtained bottles were determined or evaluated by the above-described methods. The results are shown in Table 41 below.

Abbreviations in Tables 34 through 39 are defined in Table 33 below.

Table 33

| Code | Compound |
| --- | --- |
| TPA | Terephthalic acid |
| EG | Ethylene glycol |
| DEG | Diethylene glycol |
| NDCA | 2,6-Naphthalenedicarboxylic acid |
| BBA | 4,4'-Biphenyldicarboxylic acid |
| TMA | Trimellitic anhydride |
| PMA | Pyromellitic anhydride |
| TMP | Trimethylolpropane |
| PENTA | Pentaerythritol |
| BA | Benzoic acid |
| NA | 2-Naphthoic acid |
| TMOBA | 2,4,6-Trimethoxybenzoic acid |
| STA | Stearic acid |
| STOH | Stearyl alcohol |
| AA | m-Anisic acid |

TABLE 34

|  | Example 32 | Example 33 | Example 34 | Example 35 |
|---|---|---|---|---|
| Starting mat'l component | | | | |
| Dicarboxylic acid component | | | | |
| Type: parts by weight | TPA: 97.00 | TPA: 95.00 | TPA: 93.00 | TPA: 90.00 |
| Diol component | | | | |
| Type: parts by weight | EG: 48.73 | EG: 48.73 | EG: 48.73 | EG: 48.73 |
| Bifunctional compound | | | | |
| Type: parts by weight | NDCA: 3.90 | NDCA: 6.51 | NDCA: 9.10 | NDCA: 9.30 |
| Multi-functional compound | | | | |
| Type: parts by weight | TMP: 0.063 | TMP: 0.190 | TMP: 0.889 | TMA: 0.866 |
| Monofunctional compound | | | | |
| Type: parts by weight | BA: 0.016 | NA: 0.113 | BA: 0.565 | TMOBA: 2.945 |
| Prepolymer | 0.69 | 0.69 | 0.70 | 0.69 |
| Intrinsic viscosity (dl/g) | | | | |
| MFR (g/10 min) | 28 | 25 | 25 | 24 |
| Solid phase polymerization | | | | |
| temperature (°C.) | 210 | 210 | 200 | 210 |
| time (hr) | 25 | 22 | 25 | 25 |
| Copolyester [structural unit] | | | | |
| Dicarboxylic acid units | | | | |
| Type: mole % | TPA: 48.50 | TPA: 47.51 | TPA: 46.49 | TPA: 45.49 |
| Diol units | | | | |
| Type: mole %[1)] | EG: 48.70 | EG: 48.58 | EG: 47.79 | EG: 46.80 |
| Type: mole %[1)] | DEG: 1.24 | DEG: 1.18 | DEG: 1.21 | DEG: 1.21 |
| Bifuctional compound units | | | | |
| Type: mole %[1)] | NDCA: 1.50 | NDCA: 2.49 | NDCA: 3.51 | NDCA: 4.51 |
| Multi-functional compound units | | | | |
| Type: mole %[1)] | TMP: 0.05 | TMP: 0.16 | TMP: 0.49 | TMA: 0.49 |
| Monofunctional compound units | | | | |
| Type: mole %[1)] | BA: 0.01 | NA: 0.09 | BA: 0.51 | TMOBA: 1.50 |
| [Physical properties] | | | | |
| Intrinsic viscosity (dl/g) | 1.11 | 1.17 | 1.19 | 1.02 |
| MFR (g/10 min) | 1.9 | 0.8 | 0.6 | 1.1 |
| η 1 (poises) | $1.77 \times 10^5$ | $6.70 \times 10^5$ | $8.10 \times 10^5$ | $5.10 \times 10^5$ |
| η 2 (poises) | $1.70 \times 10^4$ | $2.31 \times 10^4$ | $2.01 \times 10^4$ | $9.59 \times 10^3$ |
| (½) $\log_{10}$ (η 2/η 1) | −0.34 | −0.48 | −0.53 | −0.57 |
| σ ss (dyne/cm$^2$) | $6.0 \times 10^5$ | $6.6 \times 10^5$ | $8.5 \times 10^5$ | $9.1 \times 10^5$ |
| σ 100 (dyne/cm$^2$) | $2.3 \times 10^5$ | $3.7 \times 10^5$ | $3.2 \times 10^5$ | $1.3 \times 10^5$ |
| Crystallinity (%) | 30 | 30 | 25 | 23 |
| Tg (°C.) | 79 | 81 | 85 | 91 |
| Tm (°C.) | 245 | 236 | 225 | 215 |
| Tcc (°C.) | 138 | 139 | 125 | 119 |
| ΔHcc (J/g) | 13 | 11 | 10 | 8 |
| CEG (μequivalent/g) | 12 | 11 | 12 | 12 |

[1)]based on the sum of total constituting units of copolyesters.

TABLE 35

|  | Example 36 | Example 37 | Example 38 | Example 39 |
|---|---|---|---|---|
| Starting mat'l component | | | | |
| Dicarboxylic acid component | | | | |
| Type: parts by weight | TPA: 95.00 | TPA: 92.00 | TPA: 95.00 | TPA: 93.00 |
| Diol component | | | | |
| Type: parts by weight | EG: 48.73 | EG: 48.73 | EG: 48.73 | EG: 48.73 |
| Bifunctional compound | | | | |
| Type: parts by weight | BBA: 7.29 | BBA: 11.66 | BBA: 7.29 | BBA: 10.21 |
| Multi-functional compound | | | | |
| Type: parts by weight | PENTA: 0.049 | TMA: 0.578 | TMP: 0.253 | TMA: 0.463 |
| Monofunctional compound | | | | |
| Type: parts by weight | STA: 0.035 | STOH: 0.405 | AA: 0.183 | BA: 0.588 |
| Prepolymer | 0.68 | 0.70 | 0.70 | 0.68 |
| Intrinsic viscosity (dl/g) | | | | |
| MFR (g/10 min) | 25 | 26 | 27 | 26 |

TABLE 35-continued

|  | Example 36 | Example 37 | Example 38 | Example 39 |
|---|---|---|---|---|
| Solid phase polymerization |  |  |  |  |
| temperature (°C.) | 210 | 210 | 210 | 210 |
| time (hr) | 25 | 25 | 20 | 20 |
| Copolyester [structural unit] |  |  |  |  |
| Dicarboxylic acid units |  |  |  |  |
| Type: mole % | TPA: 47.51 | TPA: 16.00 | TPA: 47.49 | TPA: 46.51 |
| Diol units |  |  |  |  |
| Type: mole %[1)] | EG: 48.73 | EG: 48.44 | EG: 48.67 | EG: 48.17 |
| Type: mole %[1)] | DEG: 1.20 | DEG: 1.21 | DEG: 1.18 | DEG: 1.18 |
| Bifuctional compound units |  |  |  |  |
| Type: mole %[1)] | BBA: 2.49 | BBA: 4.00 | BBA: 2.49 | BBA: 3.49 |
| Multi-functional compound units |  |  |  |  |
| Type: mole %[1)] | PENTA: 0.05 | TMA: 0.25 | TMP: 0.05 | TMA: 0.24 |
| Monofunctional compound units |  |  |  |  |
| Type: mole %[1)] | STA: 0.02 | STOH: 0.10 | AA: 0.10 | BA: 0.41 |
| [Physical properties] | 1.19 | 1.10 | 1.00 | 1.05 |
| Intrinsic viscosity (dl/g) |  |  |  |  |
| MFR (g/10 min) | 1.3 | 0.9 | 1.1 | 0.7 |
| η 1 (poises) | $1.30 \times 10^5$ | $5.90 \times 10^5$ | $3.15 \times 10^5$ | $6.13 \times 10^5$ |
| η 2 (poises) | $1.59 \times 10^4$ | $1.35 \times 10^4$ | $1.35 \times 10^4$ | $1.15 \times 10^4$ |
| (⅓) $\log_{10}$ (η 2/η 1) | −0.30 | −0.55 | −0.46 | −0.58 |
| σ ss (dyne/cm$^2$) | $6.0 \times 10^6$ | $7.5 \times 10^6$ | $6.4 \times 10^6$ | $7.5 \times 10^6$ |
| σ 100 (dyne/cm$^2$) | $3.3 \times 10^6$ | $2.1 \times 10^6$ | $3.0 \times 10^6$ | $2.0 \times 10^6$ |
| Crystallinity (%) | 29 | 25 | 25 | 25 |
| Tg (°C.) | 79 | 81 | 79 | 81 |
| Tm (°C.) | 237 | 225 | 236 | 224 |
| Tcc (°C.) | 139 | 125 | 137 | 123 |
| ΔHcc (J/g) | 13 | 6 | 11 | 8 |
| CEG (μequivalent/g) | 12 | 12 | 11 | 10 |

[1)]Based on the sum of total constituting units of copolyesters.

TABLE 36

|  | Example 40 | Example 41 | Example 42 | Example 43 |
|---|---|---|---|---|
| Starting mat'l component |  |  |  |  |
| Dicarboxylic acid component |  |  |  |  |
| Type: parts by weight | TPA: 97.00 | TPA: 95.00 | TPA: 92.00 | TPA: 95.00 |
| Diol component |  |  |  |  |
| Type: parts by weight | EG: 48.73 | EG: 48.73 | EG: 48.73 | EG: 48.73 |
| Bifunctional compound |  |  |  |  |
| Type: parts by weight | NDCA: 3.90 | NDCA: 6.51 | NDCA: 10.40 | BBA: 7.29 |
| Multi-functional compound |  |  |  |  |
| Type: parts by weight | TMP: 0.081 | TMA: 0.578 | TMA: 0.925 | PMA: 0.263 |
| Monofunctional compound |  |  |  |  |
| Type: parts by weight | — | — | — | — |
| Prepolymer | 0.69 | 0.69 | 0.69 | 0.70 |
| Intrinsic viscosity (dl/g) |  |  |  |  |
| MFR (g/10 min) | 29 | 25 | 25 | 26 |
| Solid phase polymerization |  |  |  |  |
| temperature (°C.) | 210 | 210 | 210 | 210 |
| time (hr) | 25 | 25 | 22 | 21 |
| Copolyester [structural unit] |  |  |  |  |
| Dicarboxylic acid units |  |  |  |  |
| Type: mole % | TPA: 48.51 | TPA: 47.50 | TPA: 46.00 | TPA: 47.52 |
| Diol units |  |  |  |  |
| Type: mole %[1)] | EG: 48.75 | EG: 48.54 | EG: 48.41 | EG: 48.71 |
| Type: mole %[1)] | DEG: 1.20 | DEG: 1.21 | DEG: 1.19 | DEG: 1.19 |
| Bifuctional compound units |  |  |  |  |
| Type: mole %[1)] | NDCA: 1.49 | NDCA: 2.50 | NDCA: 4.00 | BBA: 2.48 |

TABLE 36-continued

|  | Example 40 | Example 41 | Example 42 | Example 43 |
|---|---|---|---|---|
| Multi-functional compound units |  |  |  |  |
| Type: mole %[1] | TMP: 0.05 | TMA: 0.25 | TMA: 0.40 | PMA: 0.10 |
| Monofunctional compound units |  |  |  |  |
| Type: mole %[1] | — | — | — | — |
| [Physical properties] |  |  |  |  |
| Intrinsic viscosity (dl/g) | 1.15 | 1.17 | 1.10 | 1.14 |
| MFR (g/10 min) | 1.2 | 0.7 | 0.9 | 0.6 |
| $\eta$ 1 (poises) | $1.21 \times 10^5$ | $5.55 \times 10^5$ | $3.15 \times 10^5$ | $5.68 \times 10^5$ |
| $\eta$ 2 (poises) | $1.69 \times 10^4$ | $2.10 \times 10^4$ | $1.65 \times 10^4$ | $1.29 \times 10^4$ |
| (½) $\log_{10}$ ($\eta$ 2/$\eta$ 1) | −0.28 | −0.47 | −0.43 | −0.55 |
| $\sigma$ ss (dyne/cm$^2$) | $6.6 \times 10^6$ | $8.7 \times 10^6$ | $5.7 \times 10^6$ | $6.9 \times 10^6$ |
| $\sigma$ 100 (dyne/cm$^2$) | $2.4 \times 10^6$ | $2.5 \times 10^6$ | $3.2 \times 10^6$ | $1.5 \times 10^6$ |
| Crystallinity (%) | 29 | 30 | 25 | 30 |
| Tg (°C.) | 79 | 82 | 92 | 81 |
| Tm (°C.) | 243 | 228 | 219 | 229 |
| Tcc (°C.) | 133 | 125 | 115 | 126 |
| ΔHcc (J/g) | 9 | 5 | 11 | 8 |
| CEG (μequivalent/g) | 11 | 12 | 8 | 10 |

[1] Based on the sum of total constituting units of copolyesters.

TABLE 37

|  | Example 44 | Example 45 |
|---|---|---|
| Starting mat'l component |  |  |
| Dicarboxylic acid component |  |  |
| Type: parts by weight | TPA: 92.00 | TPA: 93.00 |
| Diol component |  |  |
| Type: parts by weight | EG: 48.73 | EG: 48.73 |
| Bifunctional compound |  |  |
| Type: parts by weight | BBA: 11.66 | BBA: 10.21 |
| Multi-functional compound |  |  |
| Type: parts by weight | TMA: 0.695 | TMA: 0.116 |
| Monofunctional compound |  |  |
| Type: parts by weight | — | — |
| Prepolymer |  |  |
| Intrinsic viscosity (dl/g) | 0.69 | 0.70 |
| MFR (g/10 min) | 28 | 29 |
| Solid phase polymerization |  |  |
| temperature (°C.) | 210 | 210 |
| time (hr) | 25 | 25 |
| Copolyester [structural unit] |  |  |
| Dicarboxylic acid units |  |  |
| Type: mole % | TPA: 46.00 | TPA: 46.51 |
| Diol units |  |  |
| Type: mole %[1] | EG: 48.51 | EG: 48.74 |
| Type: mole %[1] | DEG: 1.19 | DEG: 1.21 |
| Bifuctional compound units |  |  |
| Type: mole %[1] | BBA: 4.00 | BBA: 3.49 |
| Multi-functional compound units |  |  |
| Type: mole %[1] | TMA: 0.30 | TMA: 0.05 |
| Monofunctional compound units |  |  |
| Type: mole %[1] | — | — |
| [Physical properties] |  |  |
| Intrinsic viscosity (dl/g) | 1.10 | 1.01 |
| MFR (g/10 min) | 1.1 | 0.9 |
| $\eta$ 1 (poises) | $6.12 \times 10^5$ | $4.05 \times 10^5$ |
| $\eta$ 2 (poises) | $1.02 \times 10^4$ | $9.55 \times 10^3$ |
| (½) $\log_{10}$ ($\eta$ 2/$\eta$ 1) | −0.59 | −0.54 |
| $\sigma$ ss (dyne/cm$^2$) | $7.7 \times 10^6$ | $6.5 \times 10^6$ |
| $\sigma$ 100 (dyne/cm$^2$) | $1.2 \times 10^6$ | $1.9 \times 10^6$ |
| Crystallinity (%) | 29 | 24 |
| Tg (°C.) | 80 | 85 |
| Tm (°C.) | 235 | 225 |
| Tcc (°C.) | 132 | 125 |
| ΔHcc (J/g) | 13 | 10 |
| CEG (μequivalent/g) | 13 | 16 |

[1] Based on the sum of total constituting units of copolyesters.

TABLE 38

|  | Comp. Ex. 27 | Comp. Ex. 28 | Comp. Ex. 29 |
|---|---|---|---|
| Starting mat'l component |  |  |  |
| Dicarboxylic acid component |  |  |  |
| Type: parts by weight | TPA: 70.00 | TPA: 99.40 | TPA: 70.00 |
| Diol component |  |  |  |
| Type: parts by weight | EG: 48.73 | EG: 48.73 | EG: 48.73 |
| Bifunctional compound |  |  |  |
| Type: parts by weight | NDCA: 39.04 | NDCA: 0.78 | NDCA: 39.04 |
| Multi-functional compound |  |  |  |
| Type: parts by weight | — | TMP: 0.227 | TMP: 0.227 |
| Monofunctional compound |  |  |  |
| Type: parts by weight | — | — | BA: 0.260 |
| Prepolymer | 0.75 | 0.70 | 0.70 |
| Intrinsic viscosity (dl/g) |  |  |  |
| MFR (g/10 min) | 20 | 25 | 29 |
| Solid phase polymerization |  |  |  |
| temperature (°C.) | — | 210 | — |
| time (hr) | — | 25 | — |
| Copolyester [structural unit] |  |  |  |
| Dicarboxylic acid units |  |  |  |
| Type: mole % | TPA: 35.01 | TPA: 49.71 | TPA: 35.05 |
| Diol units |  |  |  |
| Type: mole %[1] | EG: 48.65 | EG: 46.36 | EG: 48.57 |
| Type: mole %[1] | DEG: 1.35 | DEG: 1.50 | DEG: 1.19 |
| Bifuctional compound units |  |  |  |

TABLE 38-continued

|  | Comp. Ex. 27 | Comp. Ex. 28 | Comp. Ex. 29 |
|---|---|---|---|
| Type: mole %[1] Multi-functional compound units | NDCA: 15.01 | NDCA: 0.29 | NDCA: 14.95 |
| Type: mole %[1] Monofunctional compound units | — | TMP: 0.14 | TMP: 0.14 |
| Type: mole %[1] | — | — | BA: 0.10 |
| [Physical properties] Intrinsic viscosity (dl/g) | 0.75[2] | 1.15 | 0.70[2] |
| MFR (g/10 min) | 5.1 | 5.9 | 2.5 |
| η 1 (poises) | $9.02 \times 10^4$ | $2.10 \times 10^5$ | $1.15 \times 10^5$ |
| η 2 (poises) | $2.05 \times 10^4$ | $8.80 \times 10^3$ | $3.46 \times 10^4$ |
| (⅓) log$_{10}$ (η 2/η 1) | −0.21 | −0.46 | −0.17 |
| σ ss (dyne/cm²) | $2.0 \times 10^6$ | $5.9 \times 10^6$ | $1.6 \times 10^6$ |
| σ 100 (dyne/cm²) | $5.0 \times 10^6$ | $2.5 \times 10^6$ | $4.8 \times 10^6$ |
| Crystallinity (%) | — | 41 | — |
| Tg (°C.) | 105 | 78 | 106 |
| Tm (°C.) | — | 252 | — |
| Tcc (°C.) | — | 153 | — |
| ΔHcc (J/g) | — | 29 | — |
| CEG (μequivalent/g) | 30 | 12 | 31 |

[1] Based on the sum of total constituting units of copolyesters.
[2] The prepolymer was tested at 210° C.

TABLE 39

|  | Comp. Ex. 27 | Comp. Ex. 31 | Comp. Ex. 32 |
|---|---|---|---|
| Starting mat'l component Dicarboxylic acid component |  |  |  |
| Type: parts by weight | TPA: 95.00 | TPA: 93.00 | TPA: 95.00 |
| Diol component |  |  |  |
| Type: parts by weight | EG: 48.73 | EG: 48.73 | EG: 48.73 |
| Bifunctional compound |  |  |  |
| Type: parts by weight Multi-functional compound | NDCA: 6.51 | NDCA: 13.65 | NDCA: 6.51 |
| Type: parts by weight Monofunctional compound | TMA: 1.785 | — | TMP: 0.231 |
| Type: parts by weight | — | — | BA: 4.411 |
| Prepolymer Intrinsic viscosity (dl/g) | 0.70 | 0.75 | 0.70 |
| MFR (g/10 min) | 25 | 20 | 25 |
| Solid phase polymerization |  |  |  |
| temperature (°C.) | 210 | — | 210 |
| time (hr) | 10 | — | 72 |
| Copolyester [structural unit] Dicarboxylic acid units |  |  |  |
| Type: mole % | TPA: 47.51 | TPA: 46.49 | TPA: 47.51 |
| Diol units |  |  |  |
| Type: mole %[1] | EG: 48.70 | EG: 48.65 | EG: 46.36 |
| Type: mole %[1] | DEG: 1.12 | DEG: 1.35 | DEG: 1.50 |
| Bifuctional compound units |  |  |  |

TABLE 39-continued

|  | Comp. Ex. 27 | Comp. Ex. 31 | Comp. Ex. 32 |
|---|---|---|---|
| Type: mole %[1] Multi-functional compound units | NDCA: 2.49 | NDCA: 5.27 | NDCA: 2.49 |
| Type: mole %[1] Monofunctional compound units | TMA: 0.75 | — | TMP: 0.10 |
| Type: mole %[1] | — | — | BA: 3.01 |
| [Physical properties] Intrinsic viscosity (dl/g) | —[2] | 0.75 | 0.80 |
| MFR (g/10 min) | 0.3 | 5.1 | 25 |
| η 1 (poises) | $2.20 \times 10^6$ | $9.18 \times 10^4$ | $9.10 \times 10^3$ |
| η 2 (poises) | $9.90 \times 10^3$ | $2.01 \times 10^4$ | $8.60 \times 10^3$ |
| (⅓) log$_{10}$ (η 2/η 1) | −0.78 | −0.22 | −0.01 |
| σ ss (dyne/cm²) | $4.0 \times 10^6$ | $2.0 \times 10^6$ | $5.8 \times 10^6$ |
| σ 100 (dyne/cm²) | $3.9 \times 10^6$ | $5.2 \times 10^6$ | $1.5 \times 10^6$ |
| Crystallinity (%) | 35 | 27 | 24 |
| Tg (°C.) | 78 | 85 | 78 |
| Tm (°C.) | 235 | 230 | 220 |
| Tcc (°C.) | 150 | 129 | 153 |
| ΔHcc (J/g) | 23 | 15 | 20 |
| CEG (μequivalent/g) | 21 | 12 | 30 |

[1] Based on the sum of total constituting units of copolyesters.
[2] Could not be tested because of generation of too many gels.

TABLE 40

| | Drawdown property of parison[1] | | | Blow moldability | | | Transparency of bottle | | | Gel generation of bottle | Generation of agglomerates of bottle | Falling impact strength[3] | |
|---|---|---|---|---|---|---|---|---|---|---|---|---|---|
| | Drawdown time (sec) | Difference between max. and min. diameters[2] (cm) | Overall evaluation | Average wall thickness (mm) | Thickness unevenness (mm) | Overall evaluation | Haze value | b-value | Overall evaluation | | | Breakage height[4] (cm) | Overall evaluation |
| Example 32 | 16 | 0.5 | ○ | 0.51 | 0.20 | ○ | 3.8 | 0.5 | ○ | ⊙ | ⊙ | 140 | ⊙ |
| Example 33 | 18 | 0.3 | ○ | 0.55 | 0.20 | ○ | 3.0 | 1.0 | ○ | ⊙ | ⊙ | 130 | ⊙ |
| Example 34 | 23 | 0.3 | ○ | 0.49 | 0.20 | ○ | 2.9 | 1.6 | ○ | ⊙ | ⊙ | 160 | ⊙ |
| Example 35 | 21 | 0.2 | ○ | 0.54 | 0.22 | ○ | 2.1 | 1.3 | ○ | ⊙ | ⊙ | 120 | ⊙ |
| Example 36 | 15 | 0.6 | ○ | 0.55 | 0.19 | ○ | 3.1 | 1.2 | ○ | ⊙ | ⊙ | 150 | ⊙ |
| Example 37 | 20 | 0.2 | ○ | 0.51 | 0.15 | ○ | 2.9 | 1.8 | ○ | ⊙ | ⊙ | 120 | ⊙ |
| Example 38 | 17 | 0.4 | ○ | 0.46 | 0.20 | ○ | 3.0 | 1.8 | ○ | ⊙ | ⊙ | 120 | ⊙ |
| Example 39 | 18 | 0.3 | ○ | 0.50 | 0.19 | ○ | 2.6 | 2.1 | ○ | ⊙ | ⊙ | 110 | ○ |
| Example 40 | 17 | 0.5 | ○ | 0.44 | 0.21 | ○ | 3.7 | 0.9 | ○ | ⊙ | ○ | 110 | ○ |
| Example 41 | 23 | 0.4 | ○ | 0.47 | 0.14 | ○ | 3.3 | 1.4 | ○ | ○ | ○ | 140 | ⊙ |
| Example 42 | 21 | 0.2 | ○ | 0.49 | 0.15 | ○ | 3.4 | 1.7 | ○ | ○ | ○ | 110 | ○ |
| Example 43 | 19 | 0.5 | ○ | 0.50 | 0.20 | ○ | 3.6 | 1.4 | ○ | ○ | ○ | 140 | ⊙ |
| Example 44 | 19 | 0.5 | ○ | 0.55 | 0.15 | ○ | 3.8 | 1.1 | ○ | ○ | ○ | 130 | ⊙ |
| Example 45 | 17 | 0.3 | ○ | 0.48 | 0.19 | ○ | 3.4 | 1.5 | ○ | ⊙ | ○ | 120 | ⊙ |

[1] Drawdown property of parison
[2] Difference between the maximum and minimum diameters of parison.
[3] Falling impact strength of bottle
[4] Falling breakage height of bottle

TABLE 41

| | Drawdown property of parison[1] | | | Blow moldability | | | Transparency of bottle | | | Gel generation of bottle | Generation of agglomerates of bottle | Falling impact strength[3] | |
|---|---|---|---|---|---|---|---|---|---|---|---|---|---|
| | Drawdown time (sec) | Difference between max. and min. diameters[2] (cm) | Overall evaluation | Average wall thickness (mm) | Thickness unevenness (mm) | Overall evaluation | Haze value | b-value | Overall evaluation | | | Breakage height[4] (cm) | Overall evaluation |
| Comp.Ex.27[5] | 11 | 1.5 | Δ | 0.25 | 0.45 | X | 9.5 | 4.8 | X | ⊙ | ○ | 50 | X |
| Comp.Ex.28 | 20 | 0.3 | ○ | 0.50 | 0.33 | X | 8.3 | 2.3 | X | ○ | X | 80 | X |
| Comp.Ex.29[5] | 14 | 0.8 | Δ | 0.30 | 0.45 | X | 9.2 | 4.2 | X | ⊙ | ○ | 50 | X |
| Comp.Ex.30 | 30 | 0.1 | Δ | 0.65 | 0.35 | X | 8.6 | 2.1 | X | X | X | 70 | X |
| Comp.Ex.31 | 7 | 2.5 | X | 0.20 | 0.50 | X | 3.3 | 1.9 | ○ | ⊙ | ○ | 50 | X |
| Comp.Ex.32 | 4 | —[6] | X | — | — | — | — | — | — | — | — | — | — |

[1] Drawdown property of parison
[2] Difference between the maximum and minimum diameters of parison.
[3] Falling impact strength of bottle
[4] Falling breakage height of bottle
[5] Molded at 210° C.
[6] Could not be measured because parsion could not be formed.

The following discussion is based on the results shown in Tables 34 through 37, and 40.

The copolyesters of Examples 32 through 39, containing terephthalic acid units and ethylene glycol units I and further containing bifunctional compound units ($a_3$) and the multifunctional compound units ($b_1$) in amounts of 0.5 to 7 mole % and 0.005 to 1 mole %, respectively, based on the moles of total constituent units of the copolyesters and containing the monofunctional compound units (c) in an amount satisfying the above formula (α), and the copolyesters of Examples 40 through 45, containing terephthalic acid units and ethylene glycol units and further containing bifunctional compound units ($a_3$) and the multifunctional compound units ($b_1$) in amounts of 0.5 to 7 mole % and 0.005 to 0.5 mole %, respectively, based on the moles of total constituent units of the copolyesters, can be produced smoothly by solid phase polymerization in a relatively short period of time of not more than 30 hours, to have an intrinsic viscosity suited for melt molding such as extrusion blow molding. On producing bottles by extrusion blow molding of the copolyesters obtained in Examples 32 through 45, the drawdown time of extruded parisons was in a proper range of 16 to 23 seconds, the difference between the maximum and minimum diameters of parisons was not more than 0.6 cm, the production of bottles was at least 120 pieces per hour with the defectives being less than 10 pieces per 100 pieces, which indicates the excellent drawdown property of the parisons. The obtained bottles had an average wall thickness of 0.3 to 0.7 mm and thickness unevenness of less than 0.3 mm, thus showing excellent blow moldability. Furthermore, the bottles obtained in Examples 32 through 45 had a haze value of not more than 4 and a b-value of not more than 4, indicating excellent transparency. The bottles had a (gel generation of not more than 5% and a rate of generation of agglomerates of not more than 5 pieces/100 $cm^2$, both values being very low The bottles had a falling breakage height of at least 100 cm, indicating excellent falling impact strength.

The following discussion is based on the results shown in Tables 38 and 41.

The copolyesters of Comparative Examples 27 and 29, containing terephthalic acid units and ethylene glycol units and, while containing the bifunctional compound units ($a_3$), having a content of the bifunctional compound units ($a_3$) exceeding 7 mole %, based on the moles of total constituent units of the copolyester, were amorphous. The degree of polymerization of the copolyesters could therefore not be increased by solid phase polymerization. The copolyesters could not show high melt viscosity at a temperature of 270° C., so that extrusion blow molding was impossible at this temperature. Extrusion blow molding was hence conducted at a temperature of 210° C., at which molding was difficult. The resulting parisons had poor drawdown property. Bottles obtained had a thickness unevenness of 0.45 mm, indicating poor blow moldability. Furthermore, the bottles obtained in Comparative Examples 27 and 29, having been molded at a low temperature, had a pronounced finely roughened surface, thereby showing a haze value exceeding 8, which means poor transparency, and poor tactility. The bottles had a falling breakage height of 50 cm, indicating low falling impact strength and low quality.

The copolyester of Comparative Example 28, containing terephthalic acid units and ethylene glycol units arid, while containing the bifunctional compound units ($a_3$) and multifunctional compound units ($b_1$), having a content of the multifunctional compound units ($b_1$) of less than 0.5 mole %, based on the moles of total constituent units of the copolyester, when extrusion blow molded, gave bottles having a thickness unevenness of 0.33 mm, thus showing poor blow moldability. The bottles, having a high rate of crystallization, had a haze value of at least 8, indicating poor transparency. The bottles had a falling breakage height of 80 cm, indicating low falling impact strength and low quality.

The following discussion is based on the results shown in Tables 39 and 41.

The copolyester of Comparative Example 30, containing terephthalic acid units and ethylene glycol units and, while containing the bifunctional compound units ($a_1$) and multifunctional compound units ($b_1$), containing no monofunctional compound units (c) and having a content of the multifunctional compound units ($b_1$) exceeding 0.5 mole %, based on the moles of total constituent units of the copolyester, which deviates from the range specified in the present invention, gave bottles having a thickness unevenness of 0.35 mm when extrusion blow molded, thus showing poor blow moldability. The bottles had a minutely roughened surface and had a haze value of at least 8, thus having poor transparency. The bottles had a large number of gels and unmelted agglomerates and had a falling breakage height of 70 cm, indicating low falling impact strength and low quality.

The copolyester of Comparative Example 31, containing terephthalic acid units and ethylene glycol units and, while containing the bifunctional compound units ($a_3$) contain neither multifunctional compound units ($b_1$) nor monofunctional compound units (c), gave parisons having poor drawdown property. Bottles obtained had an average wall thickness of 0.20 mm and a thickness unevenness of 0.50 mm, thus showing poor blow moldability. The bottles had a very small thickness at the central part of their body and had a falling breakage height of 50 cm, indicating low falling impact strength and low quality.

The copolyester of Comparative Example 32, containing terephthalic acid units and ethylene glycol units and, while containing the bifunctional compound units ($a_3$) multifunctional compound units ($b_1$) and monofunctional compound units (c), had a content of the monofunctional compound units (c) exceeding the range of the above formula ($\alpha$), and could not have its degree of polymerization increased to a sufficient level by melt polymerization and solid phase polymerization, and hence had a low viscosity. When extrusion blow molded, the copolyester could not form parisons and yielded no shaped articles.

Obviously, numerous modifications and variations of the present invention are possible in light of the above teachings. It is therefore to be understood that within the scope of the appended claims the invention may be practiced otherwise than as specifically described herein.

This application is based on Japanese Patent Applications 321,309/1995, 314,564/1995, and 340,541/1995, filed with the Japanese Patent Office on Nov. 16, 1995, Dec. 1, 1995, and Dec. 27, 1995, respectively.

What is claimed as new and desired to be secured by Letters Patent of the United States is:

1. A copolyester, consisting essentially of terephthalic acid units, ethylene glycol units, and i) 1 to 4 mole %, based on the total moles of constituent units of said copolyester, of at least one group of units ($a_1$) from an alicyclic or aliphatic bifunctional compound selected from the group consisting of alicyclic or aliphatic dicarboxylic acids, hydroxycarboxylic acids and diols other than ethylene glycol;

ii) 0.005 to 1 mole %, based on the total moles of constituent units of said copolyester, of units ($b_1$) from at least one multifunctional compound having at least 3 carboxyl groups, hydroxyl groups and/or ester-forming groups thereof; and iii) units (c) from at least one monofunctional compound selected from the group consisting of monocarboxylic acids and monohydric alcohols, and/or ester-forming derivatives thereof, in amounts satisfying the following formula ($\alpha$):

$$\{20\times(p-2)\times b_1\} \geq c \geq \{0.1\times(p-2)\times b_1\} \quad (\alpha)$$

wherein:

$b_1$=content (mole %) of units ($b_1$)
c=content (mole %) of units (c)
p=average number of functional groups of said multifunctional compound deriving units ($b_1$).

2. The copolyester of claim 1, wherein the units ($a_1$) are cyclohexanedimethanol units or cyclohexanedicarboxylic acid units.

3. The copolyester of claim 1, wherein the copolyester has an intrinsic viscosity of 0.8 to 1.5 dl/g.

4. The copolyester of claim 1, wherein the copolyester has:

a melt viscosity ($\eta 1$) at a temperature of 270° C. and at a shear rate of 0.1 rad/sec of $5\times 10^4$ to $5\times 10^6$ poises, and a melt viscosity ($\eta 2$) at a temperature of 270° C. and at a shear rate of 100 rad/sec of $5\times 10^3$ to $5\times 10^5$ poises, said melt viscosities ($\eta 1$) and ($\eta 2$) satisfying the following formula ($\beta$):

$$-0.7 \leq (\tfrac{1}{3})\log_{10}(\eta 2/\eta 1) \leq -0.2. \quad (\beta)$$

5. The copolyester of claim 1, wherein the copolyester has a shark-skin critical shear stress ($\sigma ss$) at a temperature of 270° C. of at least $1\times 10^6$ dyne/cm$^2$, and a shear stress ($\sigma 100$) at a shear rate of 100/sec and at a temperature of 270° C. of not more than said shark-skin critical shear stress ($\sigma ss$).

6. A copolyester consisting essentially of terephthalic acid units, ethylene glycol units, and i) 0.5 to 7 mole %, based on the total moles of constituent units of said copolyester, of at least one group of bifunctional compound units ($a_2$) selected from the group consisting of:

a) diol units (I) of the following formula:

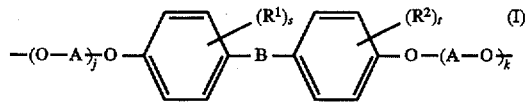

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4; and b) diol units (II) of the following formula:

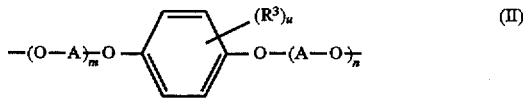

wherein A is —$CH_2CH_2$— or —$CH(CH_3)CH_2$—, $R^3$ is an inert substituent, m and n are each, independently, an integer of 0 to 8, and u is an integer of 0 to 4;

ii) 0.005 to 1 mole %, based on the total moles of constituent units of said copolyester, of multifunctional compound units ($b_1$) derived from at least one multifunctional compound having at least 3 carboxyl groups, hydroxyl groups, and/or ester-forming groups thereof; and iii) monofunctional compound units (c) derived from at least one monofunctional compound selected from the group consisting of monocarboxylic acids, monohydric alcohols, and ester-forming derivatives thereof, in an amount satisfying the following formula ($\alpha$):

$$\{20\times(p-2)\times b_1\} \geq c \geq \{0.1\times(p-2)\times b_1\} \quad (\alpha)$$

wherein:
$b_1$=content (mole %) of units ($b_1$)
c=content (mole %) of units (c)
p=average number of functional groups of said multifunctional compound deriving units ($b_1$).

7. The copolyester of claim 6, further having an intrinsic viscosity of 0.8 to 1.5 dl/g.

8. A copolyester consisting essentially of terephthalic acid units, ethylene glycol units, and i) 0.5 to 7 mole %, based on the total moles of constituent units of said copolyester, of at least one group of bifunctional compound units ($a_2$) selected from the group consisting of:

a) diol units (I) of the following formula:

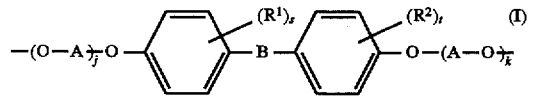

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4; and b) diol units (II) of the following formula:

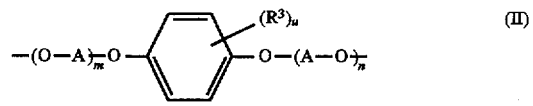

wherein A is —$CH_2CH_2$— or —$CH(CH_3)CH_2$—, $R^3$ is an inert substituent, m and n are each, independently, an integer of 0 to 8, and u is an integer of 0 to 4; and ii) 0.005 to 0.5 mole %, based on the total moles of constituent units of said copolyester, of multifunctional compound units ($b_2$) derived from at least one multifunctional compound having at least 3 carboxyl groups, hydroxyl groups, and/or ester-forming groups thereof, at least one of said groups being carboxyl group or ester-forming group thereof;

wherein said copolymer has an intrinsic viscosity of 1.0 to 1.4 dl/g.

9. A copolyester consisting essentially of terephthalic acid units, ethylene glycol units, and i) 0.5 to 7 mole %, based on the total moles of constituent units of said copolyester, of at least one group of bifunctional compound units ($a_2$) selected from the group consisting of:

a) diol units (I) of the following formula:

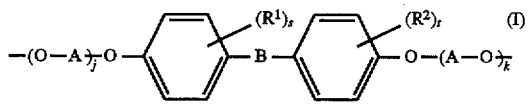

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4; and b) diol units (II) of the following formula:

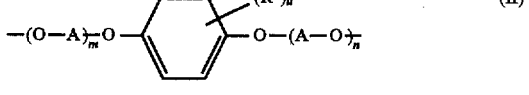

wherein A is —$CH_2CH_2$— or —$CH(CH_3)CH_2$—, $R^3$ is an inert substituent, m and n are each, independently, an integer of 0 to 8, and u is an integer of 0 to 4; and ii) 0.005 to 0.5 mole %, based on the total moles of constituent units of said copolyester, of multifunctional compound units ($b_3$) derived from at least one aliphatic or alicyclic multifunctional compound having at least 3 hydroxyl groups and/or ester-forming groups thereof;

wherein said copolyester has an intrinsic viscosity of 0.8 to 1.5 dl/g.

10. A copolyester consisting essentially of terephthalic acid units, ethylene glycol units, and i) 0.5 to 7 mole %, based on the moles of total constituent units of said copolyester, of at least one group of bifunctional compound units ($a_3$) selected from the group consisting of units from a condensed ring type aromatic dicarboxylic acid and units from a ring assembly type aromatic dicarboxylic acid;

ii) 0.005 to 1 mole %, based on the moles of total constituent units of said copolyester, of multifunctional compound units ($b_1$) derived from at least one multifunctional compound having at least 3 carboxyl groups, hydroxyl groups, and/or ester-forming groups thereof; and iii) monofunctional compound units (c) from at least one monofunctional compound selected from the group consisting of monocarboxylic acids, monohydric alcohols, and ester-forming derivatives thereof, in an amount satisfying the following formula (α):

$$\{20\times(p-2)\times b_1\} \geq c \geq \{0.1\times(p-2)\times b_1\} \quad (\alpha)$$

wherein:
$b_1$=content (mole %) of units ($b_1$)
$c$=content (mole %) of units (c)
$p$=average number of functional groups of said multifunctional compound deriving units ($b_1$).

11. A copolyester consisting essentially of terephthalic acid units, ethylene glycol units, and
   i) 0.5 to 7 mole %, based on the moles of total constituent units of said copolyester, of at least one group of bifunctional compound units ($a_3$) selected from the group consisting of units from a condensed ring type aromatic dicarboxylic acid and units from a ring assembly type aromatic dicarboxylic acid; and
   ii) 0.005 to 0.5 mole %, based on the moles of total constituent units of said copolyester, of multifunctional compound units ($b_1$) derived from at least one multifunctional compound having at least 3 carboxyl groups, hydroxyl groups, and/or ester-forming groups thereof.

12. The copolyester of claim 11, wherein said bifunctional compound units ($a_3$) are 2,6-naphthalenedicarboxylic acid units and/or 4,4'-biphenyldicarboxylic acid units.

13. A molded article comprising the copolyester of claim 1.

14. The molded article of claim 13, wherein said molded article has been produced by extrusion blow molding.

15. A process for producing molded articles, which comprises extrusion blow molding the copolyester of claim 1.

16. A process for producing the copolyester of claim 1, comprising the steps of:
   1) esterifying or transesterifying starting materials comprising a dicarboxylic acid component comprising terephthalic acid or ester-forming derivatives thereof, and a diol component comprising ethylene glycol, said starting materials further comprising:
      a) at least one alicyclic or aliphatic bifunctional compound selected from the group consisting of alicyclic or aliphatic dicarboxylic acids, hydroxycarboxylic acids, and ester-forming derivatives thereof, and alicyclic or aliphatic diols other than ethylene glycol;
      b) at least one multifunctional compound having at least 3 carboxyl groups, hydroxyl groups, and/or ester-forming groups thereof; and
      c) at least one monofunctional compound selected from the group consisting of monocarboxylic acids, monohydric alcohols, and ester-forming derivatives thereof;
   wherein the content of said alicyclic or aliphatic bifunctional compound in said starting materials is such that the ratio between units ($a_1$) from said alicyclic or aliphatic bifunctional compound and the total constituent units of the resulting copolyester is 1 to 4 mole %, based on the moles of the total constituent units;
   wherein the content of said multifunctional compound in said starting materials is such that the ratio between units ($b_1$) from said multifunctional compound and the total constituent units of the resulting copolyester is 0.005 to 1 mole %, based on the moles of the total constituent units; and
   wherein the content of said monofunctional compound in said starting materials is such that the ratio between units (c) from said monofunctional compound and the total constituent units of the resulting copolyester based on the moles of total constituent units satisfies the following formula (α):

$$\{20\times(p-2)\times b_1\} \geq c \geq \{0.1\times(p-2)\times b_1\} \quad (\alpha)$$

wherein:
$b_1$=content (mole %) of units ($b_1$) from said multifunctional compound in the resulting copolyester
$c$=content (mole %) of units (c) from said monofunctional compound in the resulting copolyester
$p$=average number of functional groups of said multifunctional compound deriving units ($b_1$);

2) melt polycondensing the ester obtained in step (1) above to prepare a polyester prepolymer; and
   3) solid phase polymerizing said polyester prepolymer.

17. A process for producing the copolyester of claim 6, comprising the steps of:
   1) esterifying or transesterifying starting materials consisting essentially of a dicarboxylic acid component comprising terephthalic acid or ester-forming derivatives thereof and a diol component comprising ethylene glycol, said starting materials further comprising:
      i) at least one bifunctional compound selected from the group consisting of:
         a) diols (III) of the following formula:

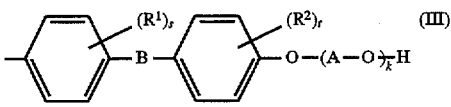

wherein A is —CH$_2$CH$_2$— or —CH(CH$_3$)CH$_2$—, B is a divalent hydrocarbon group, a carbonyl group, a sulfonyl group, an oxygen atom or a bond, R$^1$ and R$^2$ are each, independently, an inert substituent, j and k are each independently an integer of 0 to 8, and s and t are each, independently, an integer of 0 to 4;
         b) diols (IV) of the following formula:

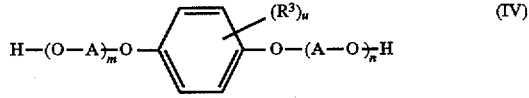

wherein A is —CH$_2$CH$_2$— or —CH(CH$_3$)CH$_2$—, R$^3$ is an inert substituent, m and n are each, independently, an integer of 0 to 8, and u is an integer of 0 to 4; and
         c) ester-forming derivatives of (a) and (b) above;
      ii) at least one multifunctional compound having at least 3 carboxyl groups, hydroxyl groups, and/or ester-forming groups thereof; and
      iii) at least one monofunctional compound selected from the group consisting of monocarboxylic acids, monohydric alcohols, and ester-forming derivatives thereof;
   wherein the content of said bifunctional compound in said starting materials is such that the ratio between diol units (I) and/or diol units (II), and the total constituent units of the resulting copolyester is 0.5 to 7 mole %, based on the moles of the total constituent units;
   wherein the content of said multifunctional compound in said starting materials is such that the ratio between units ($b_1$) from said multifunctional compound and the total constituent units of the resulting copolyester is 0.005 to 1 mole %, based on the moles of the total constituent units; and wherein the content of said monofunctional compound in said starting materials is such that the ratio between units (c) from said monofunctional compound and the total constituent units of the resulting copolyester based on the moles of the total constituent units satisfies the following formula ($\alpha$):

$$\{20\times(p-2)\times b_1\} \geq c \geq \{0.1\times(p-2)\times b_1\} \quad (\alpha)$$

wherein:
$b_1$=content (mole %) of units ($b_1$) from said multifunctional compound in the resulting copolyester
$c$=content (mole %) of units (c) from said monofunctional compound in the resulting copolyester
$p$=average number of functional groups of said multifunctional compound deriving units ($b_1$);

2) melt polycondensing the ester obtained in step 1) to prepare a polyester prepolymer; and
3) solid phase polymerizing said polyester prepolymer.

18. A process for producing the copolyester of claim 8, which comprises the steps of:
1) esterifying or transesterifying starting materials comprising a dicarboxylic acid component comprising terephthalic acid or ester-forming derivatives thereof and a diol component comprising ethylene glycol, said starting materials further comprising:
   i) at least one bifunctional compound selected from the group consisting of:
   a) diols (III) of the following formula:

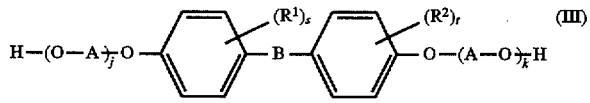

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4;
   b) diols (IV) of the following formula:

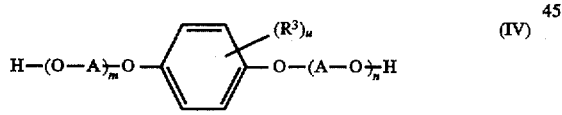

wherein A is —$CH_2CH_2$— or —$CH(CH_3)CH_2$—, $R^3$ is an inert substituent, m and n are each, independently, an integer of 0 to 8, and u is an integer of 0 to 4; and
   c) ester-forming derivatives of a) and b) above; and
ii) at least one multifunctional compound having at least 3 carboxyl groups, hydroxyl groups, and/or ester-forming groups thereof, at least one of said groups being carboxyl group or ester-forming groups thereof;

wherein the content of said bifunctional compound in said starting materials is such that the ratio between diol units (I) and/or diol units (II), and the total constituent units of the resulting copolyester is 0.5 to 7 mole %, based on the moles of the total constituent units; and wherein the content of said multifunctional compound in said starting materials is such that the ratio between units ($b_2$) from said multifunctional compound and the total constituent units of the resulting copolyester is 0.005 to 0.5 mole %, based on the moles of the total constituent units;

2) melt polycondensing the ester obtained in step (1) to prepare a polyester prepolymer; and
3) solid phase polymerizing said polyester prepolymer.

19. A process for producing the copolyester of claim 9, which comprises the steps of:
1) esterifying or transesterifying starting materials comprising a dicarboxylic acid component comprising terephthalic acid or ester-forming derivatives thereof, and a diol component comprising ethylene glycol, said starting materials further comprising:
   i) at least one bifunctional compound selected from the group consisting of:
   a) diols (III) of the following formula:

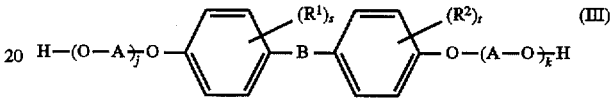

wherein A is —$CH_2CH_2$— or —$CH(CH_3)CH_2$—, B is a divalent hydrocarbon group, a carbonyl group, a sulfonyl group, an oxygen atom or a bond, $R^1$ and $R^2$ are each, independently, an inert substituent, j and k are each independently an integer of 0 to 8, and s and t are each, independently, an integer of 0 to 4;
   b) diols (IV) of the following formula:

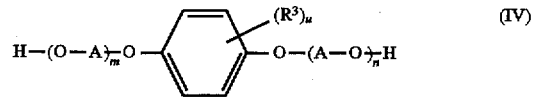

wherein A is —$CH_2CH_2$— or —$CH(CH_3)CH_2$—, $R^3$ is an inert substituent, m and n are each, independently, an integer of 0 to 8, and u is an integer of 0 to 4; and
   c) ester-forming derivatives of (a) and (b) above; and
ii) at least one multifunctional aliphatic or alicyclic compound having at least 3 hydroxyl groups and/or ester-forming groups thereof;

wherein the content of said bifunctional compound in said starting materials is such that the ratio between diol units (I) and/or diol units (II) and the total constituent units of the resulting copolyester is 0.5 to 7 mole %, based on the moles of the total constituent units; and wherein the content of said multifunctional compound in said starting materials is such that the ratio between units ($b_3$) from said multifunctional compound and the total constituent units of the resulting copolyester is 0.005 to 0.5 mole %, based on the moles of the total constituent units;

2) melt polycondensing the ester obtained in the above step (1) to provide a polyester prepolymer; and
3) solid phase polymerizing said polyester prepolymer.

20. A process for producing the copolyester of claim 10, which comprises the steps of:
1) esterifying or transesterifying starting materials comprising a dicarboxylic acid component comprising terephthalic acid or ester-forming derivatives thereof, and a diol component comprising ethylene glycol, said starting materials further comprising:
   a) at least one bifunctional compound selected from condensed ring type aromatic dicarboxylic acids and ring assembly type aromatic dicarboxylic acids;

b) at least one multifunctional compound having at least 3 carboxyl groups, hydroxyl groups, and/or ester-forming groups thereof; and c) at least one monofunctional compound selected from the group consisting of monocarboxylic acids, monohydric alcohols, and ester-forming derivatives thereof;

wherein the content of said bifunctional compound in said starting materials is such that the ratio between units ($a_3$) from said bifunctional compound and the total constituent units of the resulting copolyester is 0.5 to 7 mole %, based on the moles of the total constituent units;

wherein the content of said multifunctional compound in said starting materials is such that the ratio between units ($b_1$) from said multifunctional compound and the total constituent units of the resulting copolyester is 0.005 to 1 mole %, based on the moles of the total constituent units; and wherein the content of said monofunctional compound in said starting materials is such that the ratio between units (c) from said monofunctional compound and the total constituent units of the resulting copolyester based on the moles of the total constituent units satisfies the following formula ($\alpha$):

$$\{20 \times (p-2) \times b_1\} \geq c \geq \{0.1 \times (p-2) \times b_1\} \quad (\alpha)$$

wherein:

$b_1$ = content (mole %) of units ($b_1$) from said multifunctional compound in the resulting copolyester c = content (mole %) of units (c) from said monofunctional compound in the resulting copolyester p = average number of functional groups of said multifunctional compound deriving units ($b_1$);

2) melt polycondensing the ester obtained in the above step (1) to prepare a polyester prepolymer; and 3) solid phase polymerizing said polyester prepolymer.

21. A process for producing the copolyester of claim 11, which comprises the steps of:

1) esterifying or transesterifying starting materials comprising a dicarboxylic acid component comprising terephthalic acid or ester-forming derivatives thereof, and a diol component comprising ethylene glycol, said starting materials further comprising:

a) at least one bifunctional compound selected from condensed ring type aromatic dicarboxylic acids and ring assembly type aromatic dicarboxylic acids; and b) at least one multifunctional compound having at least 3 carboxyl groups, hydroxyl groups, and/or ester-forming groups thereof;

wherein the content of said bifunctional compound in said starting materials is such that the ratio between units ($a_3$) from said bifunctional compound and the total constituent units of the resulting copolyester is 0.5 to 7 mole %, based on the moles of the total constituent units; and wherein the content of said multifunctional compound in said starting materials is such that the ratio between units ($b_1$) from said multifunctional compound and the total constituent units of the resulting copolyester is 0.005 to 0.5 mole % based an the moles of the total constituent units;

2) melt polycondensing the ester obtained in the above step (1) to prepare a polyester prepolymer; and 3) solid phase polymerizing said polyester prepolymer.

* * * * *